United States Patent
Yeh et al.

(10) Patent No.: US 8,698,840 B2
(45) Date of Patent: Apr. 15, 2014

(54) METHOD AND APPARATUS FOR PROCESSING VIDEO AND GRAPHICS DATA TO CREATE A COMPOSITE OUTPUT IMAGE HAVING INDEPENDENT AND SEPARATE LAYERS OF VIDEO AND GRAPHICS DISPLAY PLANES

(75) Inventors: Gerard K. Yeh, Redwood City, CA (US); Cheng-ping Dardy Chang, Mountain View, CA (US)

(73) Assignee: CSR Technology Inc., San Jose, CA (US)

( * ) Notice: Subject to any disclaimer, the term of this patent is extended or adjusted under 35 U.S.C. 154(b) by 96 days.

(21) Appl. No.: 12/621,392

(22) Filed: Nov. 18, 2009

(65) Prior Publication Data
US 2010/0066762 A1 Mar. 18, 2010

Related U.S. Application Data

(63) Continuation-in-part of application No. 09/263,114, filed on Mar. 5, 1999, now Pat. No. 7,623,140.

(51) Int. Cl.
*G09G 5/00* (2006.01)
(52) U.S. Cl.
USPC .......... 345/629; 345/632; 345/637; 345/589; 345/638
(58) Field of Classification Search
USPC ......... 345/629, 632, 619, 638, 637, 418, 419, 345/589
See application file for complete search history.

(56) References Cited

U.S. PATENT DOCUMENTS

| | | | |
|---|---|---|---|
| 5,434,590 A | 7/1995 | Dinwiddie, Jr. et al. | |
| 5,629,720 A | 5/1997 | Cherry et al. | |
| 5,798,762 A | 8/1998 | Sfarti et al. | |
| 6,369,855 B1 | 4/2002 | Chauvel et al. | |
| 6,593,929 B2 | 7/2003 | Van Hook et al. | |
| 2004/0233217 A1* | 11/2004 | Chiu et al. | 345/629 |
| 2005/0264583 A1* | 12/2005 | Wilkins | 345/629 |
| 2007/0103489 A1 | 5/2007 | MacInnis et al. | |
| 2010/0171762 A1* | 7/2010 | MacInnis et al. | 345/660 |

OTHER PUBLICATIONS

U.S. Appl. No. 09/263,114, Official Communication mailed on Oct. 31, 2006.
U.S. Appl. No. 09/263,114, Official Communication mailed on Jun. 14, 2007.
U.S. Appl. No. 09/263,114, Official Communication mailed on Aug. 27, 2007.
U.S. Appl. No. 09/263,114, Official Communication mailed on May 22, 2008.

(Continued)

*Primary Examiner* — Chante Harrison
(74) *Attorney, Agent, or Firm* — Frommer Lawrence & Haug LLP; John W. Branch

(57) ABSTRACT

A method, apparatus, system and machine-readable medium for generating a composite output image based upon multiple input images. In certain embodiments, a plurality of input graphics images are iteratively blended in real time to provide a blended graphics image, which is then composited with other layers such as an input video image. The composite output image may then be provided to a display device. Iterative blending of the plurality of graphics images may include scaling, format conversion, and color space conversion, and may be performed based on priority information received for the graphics images from content sources. Compositing may include an alpha blending based on alpha values for pixels of the images.

20 Claims, 34 Drawing Sheets

(56) References Cited

OTHER PUBLICATIONS

U.S. Appl. No. 09/263,114, Official Communication mailed on Aug. 8, 2008.

U.S. Appl. No. 09/263,114, Official Communication mailed on Dec. 4, 2008.

U.S. Appl. No. 09/263,114, Official Communication mailed on Jul. 10, 2009.

Wikipedia, The Free Encyclopedia, "blanking interval", www.en.wikipedia.org, 2008, 4 pages.

* cited by examiner

| BGMD Active? | SVDO Active? | SGFX Active? | Cursor Active? | SVDO on top? | SGFX opaque? | Action Performed |
|---|---|---|---|---|---|---|
| - | 0 | 0 | 0 | - | - | select BGND pixel |
| - | 0 | 0 | 1 | - | - | alpha blend cursor with BGND |
| - | 0 | 1 | 0 | - | 0 | alpha blend SGFX with BGND |
| - | 0 | 1 | 0 | - | 1 | select SGFX |
| - | 0 | 1 | 1 | - | 0 | alpha blend cursor with SGFX and BGND |
| - | 0 | 1 | 1 | - | 1 | select SGFX; alpha blend cursor with SGFX |
| - | 1 | 0 | 0 | - | - | select SVDO |
| - | 1 | 0 | 1 | - | - | alpha blend cursor with SVDO |
| - | 1 | 1 | 0 | 0 | 0 | alpha blend SGFX with SVDO |
| - | 1 | 1 | 0 | 0 | 1 | select SGFX |

Continued from FIG. 16A

| BGND Active? | SVDO Active? | SGFX Active? | Cursor Active? | SVDO on top? | SGFX opaque? | Action Performed |
|---|---|---|---|---|---|---|
| - | 1 | 1 | 0 | 1 | - | select SVDO |
| - | 1 | 1 | 1 | 0 | 0 | alpha blend cursor with SGFX and SVDO |
| - | 1 | 1 | 1 | 0 | 1 | select SGFX; alpha blend cursor with SGFX |
| - | 1 | 1 | 1 | 1 | - | select SVDO; alpha blend cursor with SVDO |

FIG. 16B

METHOD AND APPARATUS FOR PROCESSING VIDEO AND GRAPHICS DATA TO CREATE A COMPOSITE OUTPUT IMAGE HAVING INDEPENDENT AND SEPARATE LAYERS OF VIDEO AND GRAPHICS DISPLAY PLANES

CROSS-REFERENCE TO RELATED APPLICATION

This utility patent application is a Continuation-in-Part Application of allowed U.S. patent application Ser. No. 09/263,114, filed Mar. 5, 1999, the benefits of which are claimed under 35 U.S.C. §120, and which is further incorporated herein by reference.

FIELD OF THE INVENTION

The invention relates to the processing of video and graphics data. More specifically, the invention relates to a method, apparatus, system, and machine-readable medium for processing multiple input images from different sources to create a composite output image.

BACKGROUND OF THE INVENTION

As the technology relating to the processing of video data and graphics data continues to advance, multimedia applications have become more and more in demand from a consumer perspective. Information of various interests to the consumers can be presented in different formats on different media. Information can be presented in a text format, a graphics format, an audio format, and a video format, etc. Different format standards as well as various industry standards have been developed with respect to the creation, transmission, processing, and presentation of information to the users.

The once separate domains of computer industry and television industry are coming together in their efforts to explore new ways to make information available to the consumers in a more convenient, efficient and cost-effective manner. Traditionally, only composite video signals from either an analog video source or a digital video source can be displayed on a television screen. The consumers, however, may have a need to access other information in other data formats, for example, graphics, while watching their television programs. Moreover, the consumers may want to be more than just passive viewers. They may want to be able to turn their television system into a workstation to perform various other tasks while watching TV or use their television as a device to communicate and interact with other entities, e.g., service providers, etc. In other words, the consumers may want their television system to be interactive. More particularly, the consumers may want to be able to retrieve information in different formats while watching TV, order items or services from service providers, participate in on-line programs, send email, etc., through interactions with their television system.

To enable the consumers to use their television set or any display processing device as an interactive tool to perform the various tasks and functions mentioned above, there exists a need to combine the information in different formats/media from different sources such as video data, graphics data, etc. into some common format and present such information to the users according to some display arrangement or configuration. More specifically, to enable the users to use their television system as an interactive device that functions as both a television and a computer, it is necessary to combine video data, graphics data, etc. and display the output data as composite images on the television screen with some mechanism to allow the users to interact with their television, for example, using a cursor to select or activate various options presented on the screen.

BRIEF DESCRIPTION OF THE DRAWINGS

The features and advantages of the invention will be more fully understood by reference to the accompanying drawings, in which:

FIGS. 16A AND 16B show an embodiment of an output selection table;

DETAILED DESCRIPTION

In the following detailed description numerous specific details are set forth in order to provide a thorough understanding of the invention. However, it will be obvious to one skilled in the art that the invention may be practiced without these specific details.

A method, apparatus, system and machine-readable medium for generating a composite output image based upon multiple input images are defined. In one embodiment, it is determined whether a first display position on a display panel at which a first pixel of the output image is to be displayed is within an active display region of the display panel. Active display processing is performed if the first display position on the display panel is within the active display region. Blanking display processing is performed if the first display position is not within the active display region.

In certain embodiments, a plurality of input graphics images are iteratively blended in real time to provide a blended graphics image, which is then composited with other layers such as an input video image. The composite output image may then be provided to a display device. Iterative blending of the plurality of graphics images may include scaling, format conversion, and color space conversion, and may be performed based on priority information received for the graphics images from content sources. Compositing may include an alpha blending based on alpha values for pixels of the images.

In the discussion below, the teachings of the invention are utilized to implement a video and graphics display processing system to generate a composite output image based upon multiple input images from different sources. The input images may be blended with each other in a predetermined order or selected individually without being blended to generate the composite output image based upon various factors. These factors include several user-controlled parameters indicating the respective size and display location of each input image, which input image is enabled for display, which input image is transparent and which is opaque, and where the display location of the input images are co-located, which image is to be displayed on top of other input images. These factors also include the current display location on the display panel where the current pixel of the output image is to be displayed and whether the current display location falls within 20 an active display region, etc. The teachings of the invention are applicable to any display processing environment or architecture in which different input images of the same or different formats are to be displayed concurrently on the same display device. However, the invention is not limited to the processing of video and graphics data and can be applied to any data processing environment.

Figure 1:
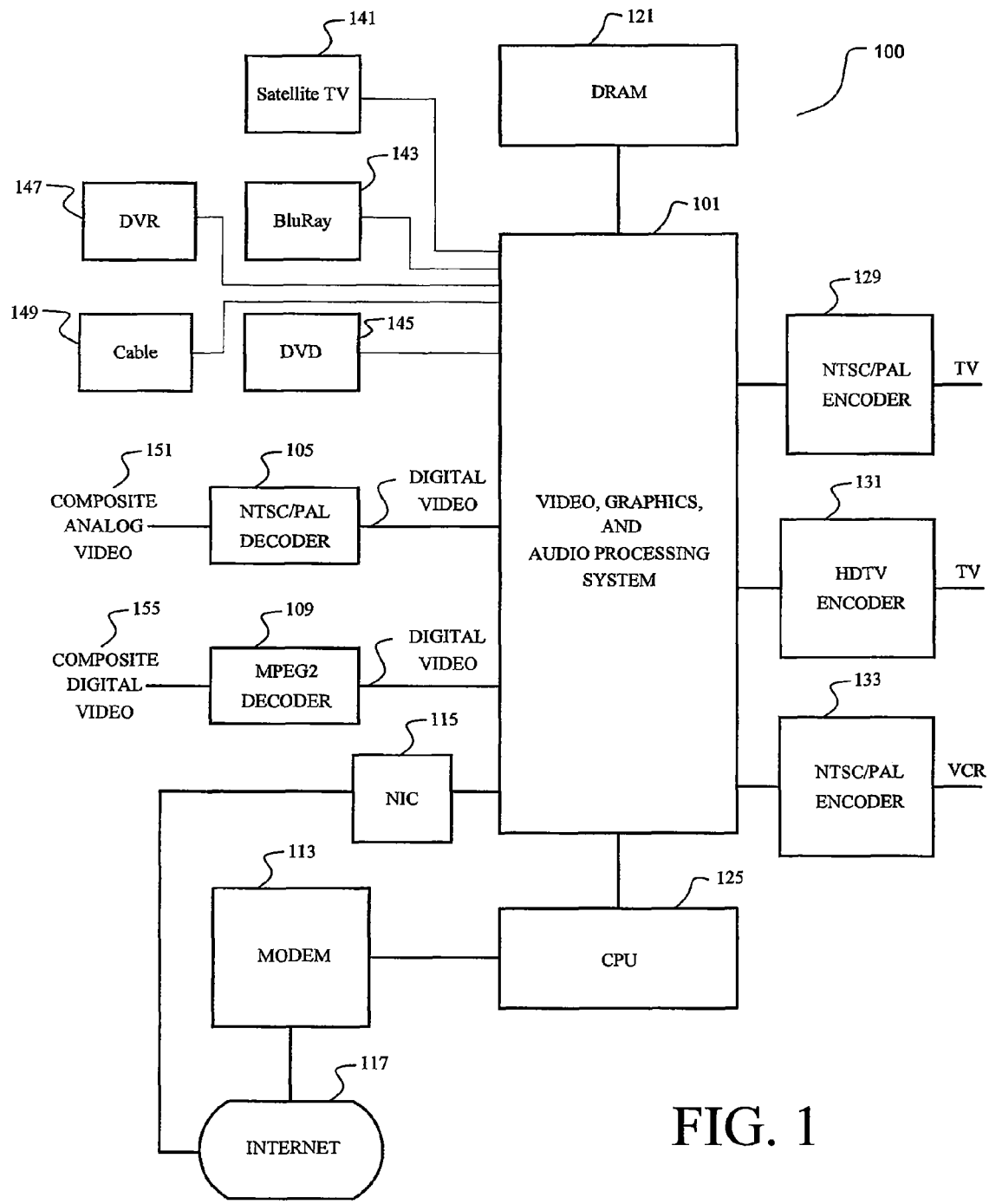
FIG. 1 is a simplified block diagram of one embodiment of a video, audio and graphics processing system configuration.

FIG. 1 is a simplified block diagram of one embodiment of a video, graphics and audio processing system 100. In this system configuration, the video, graphics, and audio display processor (VGDP) 101 can be either a stand-alone integrated circuit or a part of an integrated circuit embodied in a set-top box to receive input data from different input sources and process the input data to generate output data for display on a display device or for further processing. In one embodiment, an analog video stream 151 can be input into the VGDP 101 via the NTSC/PAL decoder 105. Digital video data stream can be input .into the VGDP 101 through the MPEG2 decoder 109.

The VGDP 101 may also receive graphics, video, text or other data from other sources including, but not limited to a Satellite TV source 141, a BluRay video source 143, a Digital Video Disc (DVD) player 145, a Digital Video Recorder (DVR) 147, and/or a cable television source 149. The VGDP 101 receives graphics or text data from another source such as the CPU 125. Graphics and text data, in one embodiment, can be downloaded onto the CPU 125 and memory devices that are connected to the CPU 125 from an external source such as the Internet 117 via a network communications device such as the modem 113. Graphics, video, text, and/or other data may also be received from Internet 117 via a Network Interface Controller (NIC) 115. For example, NIC 115 may be a transceiver, transceiving device, or other network interface unit that enables VGDP 101 to communicate with the Internet or some other communications network. Graphics and text data can also be input into the system from a storage or memory device such as the DRAM 121. VGDP 101 may output in various formats by way of various encoders. For example, VGDP 101 may output via an NTSC/PAL Encoder 129 to TV, via High Definition (HD) TV Encoder 131 to TV, and/or via NTSC/PAL Encoder 133 to a VCR or other video recording device. Various functions can be performed by the VGDP 101 with respect to the input video, audio, graphics, and text data in order to generate the output data. The various functions performed by the VGDP 101 are described in more detail below.

Figure 2:
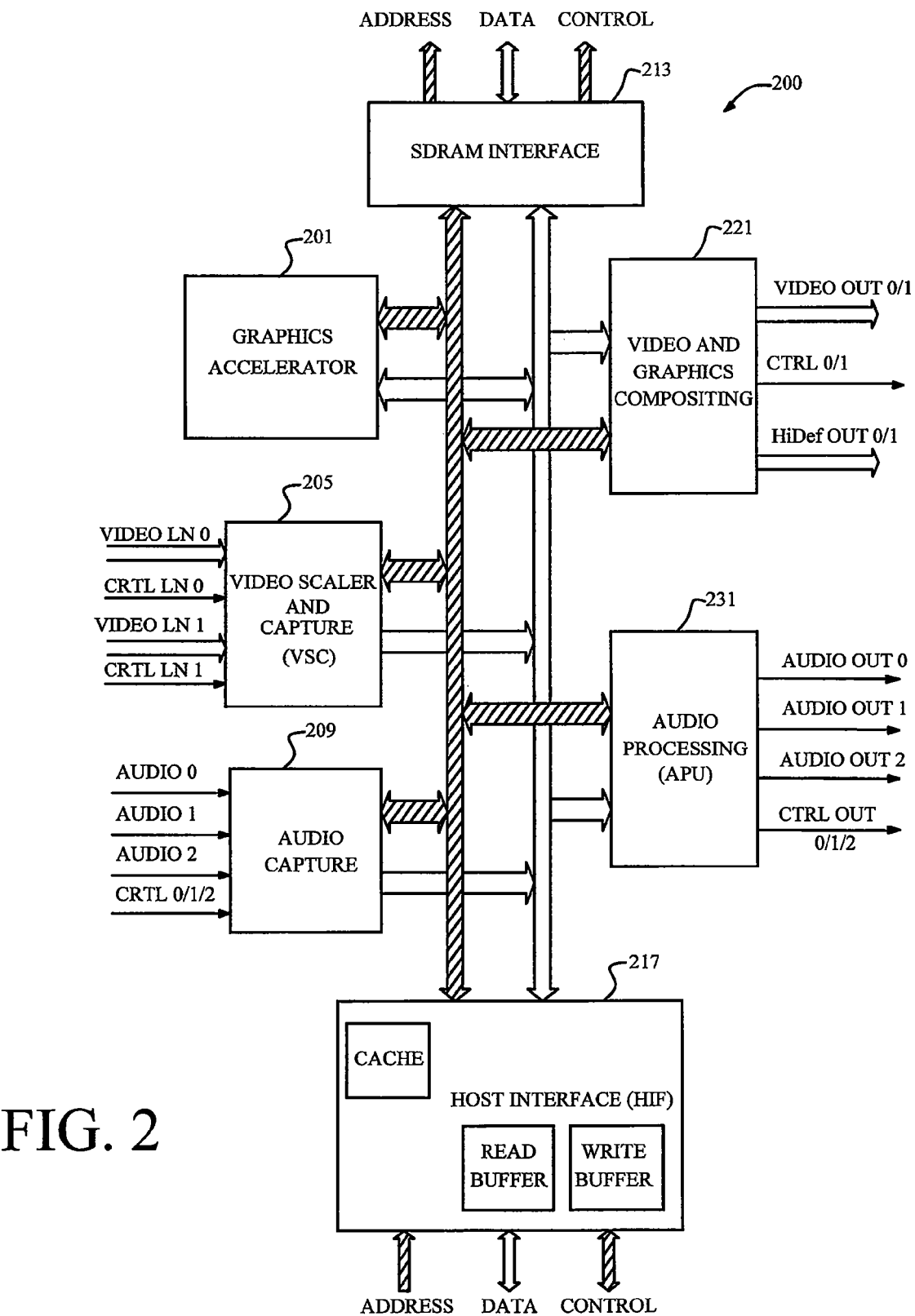
FIG. 2 shows a block diagram of one embodiment of a video, audio and graphics display processor.

FIG. 2 illustrates a block diagram of one embodiment of the VGDP 101. In this embodiment, the graphics accelerator unit (GAU) 201, also referred to as the bit block transfer (BitBlt) engine can be a 32-bit graphics accelerator. The GAU 201 performs a comprehensive set of functions on two-dimensional pixel maps in a variety of pixel map formats. A generalized graphics operation performed by the GAU 201 is given by the formulas below:

$$Dc = \text{Blend}((Sa, \text{BoolOp}(\text{Convert}(P), \text{Convert}(S), D)), (Da, D))$$

$$Da = \text{Alpha}(Sa, Da)$$

where BoolOp( ) is one of the 256 boolean operations performed between the pattern, source, and destination pixmap which will be described in greater detail below; Blend( ) controls the degree of opacity between the source destination pixmaps, and is optionally applied under software control; Conver( ) is a color conversion algorithm, which is applied if the destination pixmap has a different color depth than the source pixmap; Alpha( ) is an alpha blending function applied to the alpha plane, if present; D, S, and P refer to the destination, source, and pattern pixmaps, respectively; a is the alpha channel value and c is the color value; Sa is either the source alpha, the pattern alpha, or the destination alpha; and Da is either the destination alpha or the global alpha.

Table 1 below shows the different pixel formats that can be supported by the VGDA 101. In one embodiment, the 1-bit index format, 4-bit index format, and the 4-bit alpha format are supported as source formats only.

TABLE 1

| Format | Description |
|---|---|
| 8c | 8RGB (3:3:2) |
| 16c | 16GB (5:6:5) |
| 24c | 24GB (8:8:8) |
| 4a12c | 4alpha, 12RGB |
| 8a8c | 8alpha, 8RGB |
| 8a16c | 8alpha, 16RGB |
| 8a24c | 8alpha, 24RGB |
| 1i | 1-bit index |
| 4i | 4-bit index |
| 8i | 8-bit index |
| 8a8i | 8alpha, 8index |
| 4a | 4-bit index |
| 1a15c | 1alpha, 15RGB |
| YCbCr | 4:2:2 |

If the source and the destination pixmaps are in different formats, then a color expansion operation is performed. If the destination format has a different color space than the source format, the operands are first converted to the destination format. Table 2 below illustrates a mapping used for color expansion operation. Bits from the source color field are copied to the destination color field according to the mapping shown in columns R, G, and B in table 2. Note that duplication of the most significant bits (MSBs) into the least significant bits (LSBs) of the expanded color properly preserves the dynamic range.

TABLE 2

| SRC | DST | R | G | B |
|---|---|---|---|---|
| 8c | 12c | R2, R1, R0, R2 | G2, G1, G0, G2 | B1, B0, B1, B0 |
| 8c | 16c | R2, R1, R0, R2, R1 | G2, G1, G0, G2, G1, G0 | B1, B0, B1, B0, B1 |
| 8c | 24c | R2, R1, R0, R2R1, R0, R2, R1 | G2, G1, G0, G2, G1, G0, G2, G1 | B1, B0, B1, B0, B1, B0, B1, B0 |
| 12c | 16c | R3, R2, R1, R0, R3 | G3, G2, G1, G0, G3, G2 | B3, B2, B1, B0, B3 |
| 12c | 24c | R3, R2, R1, R0, R3, R2, R1, R0 | G3, G2, G1, G0, G3, G2, G1, G0 | B3, B2, B1, B0, B3, B2, B1, B0 |
| 1i | 8I, 8c 12c, 16c, 24c | Use foreground, background register | | |
| 4i | 8I8c | Align at LSB of index map | | |
| 4I, 8I | 8c, 12c, 16c, 24c | Use Color look-up table | | |

Table 3 shows the proper operations for various source and destination pixmap formats. If a source format has no alpha value but the operation requires one, a global (per BLT) alpha value is supplied, for example, in a device register. Expansion of per-pixel alpha values, for example, from 4 bits to 8 bits is performed by the following formula to yield the correct values for $0$ indicating transparency and 15 indicating opacity.

$$a[8]=a[4]*8*(1+1/16)$$

When no operands have an alpha value per pixel (e.g., in the 8-bit RGB format, 16-bit RGB format, or 24-bit RGB format) and blending is turned on, specific alpha values for the source and destination operands are supplied.

TABLE 3

| 1i | 8i | BoolOp |
|---|---|---|
| 1i | 8a8i | BoolOp, Alpha |
| 4i | 8i | BoolOp |
| 4i | 8a8i | BoolOp, Alpha |
| 8i | 8i | BoolOp |
| 8i | 8a8i | BoolOp, Alpha |
| 8a8i | 8a8i | BoolOp, Alpha |
| 1i, 4i, 8i, 8a8i | RGB | BoolOp, Blend, Reduce |
| 1i, 4i, 8i, 8a8i | aRGB | BoolOp, Blend, Reduce, Alpha |
| RGB | RGB | BoolOp, Blend, Reduce |
| aRGB | RGB | BoolOp, Blend, Reduce |
| RGB | aRGB | BoolOp, Blend, Reduce, Alpha |
| aRGB | aRGB | BoolOp, Blend, Reduce, Alpha |

In one embodiment, the 256 possible boolean raster operations (ROPs) on pixel maps with up to two source bitmaps and one destination bitmap are supported. In one embodiment, the source and destination operands bitmaps have equal size although they may have different color depths or representation. Boolean operations are performed bitwise on the index or color planes. They are not applied to the alpha plane, if present.

In one embodiment, alpha blending between source and destination pixel maps is supported. The 8-bit alpha mode supports values between 128 (opaque) and 0 (transparent). The 4-bit alpha mode supports values between 15 (opaque) and 0 (transparent). Table 4 shows the different alpha blending modes that are supported in one embodiment. Note that the alpha blending operation can be applied to each color component separately. If the destination pixel map has an alpha-per-pixel value, the destination alpha value becomes one of the following: Sa+Da−Sa*Da; Sa; Da; 1−Sa; or 1−Da.

TABLE 4

| S over D | $S_c + (1 - S_a) * D_c$ |
|---|---|
| S in D | $D_a * S_c$ |
| S xor D | $(1 - D_a) * S_c + (1 - S_a) * D_c$ |
| S only | $S_a * S_c$ |
| D only | $D_a * D_c$ |
| S atop D | $D_a * S_c + (1 - S_a) * D_c$ |
| D atop S | $S_a * D_c + (1 - D_a) * S_c$ |
| Special | $S_a * S_c + (1 - S_a) * D_c$ |

In one embodiment, if the source pixel map has greater color depth than the destination, color reduction is applied. Table 5 illustrates a mapping used to perform an m-bit to an n-bit linear color reduction, which is applied to each color component. A dithering algorithm applies a 2×2 pixel error diffusion operation to the destination pixels during rounding. The quantization error due to rounding is weighted according to the destination pixel location with respect to the pixmap origin and pitch. If the result is less than 1, the destination pixel color is increased by 1.

TABLE 5

| n | m | Operation |
|---|---|---|
| 4 | 3 | $(x[4] - (x[4]>>3) + 2\hat{\ }0)>>1$ |
| 4 | 2 | $(x[4] - (x[4]>>2) + 2\hat{\ }1)>>2$ |
| 5 | 3 | $(x[5] - (x[5]>>3) + 2\hat{\ }1)>>2$ |
| 5 | 2 | $(x[5] - (x[5]>>2) + 2\hat{\ }2)>>3$ |
| 5 | 4 | $(x[5] - (x[5]>>4) + 2\hat{\ }0)>>1$ |
| 6 | 3 | $(x[6] - (x[6]>>3) + 2\hat{\ }2)>>3$ |
| 6 | 4 | $(x[6] - (x[6]>>4) + 2\hat{\ }1)>>2$ |
| 8 | 2 | $(x[8] - (x[8]>>2) + 2\hat{\ }5)>>6$ |
| 8 | 3 | $(x[8] - (x[8]>>3) + 2\hat{\ }4)>>5$ |
| 8 | 4 | $(x[8] - (x[8]>>4) + 2\hat{\ }3)>>4$ |
| 8 | 5 | $(x[8] - (x[8]>>5) + 2\hat{\ }2)>>3$ |
| 8 | 6 | $(x[8] - (x[8]>>6) + 2\hat{\ }1)>>2$ |

In one embodiment, the BitBLT engine operations discussed above can be programmed by the CPU 125 or fetched from a display list maintained in memory by the VGDP 101. The display list can be a linked list of BLT commands, which are executed in sequence by the VGDP 101. Programmers may use this mechanism to animate graphical sequences without CPU intervention. BLT operations may be suspended until the occurrence of a display event or an external stimulus. Display events can be the display of a 5 specified scan line or a vertical sync. External events can be flagged by the CPU writing to a control register.

Returning to FIG. 2, the Video Scaler and Capture (VSC) unit 205 receives video data stream from the video input sources such as the NTSC/PAL decoder 105 and the MPEG2 decoder 109. The VSC 205 downscales input video data into different specified sizes and captures the scaled video data in a memory unit such as an SDRAM (not shown). In one embodiment, there are two video inputs, one of which may be selected for scaling and the other may be bypassed to the output. Either input can be selected for displaying as background video, which will be described in detail below. In one embodiment, the input video stream data can be formatted according to the CCIR601/CCIR656 standard. In one embodiment, the video inputs are assumed to be in CCIR601/CCIR656 8-bit parallel format. The device can synchronize to the SAV/EAV sync words embedded in the CCIR656 pixel data stream or to the optional external video sync signals (VSYNCI[1:0] and HSYNCI[1:0] in CCIR601 mode. Alternatively, the device can be programmed to be the master timing generator that drives the HSYNC and the VSYNC signals.

In one embodiment, an active region of interest (ROI) can be defined in the source image to implement a cropping function, which affects only the datapath of the VSC 205. The ROI can also be used to implement a panning feature. The two video inputs channels can be independently programmed and have identical features. The video switch box can route any of the two video inputs to its designated outputs including routing the same input channel to both the video scaling unit and the background video output. The background video can be optionally displayed as the background plane of the video and graphics composite output, which will be described in further detail subsequently.

In one embodiment, video scaling is performed with a horizontal scaler, followed by a vertical scaler. The ROI size defines the size of the video scaler source image. The horizontal downscale factor can be any integer number. In one embodiment, an even number of pixels is expected. In one embodiment, a maximum ROI of 720 pixels is supported by the horizontal downscaler. Vertical down scaling can be any number of lines from one line to full size.

In one embodiment, the horizontal and vertical scaling can be controlled by independent Digital Differential Analyzers (DDAs). The user can program the DDA depending on the desired scale factor. The scaler performs a variable tap filter operation in which the number of taps depends on the scale factor. Depending on the implementation, the taps can be weighted according to the sample position, the filter length and/or the sub-pixel positioning of the filter window. The filter coefficients are synthesized inside the VGDP 101. Vertical filtering is performed on each field separately. This produces optimal results for field-based video.

The brightness, contrast and saturation of the captured image can be adjusted. Brightness and contrast operations are performed on the luma component where brightness is an offset adjustment to achieve "blackness" of the picture or image and contrast is a scale factor to expand the range between black and white. In one embodiment, the brightness and contrast adjustment operations are performed on the luma component of the video pixel as shown in the following formula:

$$Y' = (Y - 16) * \text{CONTRAST} + \text{BRIGHTNESS}$$

In one embodiment, the adjusted luma component Y' is clipped to a range between 16 and 235.

Saturation is a scaling of the chroma component of the video pixel to adjust color difference as shown in the formula below.

$$(Cb', Cr') = ((Cb, Cr) - 128) * \text{SATURATION} + 128$$

In one embodiment, Cb' and Cr' are clipped to the range from 16 to 240.

The video data and graphics data after being processed by the VSC unit 205 and the GA unit 201, respectively, are input to the Video and Graphics Compositing Unit (VGC) 221. For the purposes of discussion herein, the VGC 221 is also referred to as the Display Processing Controller (DPC) subsystem. In one embodiment, the DPC can composite up to four planes of graphics and video objects and present the resulting output image to either one or two video outputs. One of the two video outputs can be configured to display the resulting image which may contain up to four planes of video and graphics objects including background, video, graphics, and cursor planes. The other video output can be configured to display the background plane only or optionally all the four planes. The second video output may be used to record video to VCR or other recording media. VGC 221 may also provide video output in one or more HDTV formats, such as 1080i, 1080p, 720p and others.

In one embodiment, the background plane is opaque and is sized to cover the entire active video area of the display screen. The background plane can be defined to contain either a video image selected from anyone of the two video inputs, a tiled graphics image, or a single color image, depending on a background display mode chosen by the user. If the background video image is chosen, the video image is input from the bypass channel of the VSC 205. If background video image is chosen, the video output synchronization is derived from the source of the background video. If there is no video signal, or the source has incorrect time base behavior, the background plane may be switched to a monochrome color defined, for example, in a register.

In one embodiment, when a tiled bitmap is chosen as the background image, the bitmap is stored in external memory or optionally in an on-chip memory in the YCbCr (4:2:2) format. If the bitmap is too small to cover the entire active screen area, it optionally may be tiled in hardware. The tiler can be programmed to flip the image left-right or top-bottom as appropriate so that the edges of the tile match. In one embodiment, the single color option is performed by programming, for example, a register within the DPC register map without storing the color data in memory. Detailed description of a method and an apparatus for generating the tiled graphics image is provided subsequently below.

In one embodiment, the video plane is opaque. The video image represents the video data captured by the VSC 205. The video window can be positioned anywhere in the visible display area according to a user-defined setting. The video window can be scaled to any horizontal and vertical size up to the maximum of the ROI size. In one embodiment, the scale video image can optionally be surrounded by a hardware-generated video border of a particular color chosen by the user. If loss of sync occurs with respect to the resized video image, the video plane may be set to a color selected by the user. In one embodiment, video plane data are read from a circular buffer maintained in a memory unit. In one embodiment, video plane input data are written into the circular buffer in YCbCr (4:2:2) format one field after the other and read from the circular buffer in the same order. In one embodiment, the size of the buffer is user-defined. In one embodiment, the minimum size is set depending upon the size of the scaled video, the desired output quality, and the relative synchronization between the two input video sources. A special mode can be selected to allow the buffer memory to be reduced by one (scaled) field for the worst case. This would allow fields from even source video to be displayed in the odd field of output video, and vice-versa, without line-order errors.

The graphics plane can be defined to be either translucent (transparent) or opaque. The graphics plane can overlay the background plane only or both the background and video planes. In one embodiment, the graphics bitmap may optionally be scaled before compositing to vary the aspect ratio or underscan the bitmap. Underscanning is used so that, for example, a 640×480 or a 800×600 bitmap can be displayed inside the viewable region of a standard television.

Table 6 illustrates the different bitmap formats that are supported by the graphics plane. The graphics plane data, in one embodiment, are stored in a memory unit in a raster scan order and read out in an interlace order.

TABLE 6

| Name | Description |
|---|---|
| 8c | 8RGB (3:3:2) |
| 15c | 15RGB (5:5:5) |
| 16c | 16RGB (5:6:5) |
| 24c | 24RGB (8:8:8) |
| 4a12c | 4alpha, 12RGB |
| 8a16c | 8alpha, 16RGB |
| 8a24c | 8alpha, 24RGB |
| 4i | 4-bit index |
| 8i | 8-bit index |
| 8a8i | 8alpha, 8index |
| 8a8c | 8alpha, 8RGB |
| 1a15c | 1alpha, 15RGB |

The graphics plane can be scaled. In one embodiment, scaling can be performed independently in the horizontal and vertical directions. The graphics plane can also be filtered using a vertical anti-flicker filter. In one embodiment, a 6-tap filter is used which has a variable threshold feature. When this feature is enabled, pixels which have a luminance above a predetermined threshold are filtered vertically. This would allow for a trade-off to be made between picture sharpness and flicker.

The aspect ratio of the graphics plane may be modified. The purpose of modifying the aspect ratio is to vary the horizontal width of the graphics plane such that the pixels appear square when viewed on a TV with a CCIR601/CCIR656 grid (720× 480 for NSTC or 720×576 for PAL). Table 7 shows the different aspect ratio modes supported in one embodiment.

TABLE 7

| Mode | Description |
|---|---|
| None | The aspect ratio is unchanged |
| 640->720 overscan | 640 source pixels are converted to 720 display pixels. |
| 640->680 overscan | 640 source pixels are converted to 680 display pixels. |
| 800->720 underscan | 800 source pixels are converted to 720 display pixels. |
| 800->680 underscan | 800 source pixels are converted to 720 display pixels. |

A color keying or a chroma keying feature on the graphics plane is also provided in one embodiment. Each pixel can be color-expanded to a predetermined number of bits, for example 24-bit value, and then examined to see if the color falls within a selected range. If it does, the alpha value associated with the pixel is forced to zero to make it transparent, otherwise the alpha channel value of the pixel is unaltered. This method allows color keying (e.g., green screen, blue screen, etc.) to occur between graphics and captured video plane. In one embodiment, keying based on a particular index is also supported when one of the index pixel modes is selected.

The graphics plane can be positioned at any location in the active display area according to user-defined specifications. The graphics plane can be composited with the underlying background plane and/or video plane. The compositing operation uses a combination of the per-pixel alpha value (ap), data from the graphics plane (RGB), and a global composition alpha value (ag). The two alpha values can be combined together as shown in table 8 below.

TABLE 8

| Name | Operation |
|---|---|
| Replace | $[a_c, R, G, B] = [a_g, R, G, B]$ |
| Darken | $[a_c, R, G, B] = [a_p, a_g, *R, a_g*G, a_g*B]$ |
| Opaque | $[a_c, R, G, B] = [a_g*a_p, *, R, G, B]$ |
| Fade | $[a_c, R, G, B] = [a_g, *a_p, a_g*R, a_g*G, a_g*B]$ |

The graphics plane is then converted to YCbCr space and composited with the video plane using the composite per-pixel alpha value ac. The composition of the graphics plane with the background plane and the video plane will be described in greater detail below.

In one embodiment, a cursor plane is placed on top of the other planes (e.g. the background plane, the video plane, and the graphics plane). In one embodiment, a 64×64 pixel hardware cursor that constitutes the cursor plane can be stored in a memory, for example an SDRAM and displayed on the screen when the cursor location is reached. In one embodiment, the cursor bitmap is stored in a 4-bit per pixel index format and is used as an index to locate a particular color in a color look-up table. This method allows for different color palettes to be programmed. The cursor plane can be composited with other planes using an alpha blending operation on a per-pixel basis. The composition of the cursor plane with the other planes to generate the output image for display on a screen is described in detail subsequently.

Figure 4A:
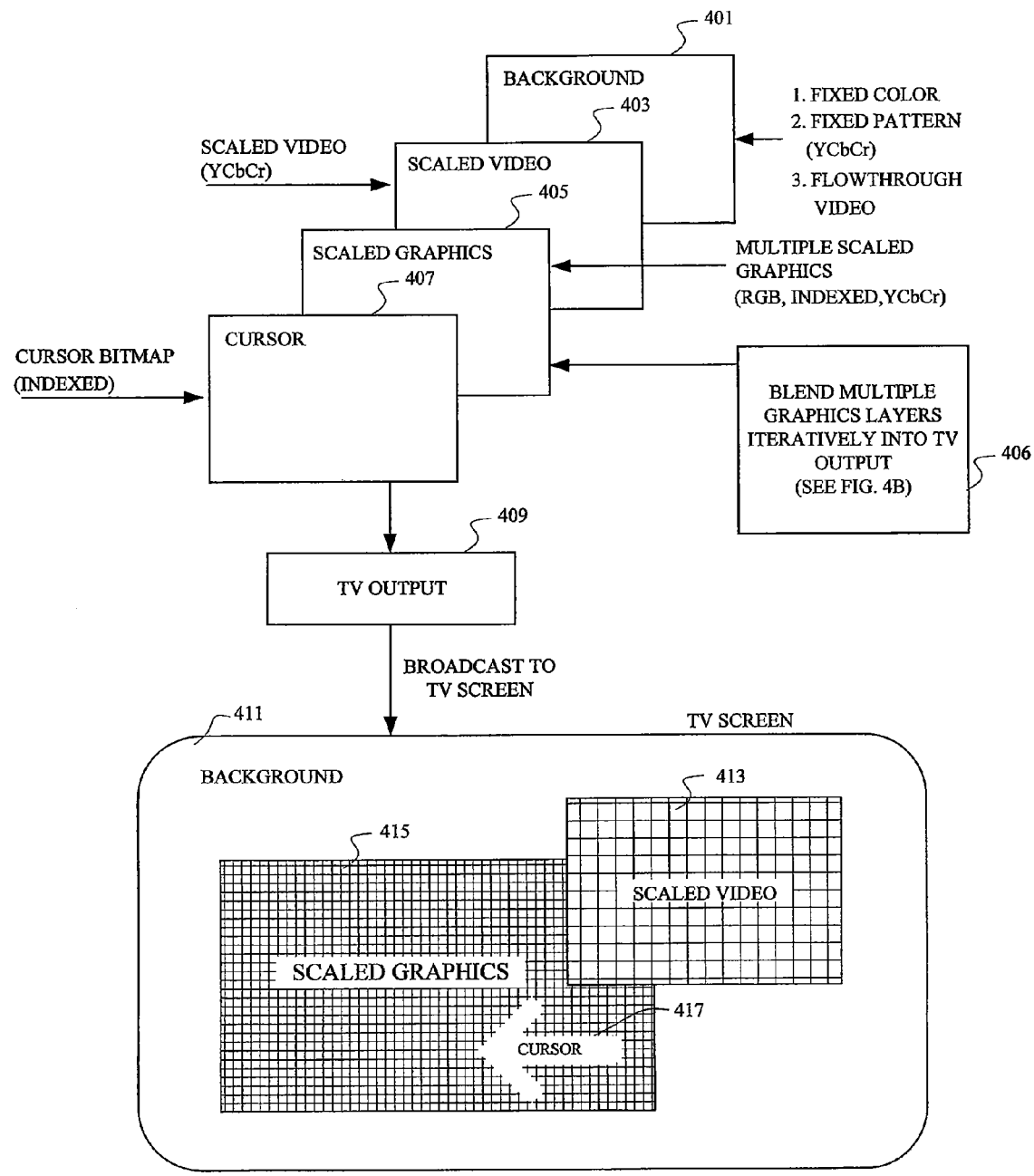
FIG. 4A illustrates one embodiment of a high level conceptual display arrangement.

FIG. 4A illustrates one embodiment of a display arrangement of the four planes discussed above. Based upon various factors, each image may be selected individually or blended with other images to generate the composite output image, according to a predetermined compositing scheme, which is described in detail below. The various factors include the display configuration specified by the user for each input image, the current display location on the display screen, etc. As shown in FIG. 4A, the background 411 image fills the entire display screen, the scaled video 413 image occupies a region of the display screen based upon its size and display location specified by the user. The scaled graphics image 415 can be either opaque or transparent and can be below or on top of the scaled video image. The cursor image is displayed on top of all other images in this configuration. Where the images overlap (i.e., where they occupy the same areas on the display screen), either one of the input images is selected or the overlapping input images are blended in a predetermined order based upon several factors to be discussed in more detail subsequently.

Following the blending, compositing or otherwise combining of background image 401, scaled video image 403, scaled graphics image 405 and/or cursor image 407, the resulting composite output image may be provided to TV output 409, which then provides (e.g., broadcasts or otherwise sends) the output image to be displayed on a TV screen or other display device, as shown by element 411.

In some embodiments, scaled graphics image 405 may be a blended graphics image provided by a process of blending multiple graphics layers, as shown by element 406 of FIG. 4A. Such a process of blending multiple graphics layers may be preliminary to the compositing, blending or otherwise combining of scaled video image 405 with scaled graphics image 407. In some embodiments cursor image 407 may be treated as one of the multiple graphics images/layers that are blended at step 406, and may be processed in a similar way to other graphics layers. Such a blending of a plurality of graphics layers (or graphics images, graphics planes) may be conceptually considered as a stacking of graphics layers to produce a blended graphics image.

Blending of multiple graphics layers may be necessary and/or advantageous when graphics are received by VGAP 101 from multiple graphics sources (e.g., the Internet 117 or various other sources such as DVD 145, DVR 147, BluRay 143 as depicted in FIG. 1) and when multiple graphics planes/layers/images are to be displayed on an output device. In some embodiments, one of the graphics layers may correspond to a cursor that enables user input, such as the cursor image portrayed in FIG. 4A.

Figure 3:
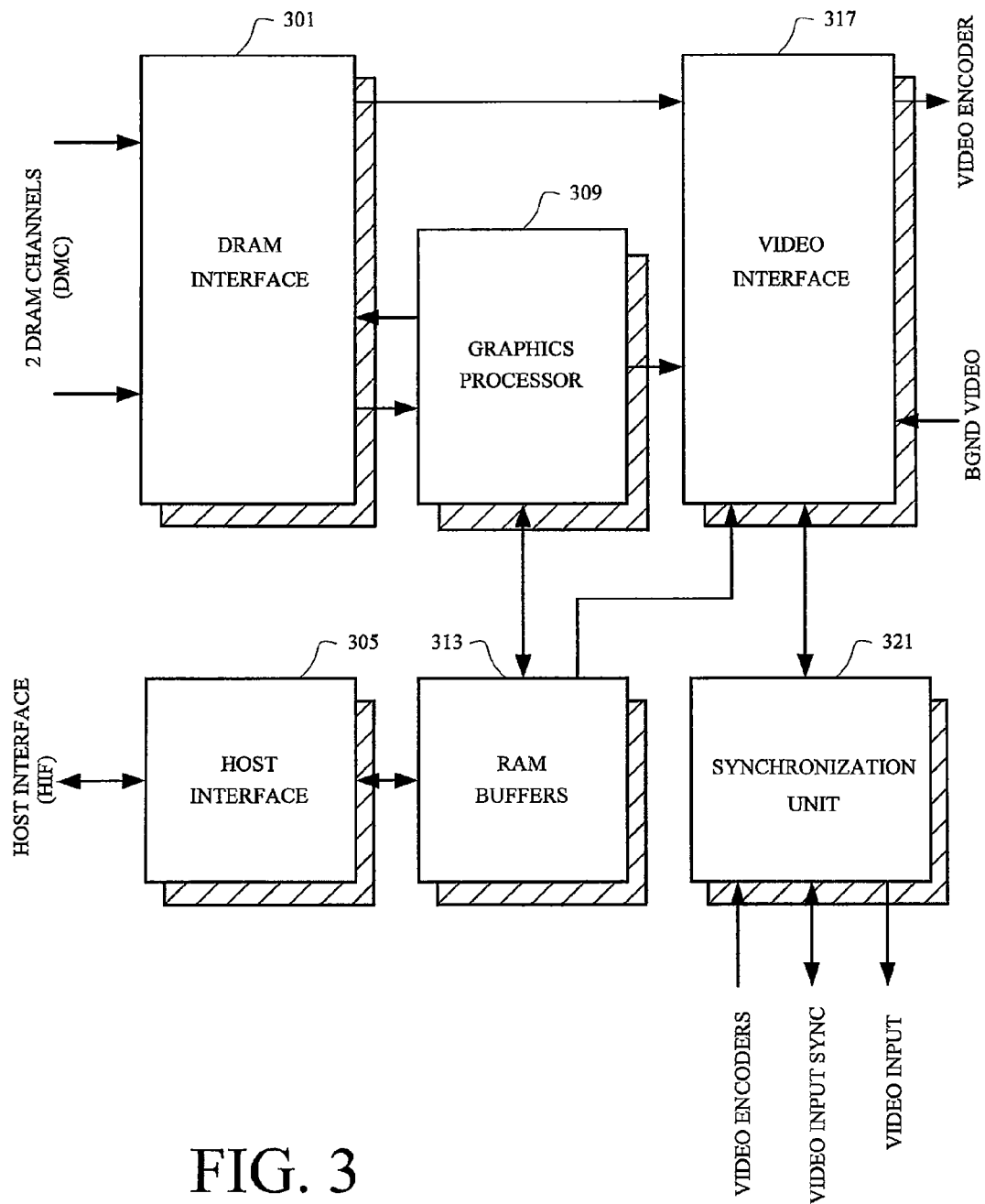
FIG. 3 illustrates a block diagram of one embodiment of a display processing subsystem.
Figure 4B:
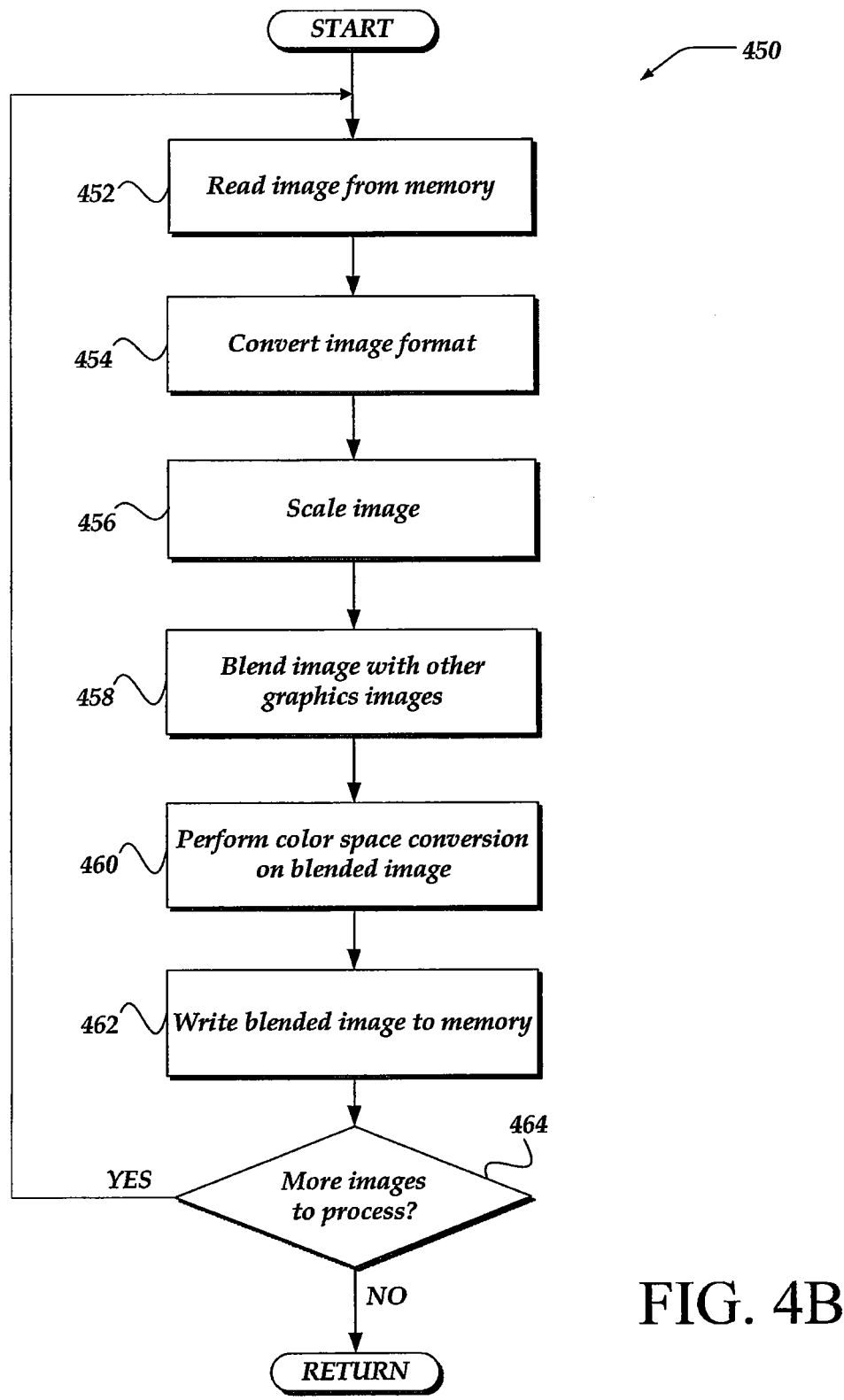
FIG. 4B illustrates a flow diagram of an embodiment of a method for generating a composite output image.

An example process for blending multiple graphics layers is depicted in FIG. 4B. In some embodiments, such a process may be a software process that executes within VGAP 101 depicted in FIG. 1, and more particularly within Video and Graphics Compositing Unit 221 depicted in FIG. 2, and/or Graphics Processor 309 depicted in FIG. 3. After its start, process 450 proceeds to block 452 where it reads from memory at least one of the plurality of graphics images to be blended. In some embodiments, the memory may be DRAM 301 as shown in FIG. 3.

After reading the at least one graphics image, the process may convert the format of the graphics image at block 454. Format conversion may include converting between different graphics and/or image formats including bitmap or raster formats (e.g., GIF, JPEG) and/or vector formats (e.g., XVG, XAML). At block 456, the process may scale the graphics image. Scaling may include decreasing the size of the graphics image through downscaling (e.g. by way of decimation or other downsampling). Scaling may also include increasing the size of the graphics image through upscaling (e.g. by way of interpolation). The scaling may be horizontal and/or vertical scaling of the graphics image.

At block 458, process 450 may blend the graphics image with one or more other graphics images to produce a blended graphics image. In some embodiments, blending may include an alpha blending of an alpha channel value for the pixels of the graphics images being blended, as described further herein. Process 450 may then proceed to block 460 to perform at least one color space conversion on the blended graphics image. In some embodiments, color space conversion may be performed on each graphics image before it is blended to produce the blended graphics image. Color space conversion may proceed as described elsewhere herein. At block 462, the process may write the blended image to memory.

At decision block 464, the process may determine whether there are more graphics images to process. If so, the process may return to block 452 and read another graphics image from memory for processing. If not, the process may return and the blended graphics image may then be composited with at least one video layer and/or other layers as shown in FIG. 4A. Thus, process 450 for blending a plurality of graphics images may be considered an iterative process for iteratively blending the plurality of graphics images. During each iteration, each graphics image to be blended is read from memory and processed (e.g. format converted and scaled), and blended into the blended graphics image. At the end of each iteration (e.g., blocks 452-462 of FIG. 4B), the blended graphics image may be stored in memory prior to the next iteration. For example, in a first iteration of the process, a first graphics image may be read and processed and saved as an initial blended graphics image. In a second iteration, a second graphics image may be read and processed and blended with the initial blended graphics image to produce a new blended graphics image. In a third iteration, a third graphics image may be read and processed and blended with the blended graphics image to produce an updated blended graphics image, and so forth. The number of iterations may correspond to the number of graphics layers (e.g. graphics images) to be blended.

In some embodiments, iterative blending of the plurality of graphics images may be provided by one or more software applications executing within VGAP 101, or more particularly within Video and Graphics Compositing Unit 221 and/or Graphics Processor 309. Such components may have sufficient processing capacity to allow for the blending and/or compositing of the plurality of graphics images in real time. For example, in a time period corresponding to the time needed to display one frame on the display device (frame time, e.g. 1/60 of a second if the display device can display 60 frames per second), the process may be configured to process multiple images or frames of graphics. In a single frame time (e.g. 1/60 of a second) a certain number of graphics images or planes or layers may be blended or composited to create a blended graphics image, where the number of graphics images that may be processed during a given frame time may depend on the amount of processing power or capacity available to the VGAP 101, Video and Graphics Compositing Unit 221 and/or Graphics Processor 309.

In some embodiments, the iterative blending of the plurality of graphics images may further include determining an order (e.g. a priority) for some or all of the graphics images, and blending the plurality of graphics images may be based on the determined order. Such an order may be a priority for layering the various graphics images, such that certain graphics images are layers on top of others or below others. For example, a graphics image with the highest priority may always be placed on top of other graphics images during the blending process. Such priority may also apply when the blended graphics image is composited with a video layer as shown in FIG. 4. In such a case, when the blended graphics image includes at least one graphics image with a high priority order, the blended graphics image may inherit the priority of the high priority graphics image and be given priority over a video layer when compositing, so that the blended graphics layer is on top of the video layer.

In some embodiments, the order may be based on priority information received from a source of the graphics. For example, a network, broadcast source, Internet source, or other graphics content source may determine that its graphics content is of high priority when the graphics provide information for an emergency situation (e.g., emergency weather, tsunami, lost child alert, or the like). The graphics source may also provide priority information that its graphics are of low priority, or any intermediate level of priority. Process 450 may receive priority information for some or all of the plurality of graphics images from their sources, and may apply certain rules to determine the overall ordering/priority of the multiple graphics images. Such rules may also operate to resolve conflicting priority requests from separate sources (e.g., when more than one source specifies that its graphics information is of the highest priority). In some embodiments, a certain content source may provide multiple graphics images, and those multiple graphics images may have the same priorities or different priorities.

Referring back to FIG. 2, the video output from the DPC 221 can be in CCIR601/656 format. In one embodiment, the two output streams are time-multiplexed on the same output channel. One of the video outputs can be configured to display all four planes (e.g., the background plane, the video plane, the graphics plane, and the cursor plane) and the other output can be configured to display either the background plane only or all the four planes as the first video output.

In one embodiment, the audio data from the input sources can be captured by the Audio Capture block 209 and stored in the attached SDRAM memory (not shown) for further processing and output. In one embodiment, up to three stereo audio streams can be played from the attached SDRAM. These are PCM coded streams written by the external CPU. The Memory Interface 213 functions as an interface between the memory unit, for example, SDRAM (not shown) and other units within the system. In one embodiment, the Memory Interface 213 supports either 16-bit or 32-bit configuration. In one embodiment, the generic Host Interface 217 supports both 16-bit and 32-bit host interface. It provides high performance access to the memory attached to the system, including a write buffer, read-ahead circuitry and support for cache line fills and writes. This allows the host CPU the option of using the memory of the display system memory as its main memory for program and data storage.

FIG. 3 illustrates a block diagram of one embodiment of the DPC 221. As shown in FIG. 3, the DPC 221 contains several functional units. Each unit may contain several blocks. The functional units as shown include the memory or DRAM interface unit (DMAX) 301, the Host Interface unit (HBOX) 305, the Graphics Processor (GRAPE) 309, the RAM Buffers (RAMB) 313, the Video and Graphics Interface (VIN) 317, and the Synchronization Unit (SYNC) 321. In one embodiment, each functional unit in the DPC 221 can operate independently of each other under a host control protocol using a set of programmable registers which contain various processing information and instructions to be used by the functional units in performing their corresponding functions.

In one embodiment, the input video and graphics data are processed through a dataflow pipeline with interlocking buffers. In one embodiment, the inputs to the pipeline can come from an off-chip dynamic memory such as an SDRAM. The global control of the DPC 221 is generated and managed by the VIN 317. In addition, the VIN 317 controls the video synchronization and the flow of data within the DPC 221. The SYNC unit 321 controls the overall video timing with respect to the video encoder device (not shown) that receives the output data from the VIN 317. The HBOX unit 305 functions as an interface between the host CPU 125 (not shown) and the DPC 221. The HBOX 305 can also function as a debugging interface to allow the Host CPU 125 to examine the content and status of the memory buffers and the programmable registers within the DPC 221. The RAMB unit 313 manages the buffering needs of the background graphics, scaled video, scaled graphics, cursor and configuration registers. The core of the RAMB 313 contains two one-port memory buffers.

The GRAPE unit 309, in one embodiment, is configured to perform various processing functions associated with the scaled graphics, which is described in detail below. In one embodiment, the GRAPE unit 309 operates in a dataflow manner with two pipelines. The first pipeline may preprocess the graphics pixels for processing by the second pipeline. The second pipeline re-scales and filters the graphics data in both vertical and horizontal directions. In one embodiment, these two pipelines can be stalled as necessary according to the rate of the pixel output.

Continuing with the present discussion, the DMAX unit 301 can receive the different input data types mentioned previously from an external memory device (not shown) such as an SDRAM. These different input data types include the background graphics data, the scaled graphics data, the scaled video data, and the cursor image data. Background graphics data, scaled video data, scaled graphics data and cursor data are input to the VIN 317 to be composited for generation of output data. Scaled graphics data are input to the GRAPE 309 for graphics processing including color lookup operation, global alpha application, RGB to YUV conversion, color or chroma keying operation, filtering, etc. The output from the GRAPE 309 is provided to the VIN 317 for composition with other input data to generate the output data. In some embodiments, GRAPE 309 may be configured to both read from and write to DMAX unit 301 to implement graphics operations, such as a process for iteratively blending multiple graphics images or planes as described further herein with regard to FIGS. 4A and 4B.

As mentioned above, the DPC 221 utilizes a set of programmable registers that contain the information and instruction used by the different functional units within the DPC 221 in performing their corresponding functions. The display configuration information specified by the content of these programmable registers include input and output selection information; synchronization selection mode; display screen location; configuration information with respect to the input data including display size and location; overlaying display arrangement (i.e., if different input images are overlapped, which image is to be on top); scaling specification; filtering specification, etc.

Figure 5:
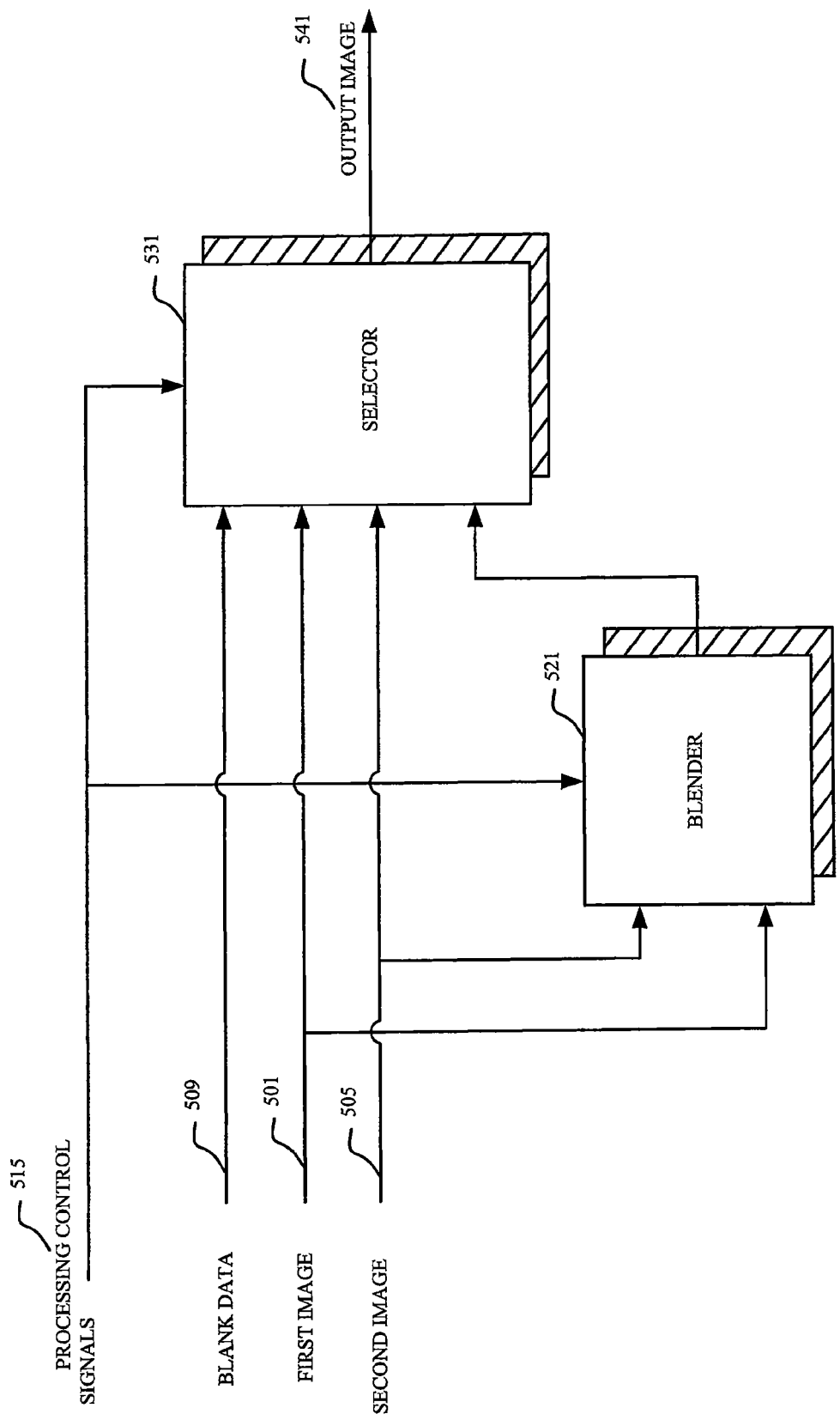
FIG. 5 shows a block diagram of one embodiment of an apparatus for generating an output image from a first image and a second image.

FIG. 5 shows a simplified block diagram of one embodiment of the VIN unit 317. The first image 501 is one of the input images that is to be displayed in the first display area on the display screen. The size and location of the first display area are determined based upon the size and the location of the first image that are specified by the user. The second image 502 is another input image that is to be displayed in the second display area on the display screen. The size and location of the second display area are determined based upon the size and the location of the second image that are specified by the user. As mentioned above, in one embodiment, the user can specify the size and display location of the various input images by programming the DPC architecture registers. Based upon a blanking selection control input, the blank data 509 can be either a predetermined constant value, output data from the VSC unit, ancillary data, a blanking signal having predetermined luma and chroma numbers, an SAV code, an EAV code, or a previous pixel of either the first image or a second image.

The processing control signals 515 can contain a signal indicating whether the display is in a blanking display mode or active display mode. As mentioned above, the display is in a blanking display mode during a horizontal blanking period or a vertical blanking period. The processing control signals also can contain a signal indicating whether the current display location at which a current output pixel is to be displayed is located within the first display area and/or the second display area. The processing control signals also can contain a signal indicating whether the first image is opaque or transparent and/or the second image is opaque or transparent. In addition, the processing control signals contains a signal indicating whether the first image or the second image is to be displayed on top of the other image if the current display location falls within both the first and the second display areas.

A current pixel of the first image 501 and a current pixel of the second image 505 are input to the blender 521. The blender 521 performs an alpha blending operation, based upon the processing control signals, with respect to the current pixels of the first and the second images to generate a blended pixel Pout according to the formula shown below:

$$Pout = Fgnd * Alpha + (1 - Alpha) * Bgnd$$

where Fgnd corresponds to the first image pixel if the first image is on top and the second image otherwise; Alpha corresponds to the first image alpha channel value if the first image is on top and second image alpha channel value otherwise; and the Bgnd corresponds to the second image if the first image is on top, otherwise it corresponds to the first image; Pout is the blended pixel of the pixels of the first and second images.

The current pixel of the first image 501, the current pixel of the second image 505, the blank data 509, and the blended pixel P 525 are input to the selector 531. The selector 531 selects either the first image pixel 501, the second image pixel 505, the blank data 515, or the blended pixel P 525 based upon the value of the processing control signals 515. Table 10 below illustrates, in one embodiment, the selections made by the selector 531 according to the processing control signals 515.

TABLE 10

| $1^{st}$ Image Active? | $2^{nd}$ Image Active? | $1^{st}$ Image Opaque? | $2^{nd}$ Image Opaque? | Which one on top? | Output |
|---|---|---|---|---|---|
| 0 | 0 | — | — | — | Blanking |
| 0 | 1 | — | — | — | $2^{nd}$ Image |
| 1 | 0 | — | — | — | $1^{st}$ Image |
| 1 | 1 | 0 | 0 | — | blend $1^{st}$ and $2^{nd}$ |
| 1 | 1 | 0 | 1 | $1^{st}$ | blend $1^{st}$ and $2^{nd}$ |
| 1 | 1 | 0 | 1 | $2^{nd}$ | $2^{nd}$ image |
| 1 | 1 | 1 | 0 | $2^{nd}$ | blend $1^{st}$ and $2^{nd}$ |
| 1 | 1 | 1 | 1 | $1^{st}$ | $1^{st}$ |
| 1 | 1 | 1 | 1 | $2^{nd}$ | $2^{nd}$ |

Figure 6:
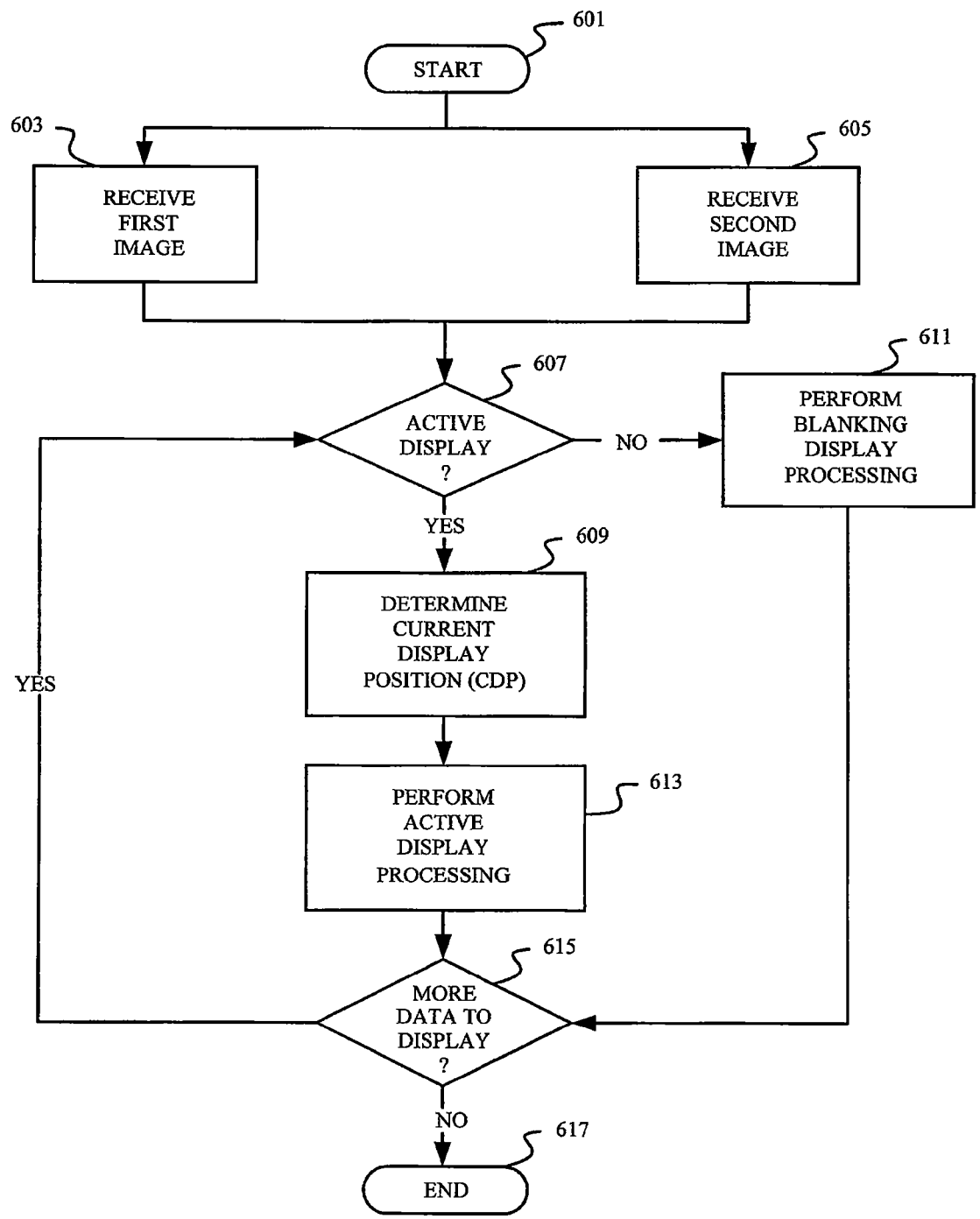
FIG. 6 shows a high level flow diagram of one embodiment of a method for generating a composite output image.

FIG. 6 shows a high level flow diagram of one embodiment of a method 600 for generating an output image.

The method 600 starts at 601. A first input image is received at 603 and a second input image is received at 605. The first image and the second image can be a background image, a video image, a graphics image, or a cursor image. In this example, it is assumed that the output image is to be displayed in an interlacing mode on a television screen. In the interlacing display mode, each image that is to be displayed can be thought of as comprising two fields of data, each field comprising a plurality of lines, each line comprising a plurality of pixels. For example, if an image to be displayed is represented by 16 pixels, that image can be logically organized into four display lines, each line having 4 pixels. The first and the third lines comprise the first field. The second and the fourth lines comprise the second field.

As mentioned previously, in the interlacing mode, the image is displayed in two passes. The first field is to be scanned first and the second field is to be scanned second. Within each field, the pixels are to be scanned and displayed sequentially according to their position within the line and the line position within the field. For example, if the first line of the first pixel contains four pixels, the first pixel of the first line is to be scanned and displayed on the screen first in its corresponding first location on the screen, the second pixel of the first line is to be scanned and displayed second in its corresponding second location on the screen, etc. The scanning and display process continues until the end of the display line is reached. The period between the end of the display line and the start of the next display line is typically referred to as the horizontal blanking period. The period between the end of the current field and the start of the next field is typically referred to as the vertical blanking period. The display is considered to be in active display area if it is not during horizontal blanking and vertical blanking periods. The blanking period can be detected using two signals H and V wherein H is used to indicate whether the display is currently in horizontal blanking and V is used to indicate whether the display is currently in vertical blanking, respectively. Another signal, F, can be used to indicate which field is current being displayed. Within the respective field, the current display location, i.e., the location on the screen corresponding to the current pixel being scanned and displayed, can be determined by using two counters. One of the counters can be used to keep track of the position of the current pixel within the current display line. The other counter can be used to keep track of which line in the current field is being scanned and displayed. Thus at any given point in time, using the three signals F, H, and V, it can be determined whether the display in is blanking mode or active display mode as well as the current display location of the display screen.

Continuing with the present example, it is determined at 607 whether the display is in active display area or in blanking display mode. As mentioned above, this determination can be made by examining the signals H and V. If the system is in blanking display mode, the method proceeds to block 611 to perform blanking display processing. If the system is in active display mode, the method proceeds to block 609. At block 609, the current display location is determined. As mentioned above, the current display location on the screen can be determined using the F signal and the horizontal pixel count and the vertical line count. After determining the current display location, the method proceeds to block 613 to perform the active display processing. At block 615, it is determined whether there are more pixel data from input images to be displayed on the screen. If there are still more pixel data from the input images to be displayed, the method loops back to block 607. Otherwise the method proceeds to end at block 617.

Figure 7:
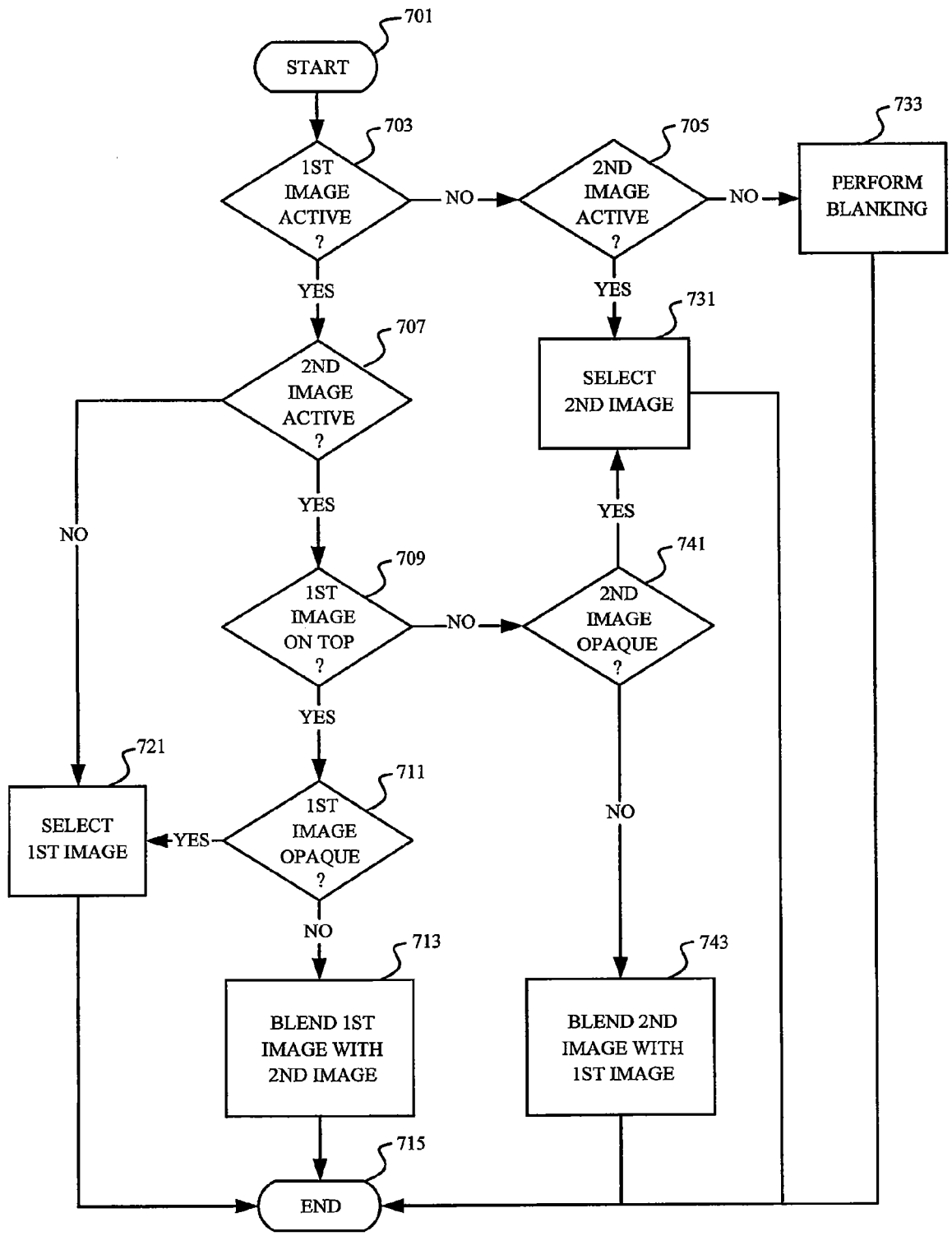
FIG. 7 is a more detailed block diagram of one embodiment of a method for generating an output image.

FIG. 7 illustrates a detailed flow diagram of one embodiment of the active display processing performed at block 613 in FIG. 6. The active display processing starts at block 701. At decision block 703, it is determined whether the first image is active at the current display location. The first image is active at the current display location if the current display location is within the first display area on the display screen which corresponds to the size and display location of the first image, as explained above. If the first image is active, the processing proceeds to decision block 707. If the first image is not active, the process proceeds to decision block 705. At decision block 705, it is determined whether the second image is active at the current display location. As mentioned above, the second image is active at the current display location if the current display location is located within the second display area on the display screen that corresponds to the size and location of the second image. If the second image is not active at the current display location, the process proceeds to block 733 to perform blanking display or some predetermined display processing to handle the case in which neither input image is active at the current display location. Referring back to decision block 705, if the second image is active, the process proceeds to block 731 to select the current pixel of the second image as the output pixel for display at the current display location.

Returning to decision block 707, the process proceeds to decision block 709 if the second image is active at the current display location and to block 721 if the second image is not active at the current display location. At block 721, the current pixel of the first image is selected as the output pixel for display at the current display location. At decision block 709, a decision is made whether the first image is to be displayed on top of the second image. This determination is necessary since at this point, the current display location is located within both the first and the second display areas corresponding to the first and the second images, respectively. As explained above, the user can specify which image is to be displayed on top of the other image if they are co-located. The process proceeds to block 711 if the first image is to be displayed on top of the second image and to block 741 otherwise. At decision block 711, the process proceeds to block 721 to select the current pixel of the first image as the output pixel for display if the first image is defined to be opaque, i.e., the second image below is not to be shown through. If the first image is not opaque, i.e., the first image is transparent, the process proceeds to block 713 to perform an alpha blending operation using the alpha blending formula shown below to produce the output pixel:

$$(Lo,Co)=(Ls,Cs)*As+(Ld,Cd)*(1-As)$$

where Lo and Co are the luma and chroma components of the output pixel, respectively; Ls and Cs are the luma and chroma components of the current pixel of the first image, respectively; As is the alpha channel associated with the current pixel of the first image; Ld and Cd are the luma and chroma components of the current pixel of the second image, respectively. While the present example assumes that the input images are represented in the YCbCr format, it should be noted that the methods and apparatuses described herein are fully applicable to any other format, for example, when input images are represented in RGB format.

Returning to FIG. 7, at decision block 709, the process proceeds to block 741 if the first image is not to be displayed on top of the second image (i.e., the second image is to be displayed on top of the first image). At decision block 741, the process proceeds to block 731 to select the current pixel of the second image as the output pixel if the second image is opaque, otherwise the process proceeds to block 743. At block 743, the current pixel of the second image is blended with the current pixel of the first image to produce the output pixel according to the formula shown below:

$$(Lo,Co)=(Ls,Cs)*As+(Ld,Cd)*(1-As)$$

where Lo and Co are the luma and chroma components of the output pixel, respectively; Ls and Cs are the luma and chroma components of the current pixel of the second image, respectively; As is the alpha channel associated with the current pixel of the second image; Ld and Cd are the luma and chroma components of the first image, respectively.

Referring back to FIG. 7, the process proceeds from either block 713, 721, 733, or 743 to end at block 715.

Figure 8:
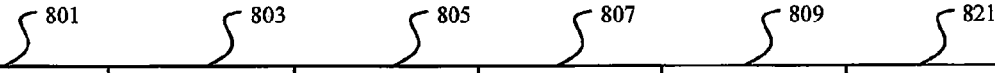
FIG. 8 shows one embodiment of an output selection table according to the method described in FIGS. 6 and 7.

FIG. 8 illustrates, in one embodiment, the different selections and actions taken to generate the output data based upon whether the first and second images are active at the current display location, whether the first and second images are transparent or opaque, and whether the first image or the second image is to be displayed on top of the other image.

Figure 9:
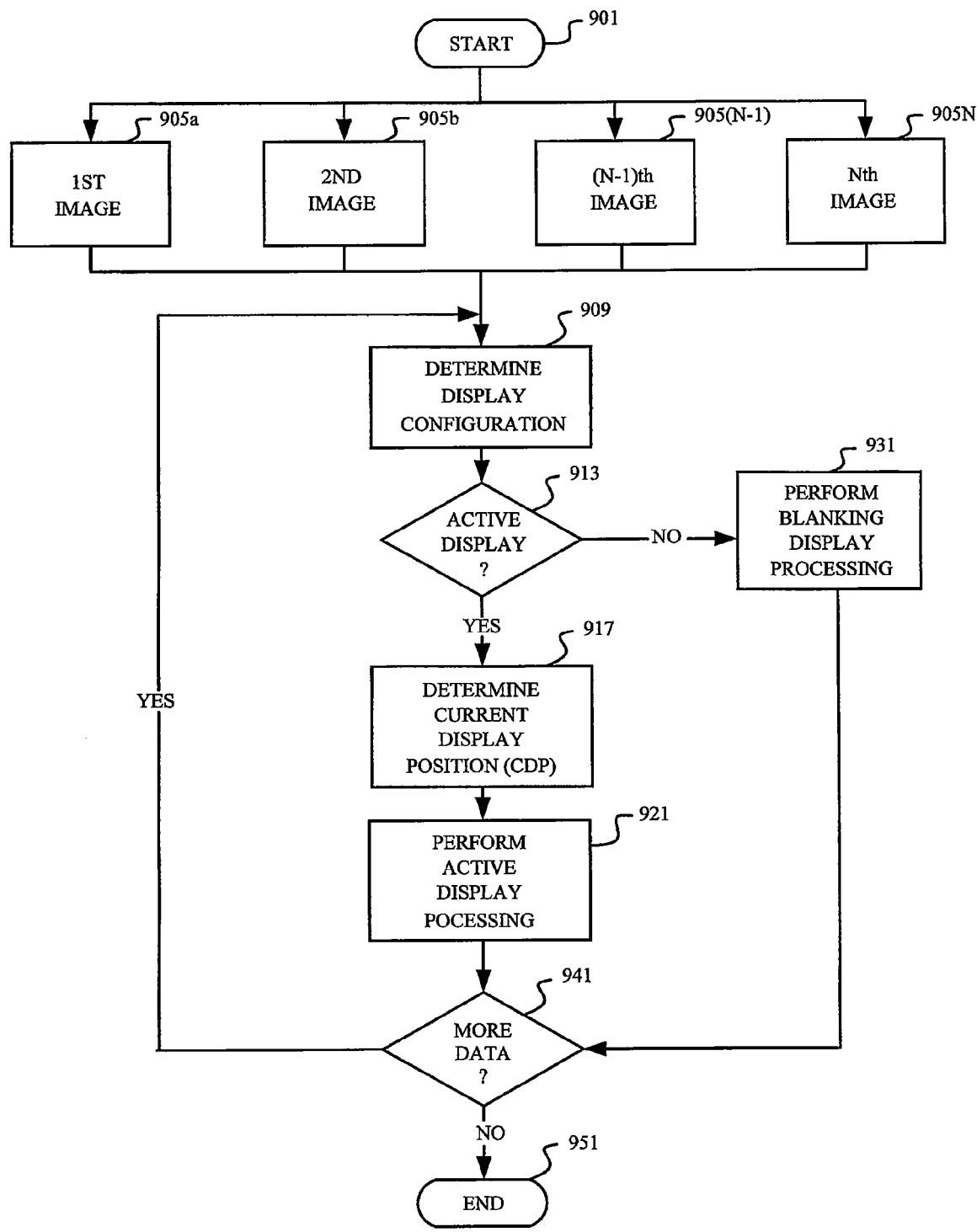
FIG. 9 shows a high-level flow diagram of one embodiment of a method for creating an output image.

FIG. 9 is a high level flow diagram of one embodiment of a method for dynamically compositing several input images to create an output image, according to another embodiment of the invention. It is again assumed that the input images are to be displayed using interlaced scanning for display on a display device such as a television screen, although it is clear that the methods described herein can equally apply to any other scanning method and display mode.

The method 900 starts at block 901. Several input images (Image 1 through Image N) are received at blocks 905(1) through 905(N), respectively. The method 900 then proceeds to block 909 where the display configuration information for each input image is determined. The display configuration of each input image, as mentioned above, can contain the size and display location of each image with respect to the display screen, the relative display order and opacity level of each input image, etc.

As mentioned previously, the relative overlaying display order (RODO) of each input image can be defined as a predetermined number indicating the overlaying position of each input image with respect to other input images when they are overlaid on the display screen. For example, when there are three input images, each of them can be given a number that corresponds to its layering position when the three images are all active at a particular display location. Assuming that the first image is to be at the bottom layer, the second image is to be on top of the first image and the third image is to be on top of the second image. In this case, some predetermined numbering system can be used to indicate such an overlaying display arrangement. For example, the first image can be given a RODO of 1 indicating that it is to be displayed at the bottom layer below other input images, the second image can be given a RODO of 2 indicating that it is to be displayed on the second layer from the bottom layer, and the third image can be given a RODO of 3 indicating that it is to be displayed on top of other images. In this example, the opacity level of each image can be defined as a number, which, is set to some particular value to indicate that the input image is totally opaque. For example, the opacity level of an input image can be set to 1 to indicate that it is completely opaque and set to some other value, e.g. 0, to indicate that it has some level of transparency. Thus, in this instance, a 1-bit number can be used to indicate whether the respective input image is totally opaque or not.

Continuing with the present example, the method 900 proceeds to decision block 913 after determining the relative overlaying display order and the opacity level of each input image. At decision block 913, the method proceeds to block 931 to perform blanking display processing if the display system is currently being in a blanking mode, otherwise the method proceeds to block 917. As mentioned above, this determination can be made using the V and H synchronization signals where V corresponds to vertical blanking and H corresponds to horizontal blanking, respectively. At block 917, the current display location is determined. After determining the current display location, the method proceeds to block 921 to perform the active display processing. At block 941, it is determined whether there are more pixel data from input images to be displayed on the screen. If there are still more pixel data from the input images to be displayed, the method loops back to block 909. Otherwise the method proceeds to end at block 951.

Figure 10:
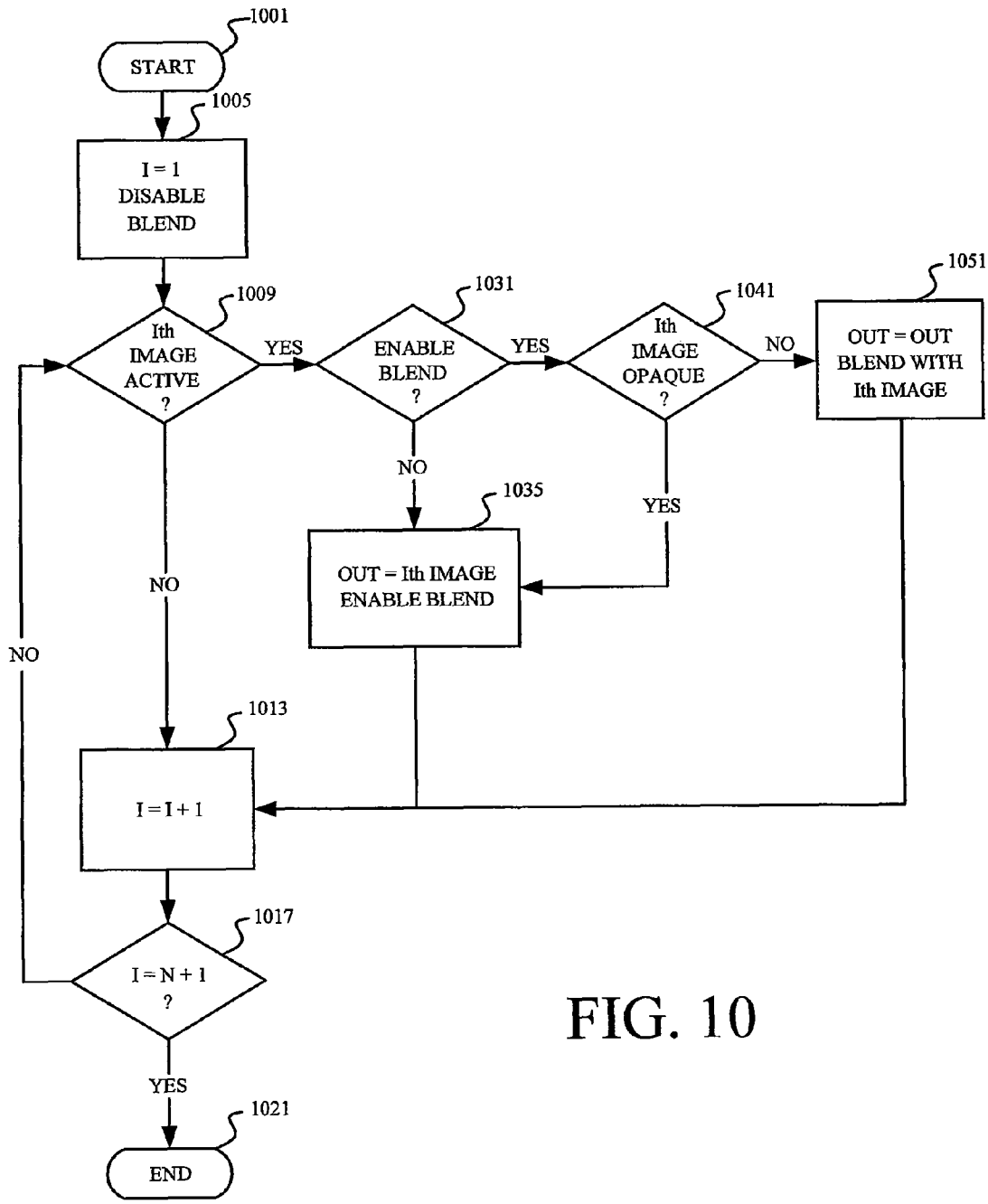
FIG. 10 shows a more detailed flow diagram of one embodiment of a method for creating an output image.

FIG. 10 shows a detailed flow diagram of one embodiment of the active display processing performed at block 921 in FIG. 9. The active display processing starts at block 1001. At block 1005, some processing variables are set to some initial values for use in the processing loop that starts at block 1009. In this present example, for clarity and simplicity, it is assumed that each and every input image is given a RODO corresponding to its layering position if all input images are to be overlaid at some display location. It is also assumed for simplicity that the input image that is to be displayed at the very bottom layer is given an RODO of 1, the input image that is to be displayed on the second layer from the bottom is given an RODO of 2 etc., and the input image that is to be displayed on top of all other input images is given an RODO of N. Hence, the variable I is set to 1 to indicate that the very first input image to be examined and processed is the input image that is to be displayed at the bottom layer with respect to all other input images. Another variable is set to indicate that the blending operation is disabled, i.e., there is nothing to blend with at this stage in the process. The use of this variable in the processing loop below will be explained in more detail. The processing loop that starts at block 1009 will examine and process each input image starting with the input image that is to be displayed at the very bottom layer.

At block 1009, it is determined whether the input image having the Ith RODO is active at the current display location. If it is, the method proceeds to block 1031, otherwise the process proceeds to block 1013. At decision block 1031, it is determined whether the blending operation is enabled, i.e., whether there is an active input image that is layered below the Ith input image currently being examined. If the blending is enabled, the process proceeds to block 1041. Otherwise the process proceeds to block 1035. At block 1035, the current pixel of the Ith image is selected as the current output pixel. At decision block 1041, it is determined whether the Ith image is opaque. As mentioned before, the input opacity level associated with each input image can be used to indicate whether the respective input image is opaque or has some level of transparency. If the Ith image is opaque, the process proceeds to block 1035 to select the current pixel of the Ith input image as the current output pixel. If the Ith image is not opaque (i.e., having some level of transparency), the current pixel of the Ith image is blended with the previous output pixel to generate the current output pixel, at block 1051. The process then proceeds from either block 1035 or block 1051 to block 1013. At block 1013, the variable I is incremented by 1 so that the image that is to be displayed on the next layer above the current Ith image will be selected for processing as the processing loop continues. The process then proceeds from block 1013 to decision block 1017 to determine whether all of the input images have been processed in the processing loop. In this case, the I variable is compared with N+1. If I equals N+I, it means that all input images have been examined and processed, the process then proceeds to end at block 1021. If I is less than N+I, the process loops back to block 1009 to process the input image that is positioned at the next overlaying position.

Figure 11:
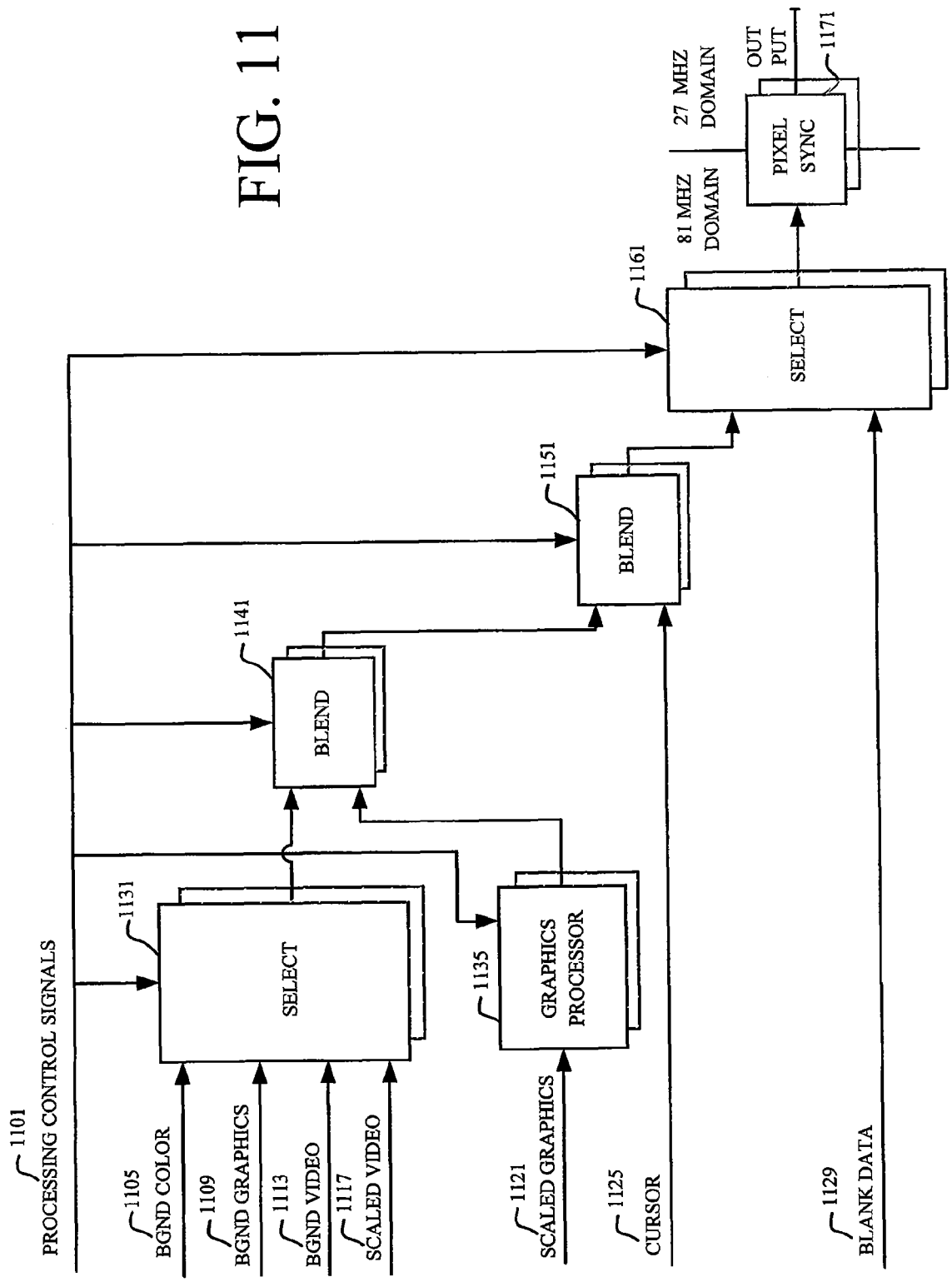
FIG. 11 illustrates a block diagram of one embodiment of an apparatus for producing an output image.

FIG. 11 shows a block diagram of one embodiment of an apparatus for generating an output image based upon several input images according to one embodiment of the invention. The background color data, background graphics data, background video data, and scaled video data are input to the selector 1131. The selector 1131 selects one of the data sources mentioned above according to the processing control signals 1101. The output of the selector 1131, also referred to as plane 1 data, is input to the first blender 1141. The scaled graphics data 1121 is input to the graphics processor 1135. The graphics processor 1135 performs various graphics processing operations on the input scaled graphics data 1121 based upon the processing control signals 1101. The functions that can be performed on the scaled graphics data 1121 include filtering, color or chroma keying, etc. The output from the graphics processor 1135 is input to the first blender 1141. Based upon the processing control, signals 1101, the blender 1141 either performing a blending operation to blend the scaled graphics data with the plane 1 data or performing a selection operation to select either the scaled graphics data or the plane 1 data. The output from the first blender 1141, also referred to as the plane 2 data, is input to the second blender 1151 for blending with the cursor data 1125. According to the processing control signals 1101, the second blender 1151 either blend the cursor data with the plane 2 data, select the plane 2 data, or select the cursor data. The output from the second blender 1151 is then input to the second selector 1161. The second selector 1161 selects, as the output data for display, either the output from the second blender 1151 or the blank data 1129, based upon the processing control signals 1101.

Figure 12:
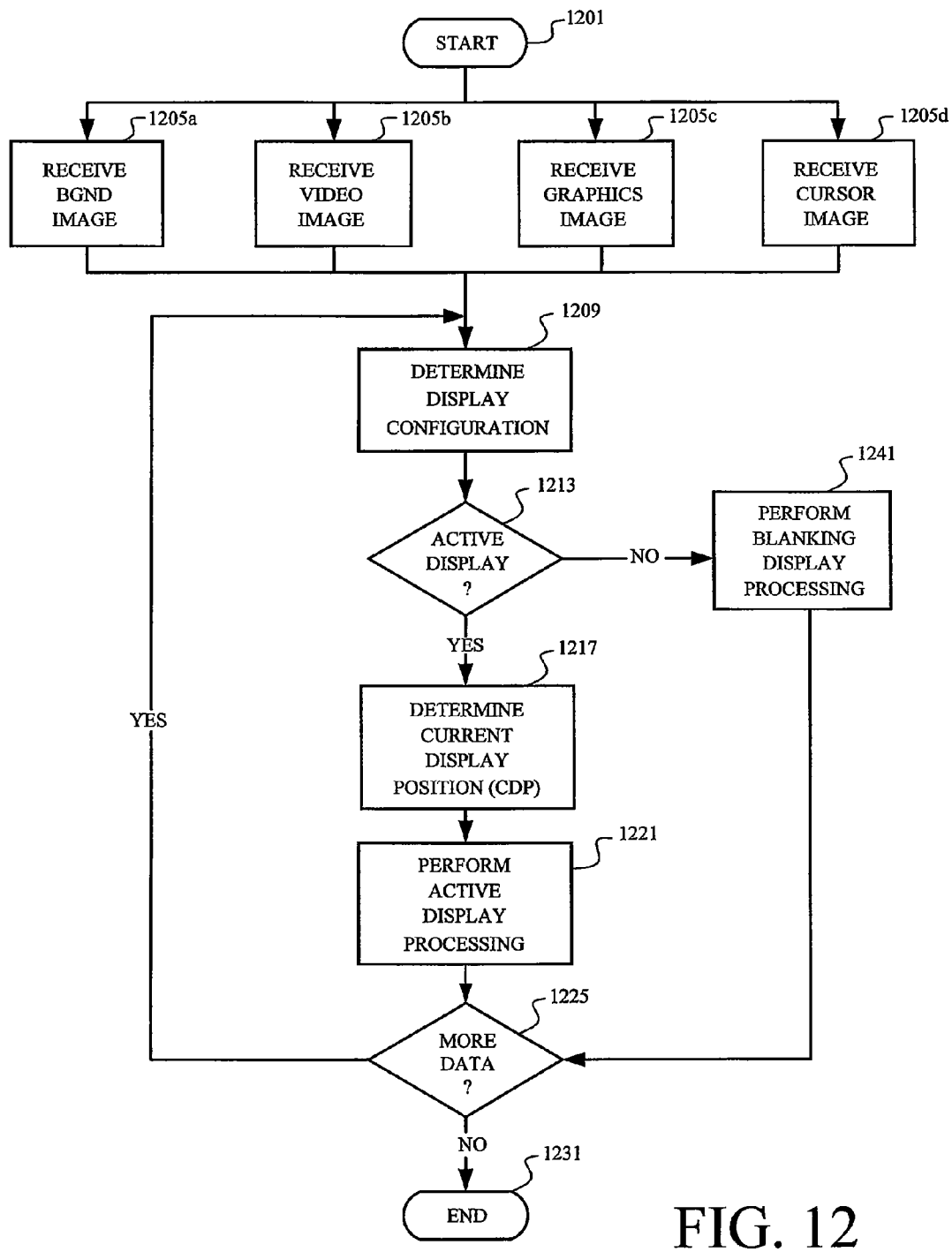
FIG. 12 illustrates a flow diagram of one embodiment of a method for generating an output image.

FIG. 12 shows a high level flow diagram of one embodiment of a method for generating an output image according to the embodiment described in FIG. 11. The method starts at 1201. The background image data, the video data, the graphics data, and the cursor data are received at blocks 1205*a*-1205*d*, respectively. Optionally, a video border and a graphics border can also be received as input sources. At 1209, the display configuration information of each input image is determined. As explained previously, the display configuration information for each input image can contain size and display location, the order in which the input images are to be overlaid, whether the input image is opaque or transparent, etc. At decision block 1213, it is determined whether the display device is in active display mode. If the display device is in active display mode, the method proceeds to block 1217, otherwise the method proceeds to block 1241. At block 1241, the blanking display processing is performed to generate blanking data as the output data. At 1217, the current display location is determined. The method then proceeds to block 1221 to perform the active display processing which is described in more detail below. At decision block 1225, the method checks to see if there are more input data to process. If there are more input data, the method loops back to block 1209. Otherwise the method proceeds to end at block 1231.

Figure 13:
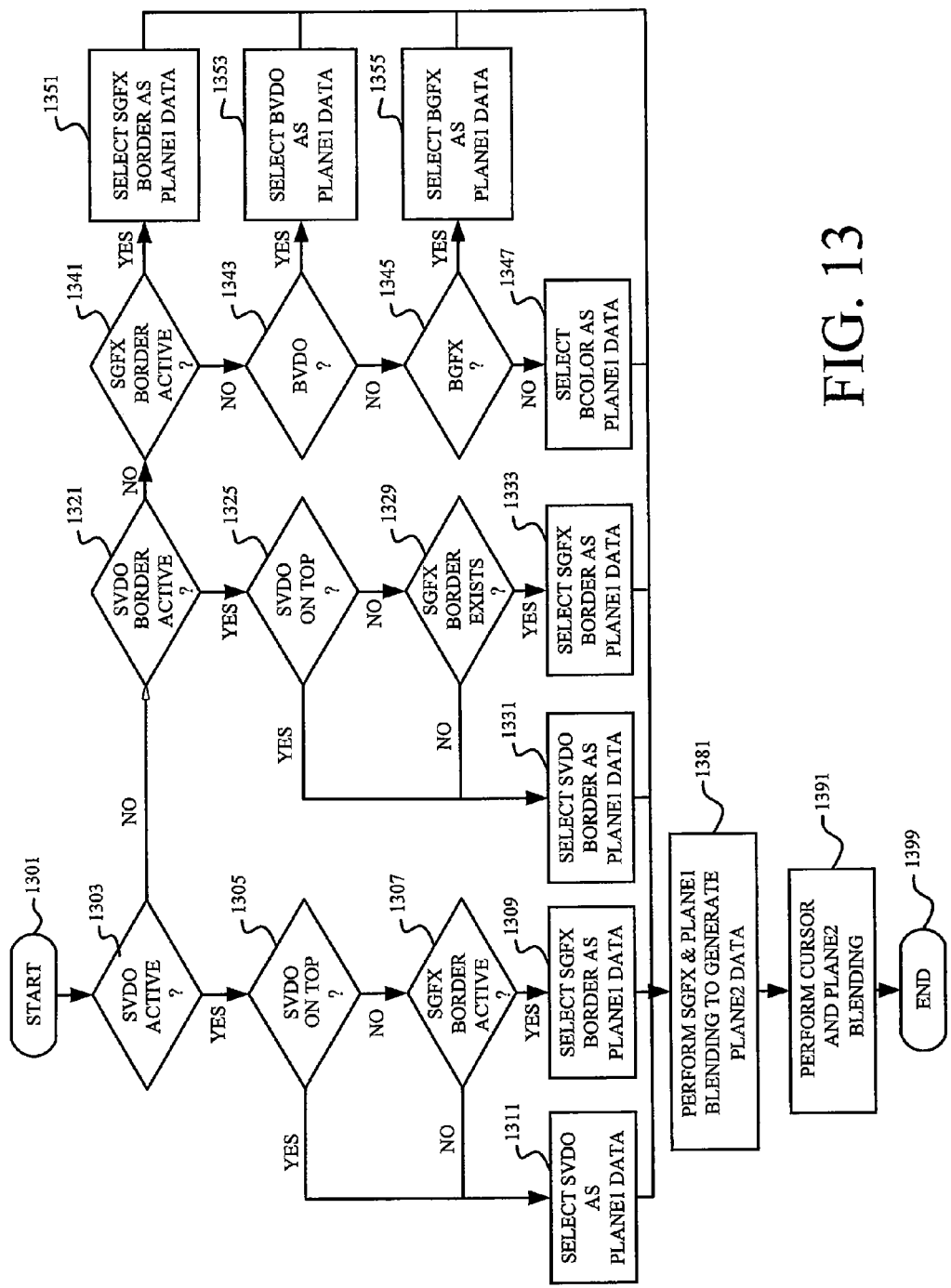
FIG. 13 is a detailed flow diagram of one embodiment of a method for generating an output image based upon a background image, a scaled video image, a scaled graphics image, and a cursor image.

FIG. 13 shows a detailed flow diagram of one embodiment of the active display processing performed at block 1221 in FIG. 12, according to one embodiment of the invention. In this example, as mentioned previously, the background image can be either a tiled graphics image, a background color, or a background video image, depending on the background image selection specified by the user. In one embodiment, the user can control what is to be displayed as the background image from the three choices mentioned by programming the DPC architecture registers accordingly. A video border surrounding that scaled video image and a graphics border surrounding the scaled graphics image can also be optionally included as the input images if the user so chooses.

In this example, the background image is opaque and to be displayed at the bottom layer. The scaled video image is also opaque and to be displayed on top of the background image. The scaled graphics image can be opaque or transparent. The scaled graphics image is to be displayed on top of the background image and can be either on top or beneath the scale video image. Lastly, the cursor image can be either opaque or transparent and is positioned on top of all other input images.

The active display processing starts at block 1301. At decision block 1303, it is determined whether the scaled video image is active at the current display location. If the scaled video image is active at the current display location, the process proceeds to block 1305, otherwise the process proceeds to block 1321. At decision block 1305, the process proceeds to block 1311 if the display configuration information indicates that the scaled video image is to be placed on top. Otherwise, the process proceeds to block 1307. The current pixel of the scaled video is selected as the plane 1 data at block 1311. At decision block 1307, the process proceeds to block 1309 if the graphics border is active at the current display location, otherwise the process proceeds to block 1311. At block 1309, the current pixel of the graphics border is selected as the plane 1 data.

Referring back to decision block 1321, the process proceeds to block 1325 if the video border is active at the current display location. Otherwise, the process proceeds to block 1341. At decision block 1325, the process proceeds to block 1331 if scaled video data is to be placed on top of graphics data, otherwise the process proceeds to block 1329. At decision block 1329 the process proceeds to block 1333 to select the current pixel of the graphics border as the plane 1 data. At 1331, the current pixel of the video border is selected as plane 1 data.

Referring back to decision block 1341, it is determined whether the graphics border is active at the current display location. If so, the process proceeds to select the current pixel of the graphics border as plane 1 data; at block 1351. Otherwise, the process proceeds to block 1343. At decision block 1343, the process proceeds to select the current pixel of the background video image as the plane 1 data if background video is enabled. Otherwise, the process proceeds to block 1345. At decision block 1345, the process proceeds to block 1355 to select the current pixel of the background graphics image as the plane 1 data if background graphics is enabled. Otherwise the process proceeds to block 1347 to select the current pixel of the background color as plane 1 data.

The process then proceeds from either block 1311, block 1309, block 1331, block 1333, block 1347, block 1351, block 1353, or block 1355 to block 1381. At block 1381, scaled graphics data is blended with plane 1 data to generate plane 2 data, which is described in more detail below. The process then proceeds to block 1391 to perform cursor blending operation. The active display processing is ended at block 1399.

Figure 14:
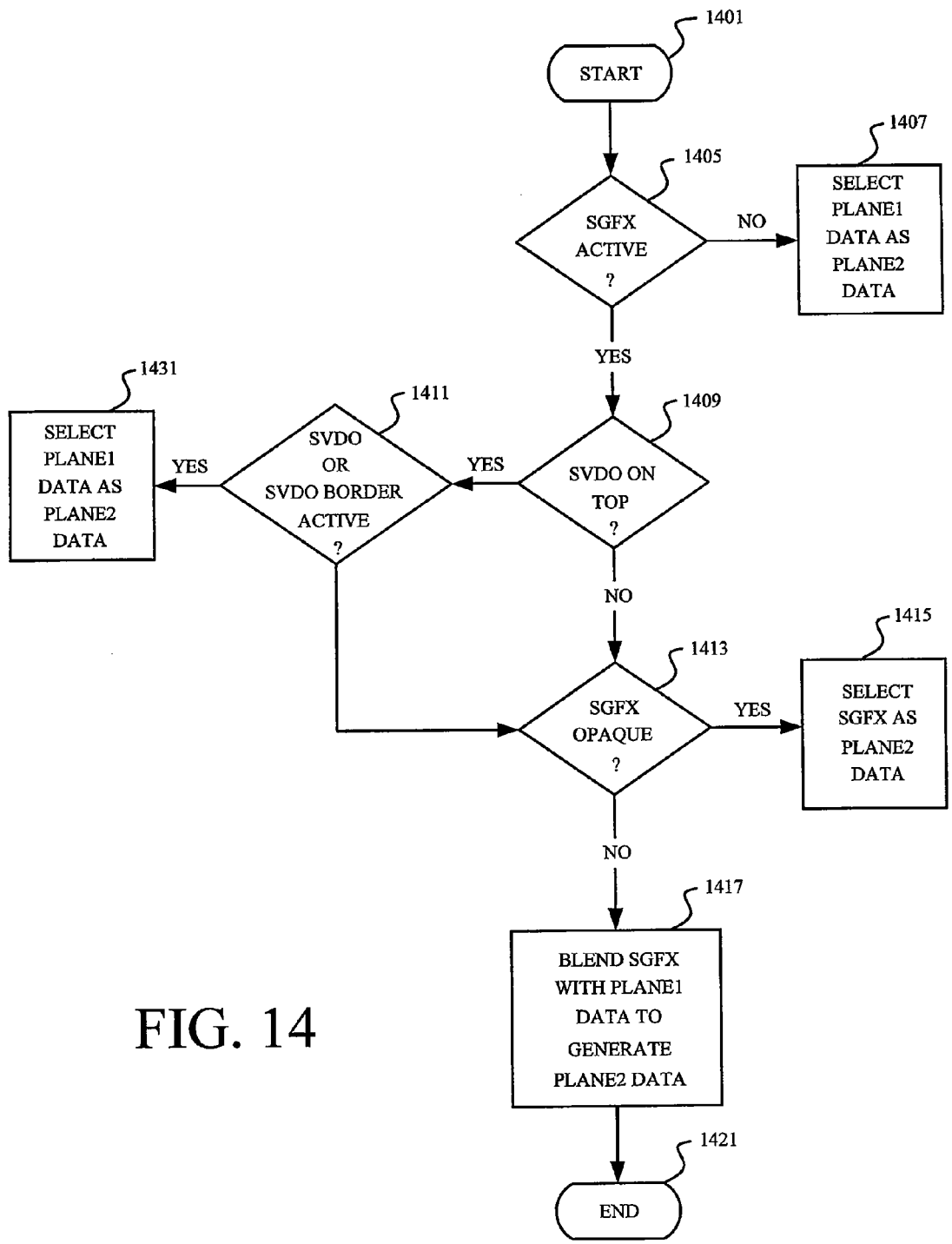
FIG. 14 is a flow diagram of one embodiment of a method for blending scaled graphics data with other data.

FIG. 14 shows a detailed flow diagram of one embodiment of the scaled graphics blending process performed at block 1381 in FIG. 13. The process starts at block 1401. At decision block 1405, the process proceeds to block 1409 if the scaled video image is active at the current display location. Otherwise, the process proceeds to block 1407. At block 1407, plane 1 data is selected as plane 2 data since there is no scaled graphics data active at the current display location. At decision block 1409, it is determined whether the scaled video data is to be displayed on top of the scaled graphics data. If so, the process proceeds to block 1411, otherwise the process proceeds to block 1413. At decision block 1411, the process proceeds to block 1431 to select plane 1 data as plane 2 data if the scaled video image is active at the current display location. If the scaled video image is not active, the process proceeds to block 1413. At decision block 1413, it is determined whether the scaled graphics image being processed is opaque. If the scaled graphics image is opaque, the process proceeds to block 1415 to select the current pixel of the scaled graphics image as plane 2 data. Otherwise, the process proceeds to block 1417. At block 1417, the current pixel of the scaled graphics image is blended with the current pixel of the plane 1 data as follows:

$$(L2, C2) = (Lg, Cg)*Ag + (L1, C1)*(1-Ag)$$

where L2, C2 are the luma and chroma components of the plane 2 data; Lg, Cg are the luma and chroma components of the current pixel of the scaled graphics image; L1, C1 are the luma and chroma components of the plane 1 pixel; and Ag is the alpha channel value of the current pixel of the scaled graphics image.

The process then proceeds to end at block 1421.

Figure 15:
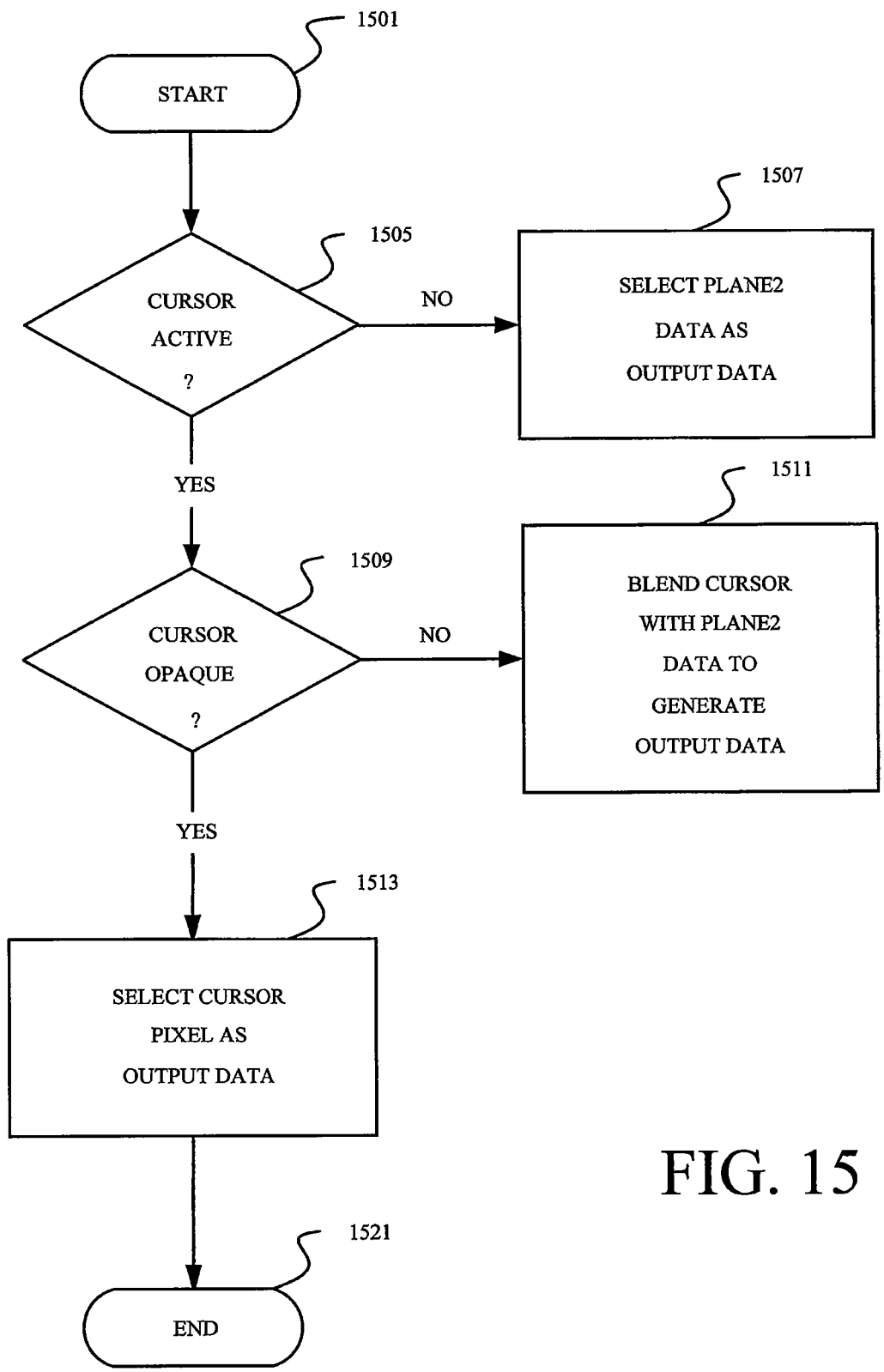
FIG. 15 shows a flow diagram of one embodiment of a method for blending cursor data with other data.

FIG. 15 shows a more detailed flow diagram of one embodiment of the cursor blending process performed at block 1391 in FIG. 13. The process starts at block 1501. At decision block 1505, if the cursor image is active at the current display location, then the process proceeds to block 1509. Otherwise the process proceeds to block 1507. At block 1507, the plane 2 pixel data is selected as the output pixel.

At block 1509, it is determined whether the cursor image is opaque. If so, the process proceeds to block 1511 to select the current pixel of the cursor image as the output pixel. Otherwise, the process proceeds to block 1513 to blend the current pixel of the cursor image with the planet data obtained earlier to produce to output pixel for display at the current display location as follows:

$$(Lo, Co) = (Lc, Cc)*Ac + (L2, C2)*(1-Ac)$$

where Lo, Co are the luma and chroma components of the output pixel, respectively; Lc, Cc are the luma and chroma components of the cursor image, respectively; L2, C2 are the luma and chroma components of the plane 2 pixel; and Ac is the alpha channel value associated with the current pixel of the cursor image.

The process then proceeds to end at 1521.

FIG. 16 shows, in one embodiment, a selection table according to the method described in FIGS. 13, 14, and 15. Column 1621 of the table outlines the specific choices or actions to be performed to produce the output pixel based upon the configuration and conditions of the various input images. A value of 1 in those columns 1601-1613 indicates that the condition is satisfied, a value of 0 indicates otherwise. As shown in the table, there are several different combinations of these conditions that need to be examined according to a predetermined scheme to decide how to process the different input images to produce the output image.

Figure 17:
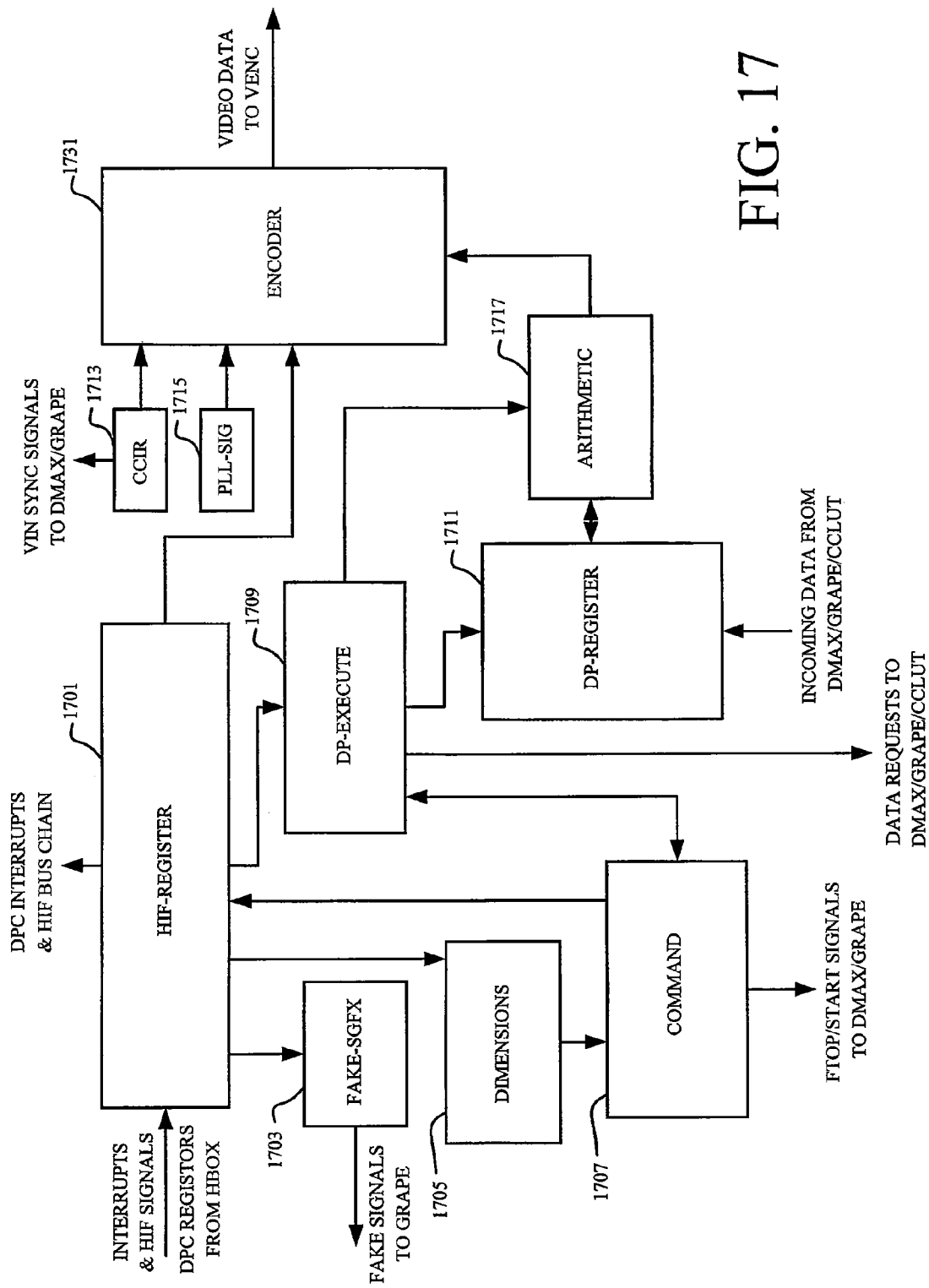
FIG. 17 shows a block diagram of one embodiment of an image compositing system.

FIG. 17 shows a block diagram of one embodiment of the VIN 317. The Host Interface Register Unit (HIF-REGISTER) 1701 receives the interrupts, host interface (HIF) signals, and display configuration information from the DPC architecture registers and provides the relevant display configuration information to other units within the VIN 317. As mentioned above, the DPC architecture registers contain the display configuration information relating to input/output selection modes, input/output enables, display size, display location, and other display specification defined by the user. In one embodiment, some of the DPC architecture registers can be located within the HIF-REGISTER unit 401. These registers include the DPC_STATUS, the DPC_INT_STAT, and the DPC_DISP_COUNT registers. In one embodiment, the DPC_STATUS register contains several bits that are set or reset accordingly to indicate which field of the composite video data is currently being displayed on the display screen; the current display location of the display screen; whether the display is in active display region or in a blanking state; whether there are currently sufficient scaled graphics, scaled video, and background graphics data in the memory buffers for processing in the current display processing cycles. The DPC_INT_STAT register contains the interrupt status. The various interrupt conditions include synchronization loss in video interface, video synchronization is acquired after loss-of-sync, horizontal sync count (DPC_FIELD_COUNT) reaches zero, vertical sync count (DPC_LINE_COUNT) reaches zero, etc. The DPC_DISP_COUNT register contains user-programmable counters of line and field displayed.

The DIMENSIONS block 1705 and the COMMAND block 1707 together form the main control unit of the VIN 317. The DIMENSIONS block 1705, based upon the information received from the HIF-REGISTER block 1701, performs the window placement calculations for the scaled graphics image, the cursor image, the scaled video image, the scaled video border and the scaled graphics border. The window placement calculation for each image is performed based upon the size and display location of each image with respect to the display screen. The size and display location of each image, as mentioned previously, can be specified by the user using the DPC architecture registers. For example, the DIMENSIONS block 1705 can determine where the scaled video image is to be placed on the display screen using the DPC_SVDO_SIZE register which specifies the width of the SVDO window in pixels and the height of the SVDO window in progressive lines in conjunction with the DPC_SVDO_POS register which specifies the starting horizontal and vertical positions of the scaled video region of interest.

Referring back to FIG. 17, the COMMAND block 1707 generates global control signals and display processing instruction to be used by other blocks within the VIN 317 as well as other units within the DPC 221, based upon the information received from the HIP-REGISTER 1701, the DIMENSIONS block 1705, and the DP-EXECUTE block 1709. The COMMAND block 1707 first determines whether the display system is in vertical blanking or horizontal blanking based on the CCIR601 synchronization signals stored in the DPC_STATUS register. If the display system is in a blanking mode, the COMMAND block 1707 then determines whether EAV/SAV codes or ancillary data, etc. should be generated. If the display system is not in blanking mode, then the COMMAND block 1707 determines, at each pixel location on the display screen, what is to be displayed based upon several different factors. These factors, as mentioned above, include the current display location on the display screen; the size and display location of each input image; the relative overlaying display order of each of the input image; and whether each of the input images is opaque or transparent, etc.

Using the different factors mentioned above, the COMMAND block 1707 then generates a display processing instruction set which is used by the DP-EXECUTE block 1709 to perform its corresponding function. The display processing instruction set, in one embodiment, can logically contain 5 different fields or parameters that specify, at each pixel on the display screen, what is to be displayed. More particularly, these different parameters in the display processing instruction set can be set to some predetermined values to indicate to the DP-EXECUTE block 1709 the specific selections or blending operations that need to take place in order to generate the output data for display. One example of these parameters used in the display processing instruction set and their settings according to the various display scenarios are shown below:

PASS-BLEND:
    PASS: Bypass datapath, for blanking or pixel duplication
    BLEND: System is in active display mode, selection and/or blending to be performed
    PASS-VAL: To be used when the PASS-BLEND is set to PASS value
    PASS-ZERO: Constant value to be generated for idle states
    PASS-DATA: VSC data or ancillary data to be generated
    PASS-BLANK: Blanking signal to be generated
    PASS-CCIR: SAV/EAV code to be generated
    PASS-PREVIOUS: Previous pixel to be generated
PLANE1-VAL: To be used when the PASS-BLEND is set to BLEND value
    P1-PASS: Plane1 data is covered by opaque SGFX data, therefore no blending with plane1 data is necessary
    P1-SGFX-BORDER: SGFX border data is to be selected as plane1 data
    P1-SVDO: Scaled video data to be selected as plane1 data
    P1-SVDO-BORDER: SVDO border data to be selected as plane1 data
    P1-BVDO: Background video data to be selected as plane1 data
    P1-BGFX: Background tiled graphics data to be selected as plane1 data
    P1-BG-COLOR: Background color data to be selected as plane1 data
PLANE2-DATA:
    P2-PASS: Plane1 data to be selected as plane2 data since there is no scaled graphics data active at the current display location or it is covered by SVDO data
    P2-BLEND: Blend scaled graphics data with plane1 data (alpha blending on a per-pixel basis) to generate plane2 data
PLANE3-DATA:
    P3-PASS: Plane2 data to be selected as output data since there is no cursor active at the current display location P3-BLEND: Blend cursor data with plane2 data (alpha blending on a per-pixel basis) to generate the output data A more detailed description of how the COMMAND block 1707 generates the display processing instruction set based upon the display 5 configuration of each input image and the current display state is provided below.

Referring back to FIG. 17, the DP-EXECUTE block 1709 is the main state machine that processes the input data in a controlled pipeline manner to generate the output data. The DP-EXECUTE block 1709 generates specific control signals to the DP-REGISTER block 1711 and the ARITHMETIC block 1717 based upon the display processing instruction set generated by the COMMAND block 1707. As mentioned above, the input data from different input sources are to be processed in a controlled pipeline fashion according to a predetermined data execution scheme.

Figure 18:
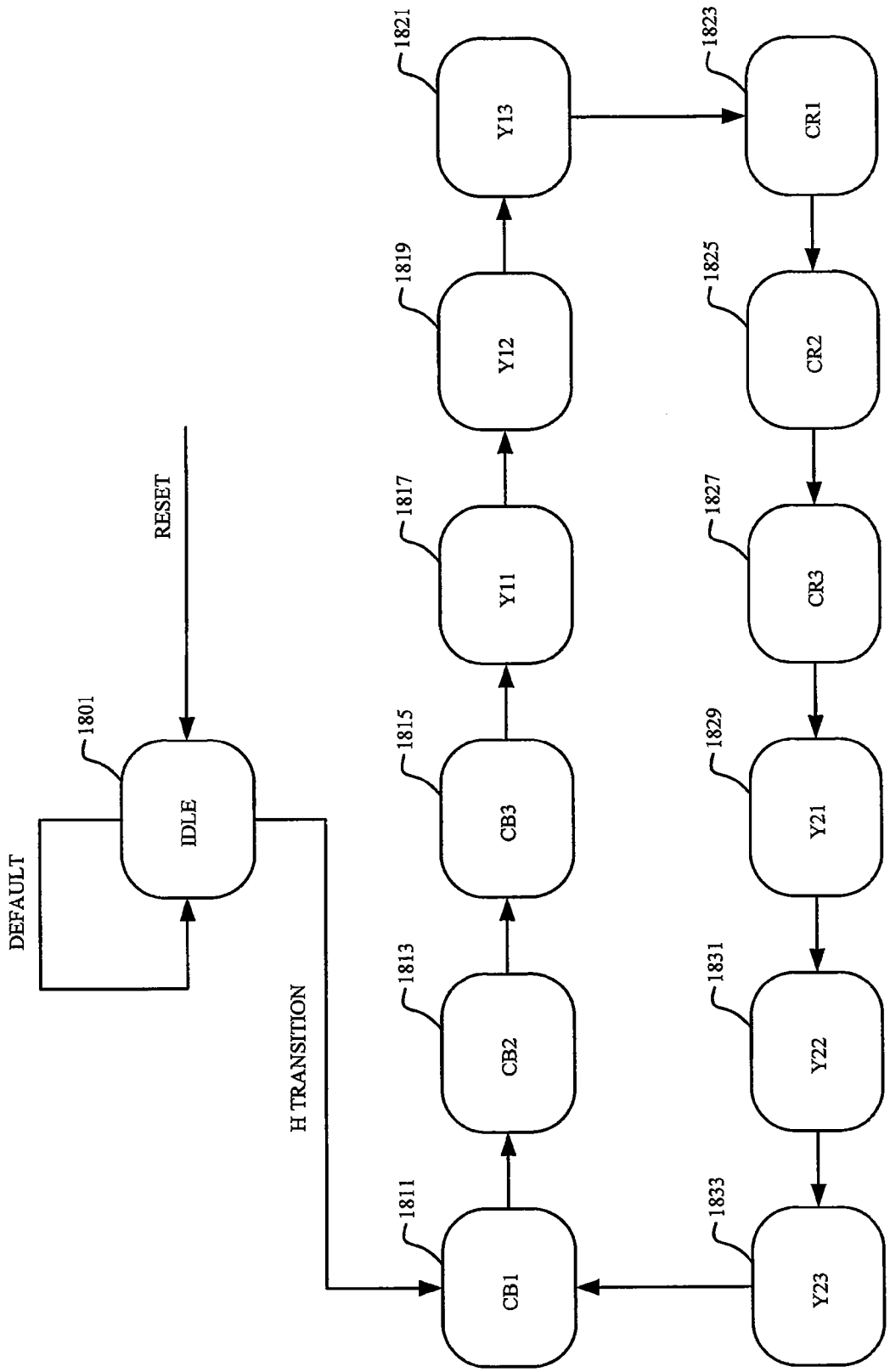
FIG. 18 shows one embodiment of a state machine for image compositing.

FIG. 18 shows one embodiment of a state machine used to control the processing of the input data through the pipeline. In this example, the state machine has 12 states plus an IDLE state upon reset, corresponding to the input background video data: CB1, CB2, CB3, Y11, Y12, etc. Any transition of the H signal will synchronously reset the state back to CB1. The state machine repeats as soon as it is done. In this example, the different operations or functions to be performed with respect to the input data to generate the output data are scheduled according to a predetermined plan corresponding to the state machine shown in FIG. 18. The PASS-BLEND and PASS-VAL instructions are read in state CB1, and the blending instructions are read in state CB2. The instruction set generated by the COMMAND block 1707 can be overridden by the DP-EXECUTE 1709 under some predetermined circumstances, for example, when the underflow condition occurs. When this happens, the instruction is set to PASS/PASS-PREVIOUS by the DP-EXECUTE block 1709 to generate a duplicate of the previous pixel of the input data source that causes the underflow condition. As mentioned above, the underflow conditions can be detected by examining the DPC registers values that are provided from the HIF-REGISTER block 1701.

Referring back to FIG. 17, the DP-REGISTER block 1771, in one embodiment, can be used to store all intermediate data that are used by the ARITHMETIC block 1717. In general, DP-REGISTER stores the current scaled graphics data that is needed in the current processing phase; plane1 data (either the background video data, the background graphics data, scaled video data, scaled video border, scaled graphics border, or background color data); and cursor data. The DP-REGISTER 1711 also contains the effective alpha value used for blending operations, all intermediate results, and previous pixel values (used for pixel duplication in case of underflow conditions). As discussed above, the different operations or functions performed with respect to the input data are done in stages according to the state machine shown in FIG. 18.

In one embodiment, SGFX, Plane1, and cursor data are stored as sets of components, so each component can be processed separately by the appropriate select signal. Similarly, in this embodiment, SGFX and cursor data have two alpha channels, each can be selected separately.

Continuing with the present discussion, the ARITHMETIC block 1717 performs various operations including global alpha operation for scaled graphics data, contrast multiplication for the luma component of scaled graphics data, biasing for SGFX data; SGFX/Plane1 blending; Cursor/Plane2 blending, etc. The sequencing of these various operations is controlled by the DP-EXECUTE block 1709, as explained above. In this embodiment, the following set of operations are performed in different stages based upon the control and select signals generated by the DP-EXECUTE block 1709:

1. SGFX global alpha operation in which the appropriate global alpha value for the scaled graphics data is computed. Based upon the appropriate select signal from DP-EXECUTE, the YCC components of the SGFX data is either multiplied by 1, a local alpha value, or a global alpha value.
2. SGFX contrast multiplication: this operation is performed for the luma component only.
3. SGFX biasing (saturated):
   Chroma: 128 (normal), 128*local alpha (pre-multiplied)
   Luma: 16 (normal), 16*local alpha (pre-multiplied).
      Brightness is also added in both cases.
4. SGFX/Plane 1 blend (saturated for pre-multiplied only)
   Luma
      Normal: Cv+(Cg−Cv)*alpha
      Pre-multiplied: Cg+(1−alpha)*Cv
   Chroma:
      Normal, SGFX (color), Plane 1 (color)
         Cv+(Cg−Cv)*alpha
      Normal, SGFX (BW), Plane 1 (color)
         Cv+(128−Cv)*alpha
      Normal, SGFX (color), Plane 1 (BW)
         128+(Cg−128)*alpha
      Normal, SGFX (BW), Plane 1 (BW)
         128
      Pre-multiplied, SGFX (color), Plane 1 (color)
         Cg+(1−alpha)*Cv
      Pre-multiplied, SGFX (BW), Plane 1 (color)
         alpha+(1−alpha)*Cv
      Pre-multiplied, SGFX (color), Plane 1 (BW)
         Cg+(1−alpha)*128
      Pre-multiplied, SGFX (BW), Plane 1 (BW)
         128
5. Cursor/Plane 2 blend
   Cp+(Cc−Cp)*alpha In the above equations/operations, Cv is referred to the component of the plane 1 pixel, either the chroma or luma component as indicated respectively; Cg represents the luma or chroma component of the scaled graphics pixel, as indicated; Cp is the luma or chroma component of the plane 2 pixel data; and Cc is the luma or chroma component of the cursor pixel.

Figure 19:
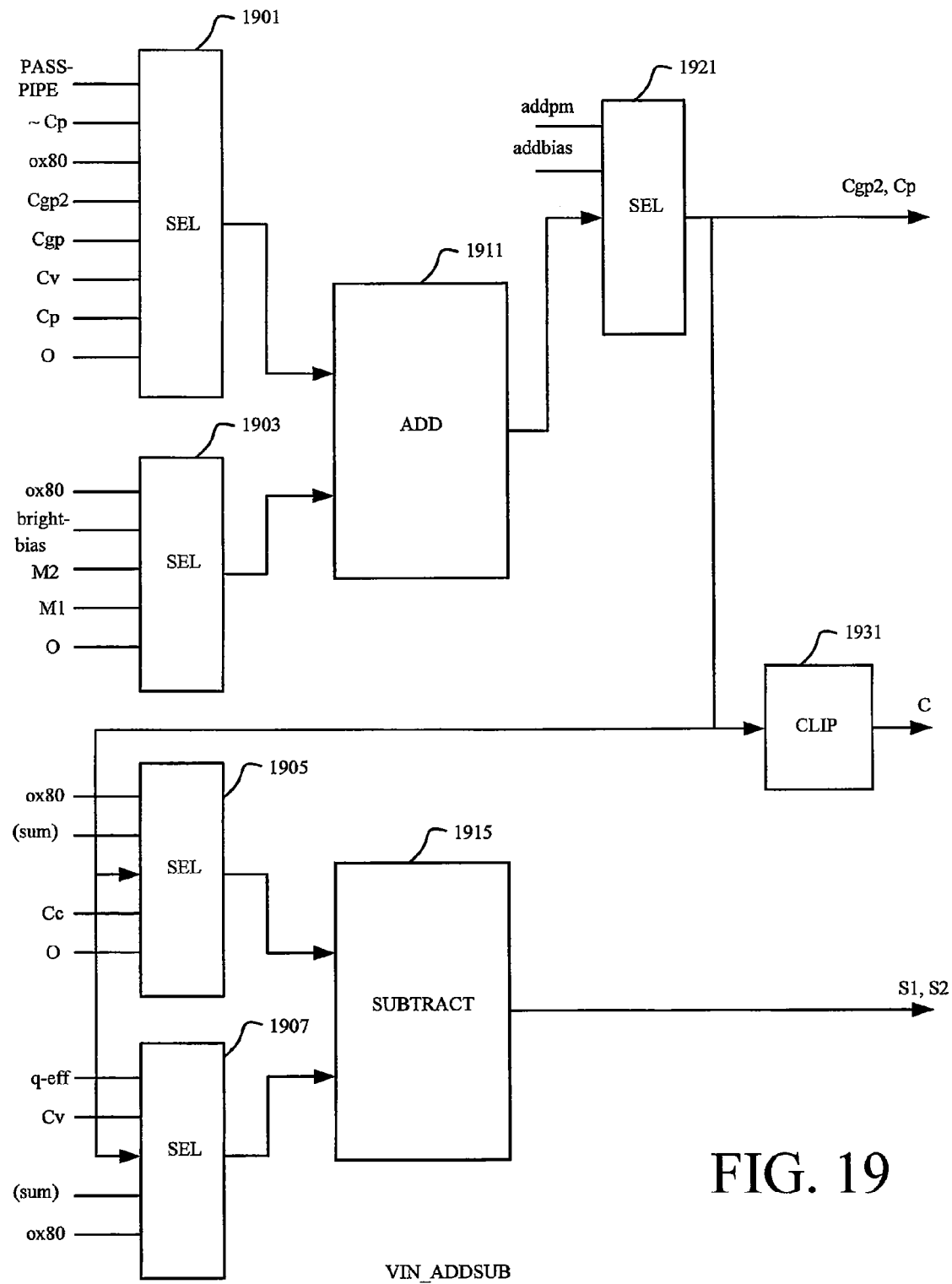
FIG. 19 shows one embodiment of an apparatus used in compositing an output image.
Figure 20:
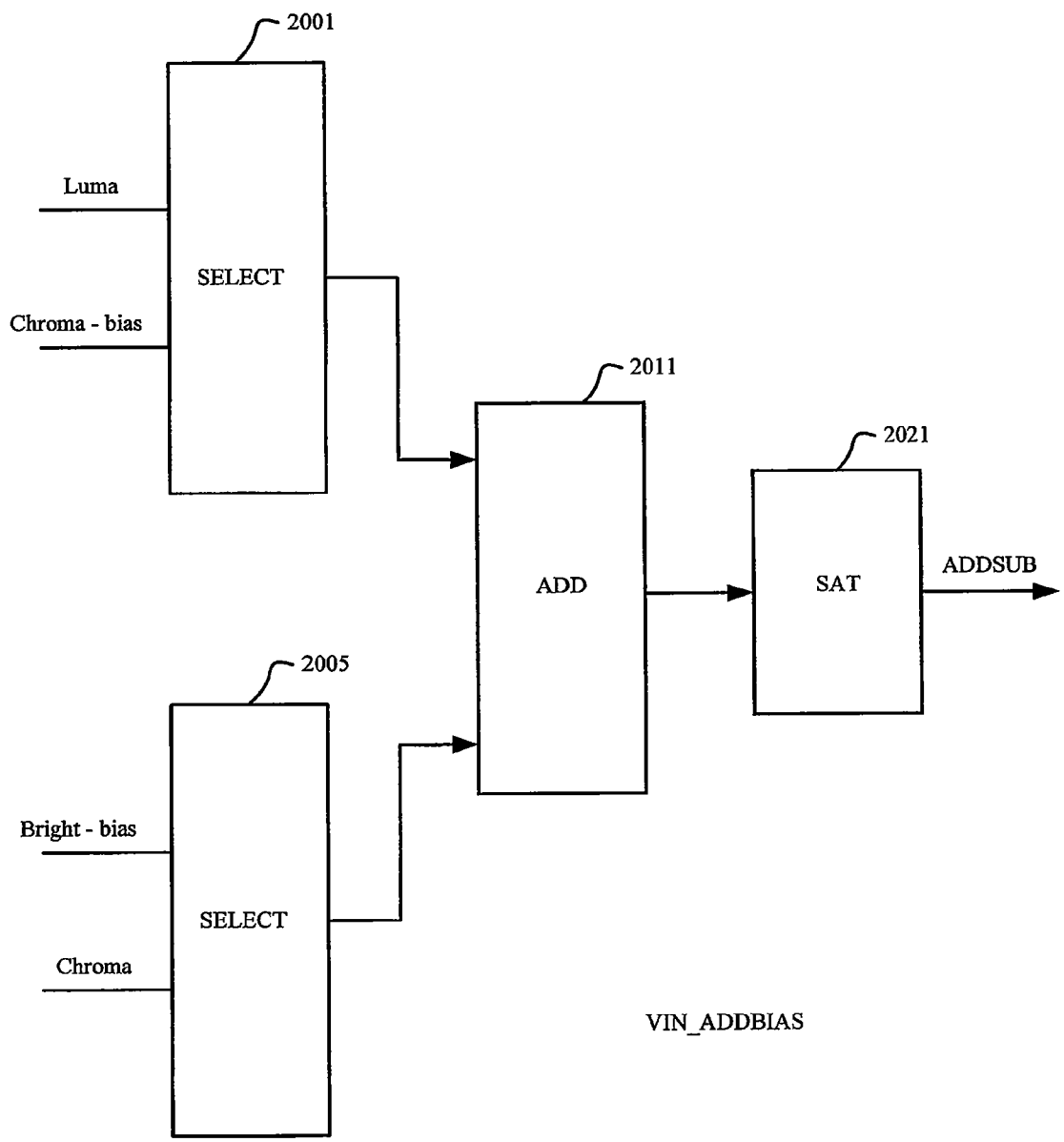
FIG. 20 shows one embodiment of an apparatus used in compositing an output image.
Figure 21:
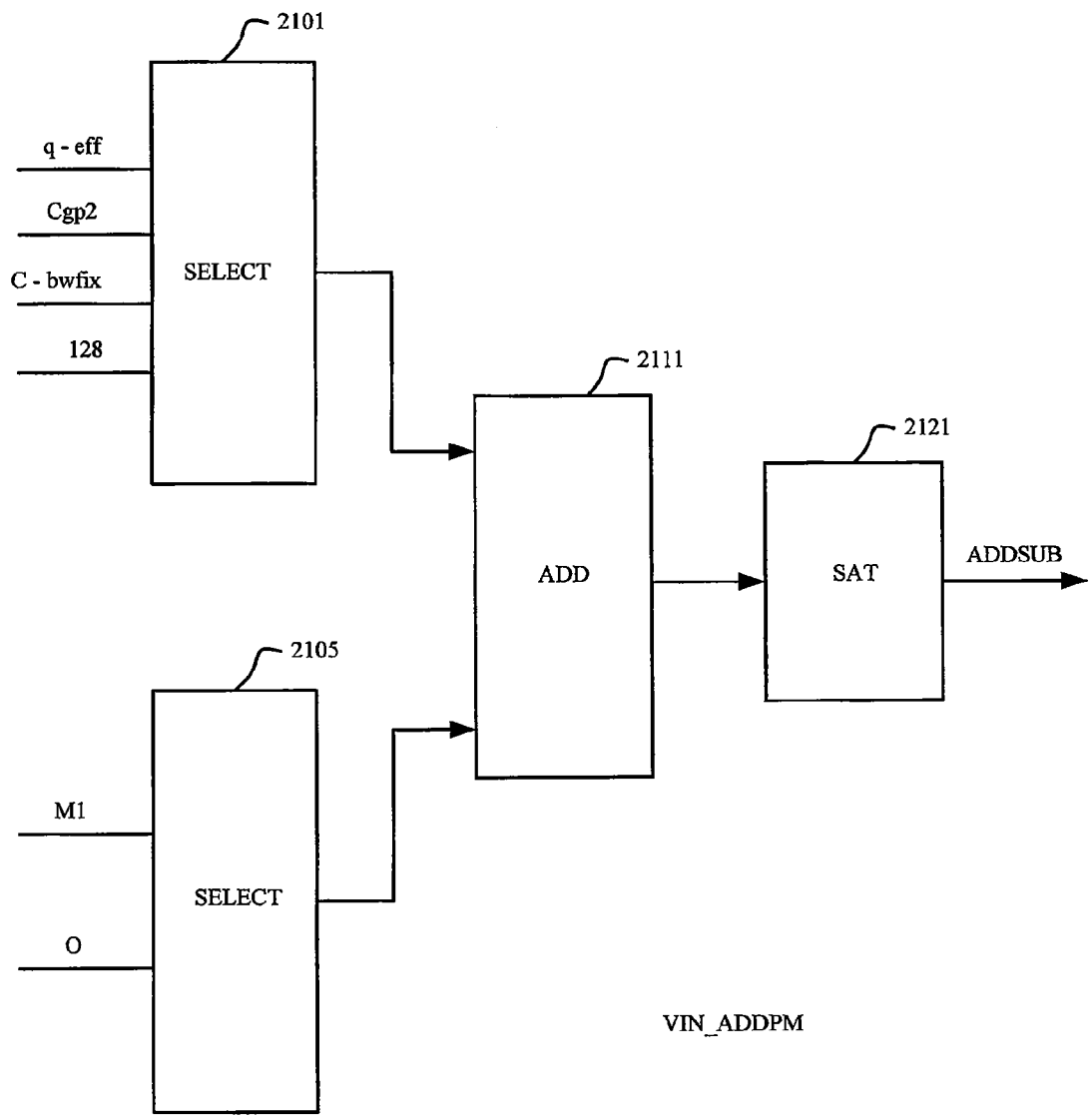
FIG. 21 shows one embodiment of an apparatus used in compositing an output image.
Figure 22:
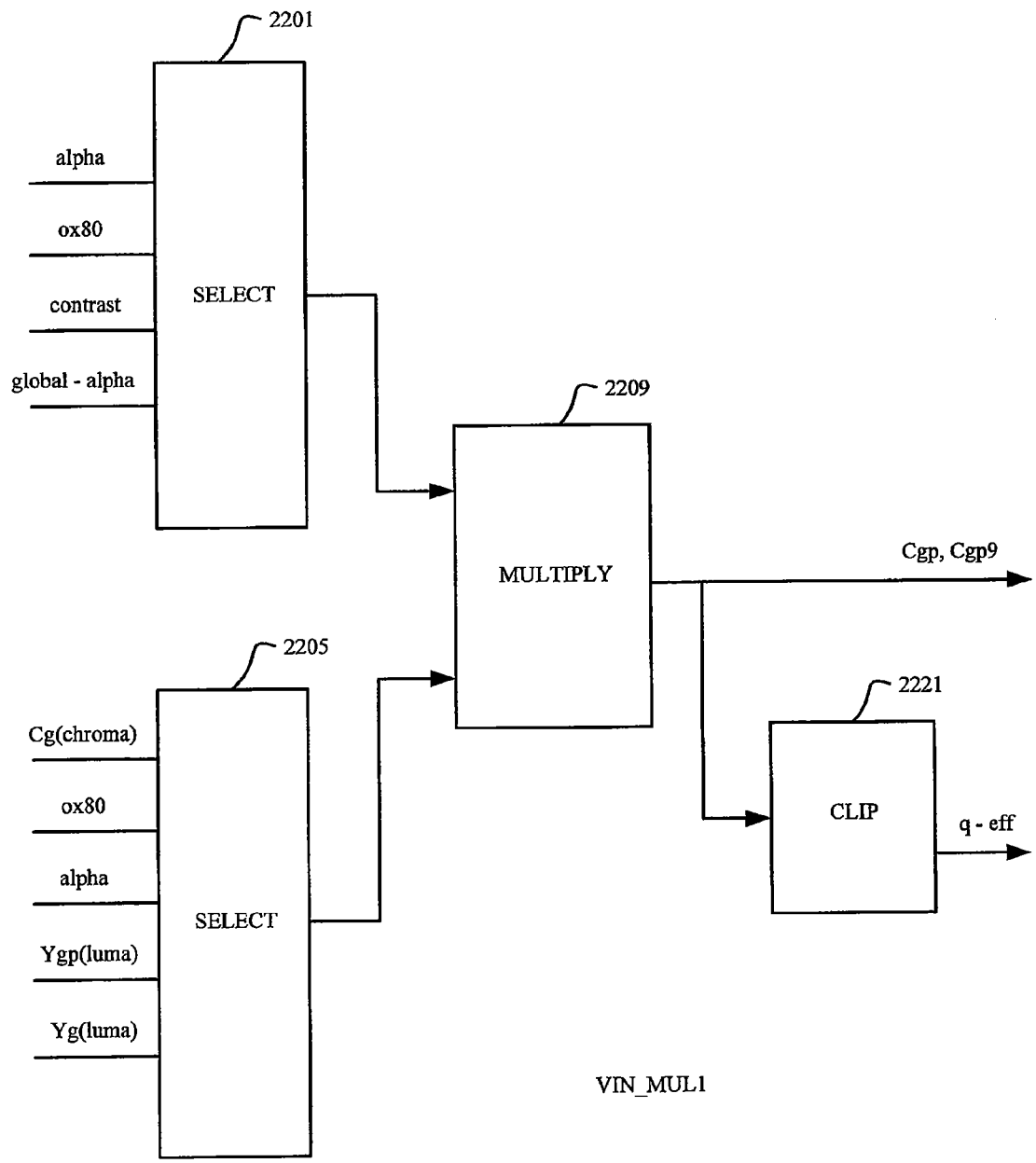
FIG. 22 shows one embodiment of an apparatus used in compositing an output image.
Figure 23:
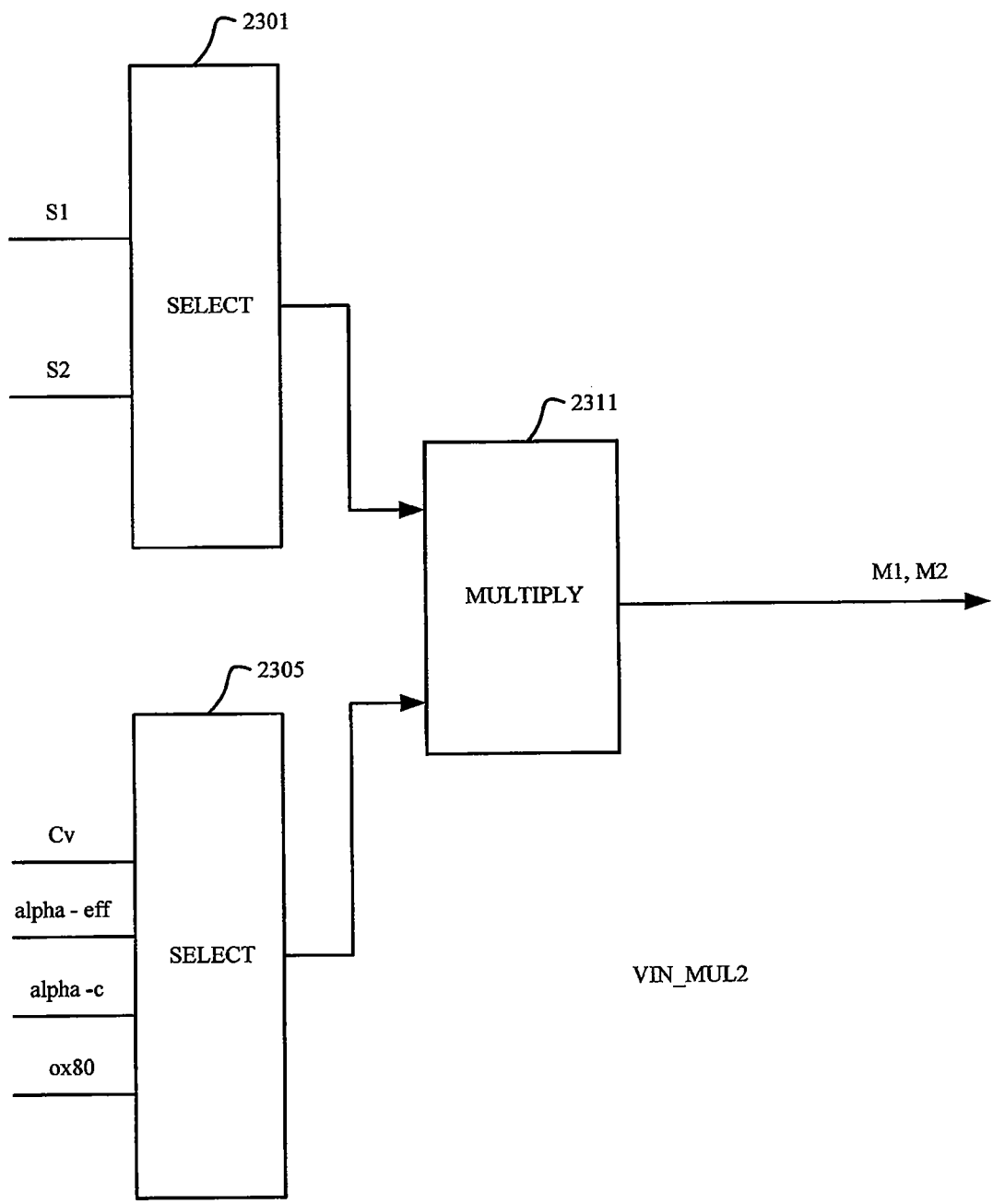
FIG. 23 shows one embodiment of an apparatus used in compositing an output image.

Referring back to FIG. 17, the ARITHMETIC block 1717 contains five different arithmetic units as shown in FIGS. 19-230 The ADDSUB unit 1900 handles all the additions and subtractions required in the various blending, biasing, and brightness operations mentioned above. The input operands to the ADDER 1911 and the SUBTRACTER 1915 are provided by the selectors 1901, 1903, 1905, and 1907, respectively, based upon the select signals generated by the DP-EXECUTE block 1709. As shown in FIG. 19, depending upon the stage of the processing as shown in the state machine in FIG. 18, the DP-EXECUTE block 1709 generates the appropriate signals to the DP-REGISTER block 1711 and the ARITHMETIC BLOCK 1717 so that the correct operands are input to the different arithmetic units. The ADDBIAS unit 2000 handles the biasing operation with respect to the scaled graphics data and saturates the result to 0-255. The first operand is either the luma value or chroma bias. The second operand is either the chroma value or the luma bias. The luma bias can also contain the brightness offset. Only one control signal is necessary to select either the luma bias operation (luma+bright-bias) or the chroma bias operation (chroma-bias+chroma). It can be appreciated that by using the control and select signals generated from the DP-EXECUTE block

1709, different operations can be performed using the same circuits which result in significant reduction of hardware redundancy and complexity.

Continuing with the present discussion, the ADDPM unit 2100 handles all the final addition in the pre-multiplied blend operation and the result is saturated to 0-255. This saturation is needed to prevent the wraparound situation since the pre-multiplied blend operation is not guaranteed to stay under 255 if the pre-multiply alpha is different from the blend alpha. Again, which operands are to be used depend upon the control and select signals generated by the DP-EXECUTE block 1709.

The MUL1 unit 2200 handles the SGFX component multiplications in either global alpha operations or contrast operations. This module also provides the product of the input operands, clipped to 128, for blending alpha calculations. The blending alpha can be either the local alpha, global alpha, or the product of the two. As explained above, the operands are selected using the select signals provided by the DP-EXECUTE block 1709.

The MUL2 unit 2300 handles the blend multiplications for the SGFX/plane 1 blend and Cursor/Plane 2 blend functions. The operands are selected based upon the select signals generated from DP-EXECUTE block 1709.

The arithmetic units discussed above are operated in the sequence controlled by the DP-EXECUTE block 1707 so that the correct operands are input to the different arithmetic units at appropriate points in the display processing cycles.

Referring back to FIG. 17, the ENCODER block 1731 synchronizes the output data according to the external clock frequency, for example to the 27 Mhz clock. It also handles the output data selection or multiplexing, and video synchronization signal generation. The ENCODER 1731, in one embodiment, contains two output modules. One of the output modules handles data at the back end of the 81 Mhz domain. It contains a set of ping-pong buffers for each of the two video outputs. Each buffer contains 11 bits of information: the three CCIR6601 synchronization signals (F, V, H) and the 8 bits of video data.

Each of the two video ports can come from any of the three sources: the composite output generated by VIN 317, or two bypass video sources from the VSC block 205. The two video outputs are multiplexed so that half of a 27 Mhz cycle contains one output and the other half contains the other output.

The other output module in the ENCODER block 1731 contains two submodules that convert the CCIR601 F/H/V signals to analog synchronization signals HSYNC/VSYNC.

As mentioned above, the background image can be a tiled graphics image based upon the user's selection. The tiled graphics image can be displayed on the screen as one or more tiles of a predetermined size containing either graphics or text data. The tiled graphics image, in one embodiment, is constructed based upon graphics or text data that are stored in a memory unit, for example, a DRAM. In the discussion that follows, the memory area where the graphics data used for tiling are stored is also referred to as the background graphics frame buffer or simply BGFX frame buffer. In one embodiment, the tiled background image can be displayed in a wallpaper format when the size of the tile is smaller than the screen size. More specifically, when the size of the tile is smaller than the screen size, the tile is displayed repeatedly on the screen based upon a display configuration specified by the user so that the tiled image appears as a wall-paper. In another embodiment, when the size of the tile is larger than the screen size, a portion of the tile, also referred to as a region of interest, is displayed on the screen and the BGFX frame buffer is treated as a circular frame buffer which allows the tile to be displayed in a wrap-around manner. Such a wrap-around display arrangement is useful when, for example, a web page having a size larger than the screen size is to be displayed on the screen. In this instance, the user can view the entire web page through scrolling in a vertical or horizontal direction. A method of generating and displaying a tiled graphics image based upon graphics or text data stored in memory will be described in more detail below.

Figure 24A:
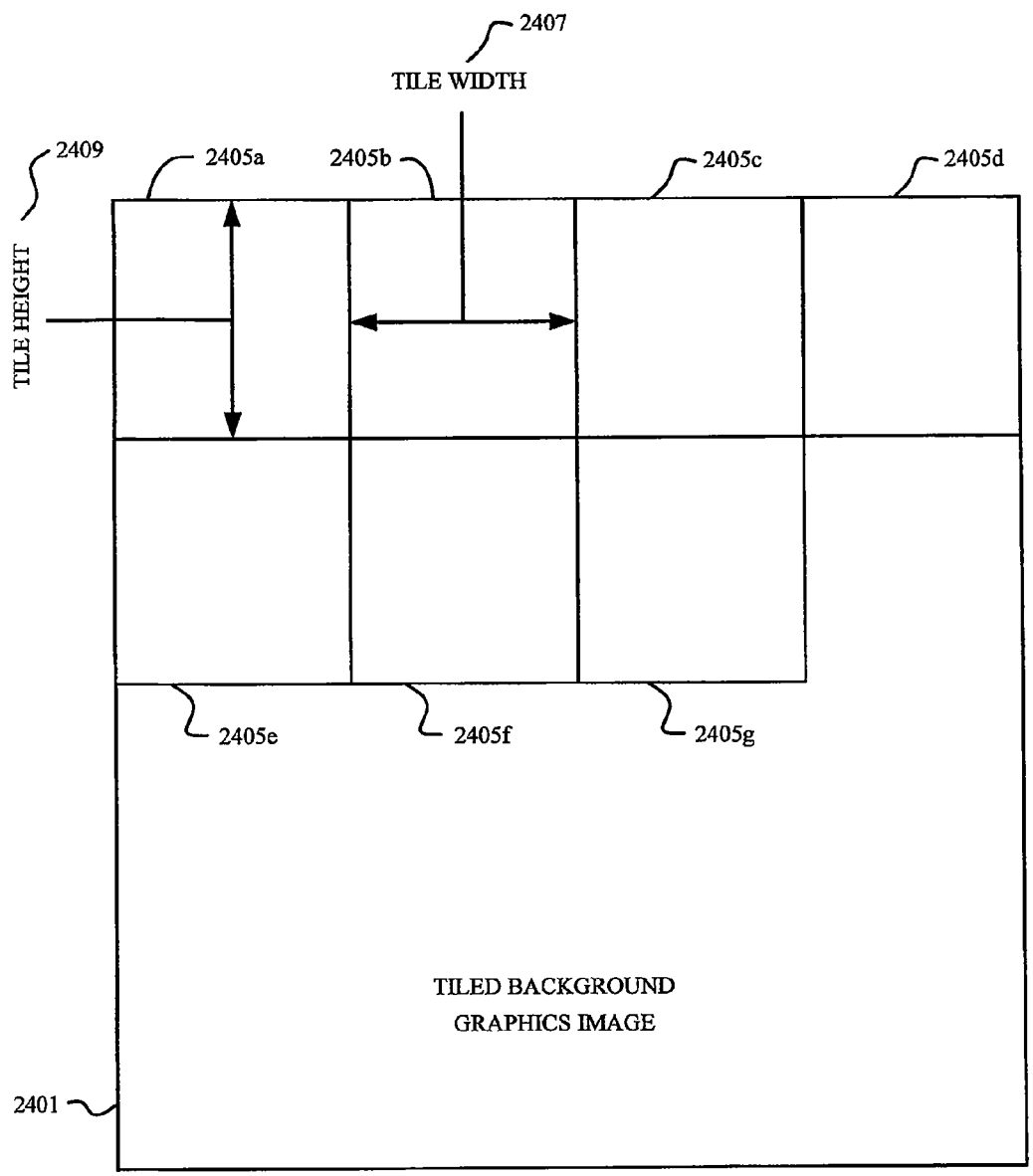
FIG. 24A illustrates an embodiment of a display arrangement of a tiled graphics image.

FIG. 24 provides an example of a tiled graphics image that can be displayed on a display screen. The tiled background graphics image 2401 can contain one or more tiles 2405 having a predetermined tile width 2407 and a predetermined tile height 2409. Each of the tiles shown in FIG. 24 can contain either graphics or text data that are stored in a predetermined order at certain memory locations, as specified by the user. In one embodiment, the user can define a specific display configuration of the tiled graphics image by providing certain input parameters that are used to construct the tiled graphics image. In this embodiment, the user can provide the display configuration parameters by programming various programmable registers that are designated to store the tiled graphics display configuration information. In one embodiment, the data that is used to construct the tiled graphics image is fetched from the memory unit to an on-chip buffer and the data is read out of the on-chip buffer for display processing purposes. The input parameters provided by the user can contain the following information:

- The starting address (SA) of the tile data in dynamic memory. In this example, the graphics or text data that the user wants to use to construct the tiled graphics image can contain several pixels and each pixel can contain one or more words of data that are stored sequentially in memory. The SA is used to specify where in memory the stream of data that is to be used to construct the tiled image starts.
- The width of the tile (WD) can be specified as a number of pixels. As mentioned above, each of the tiles that make up the tiled background image is displayed on the display screen as rows of pixels. The width of the tile corresponds to the number of pixels displayed in each row of the tile. In one embodiment, each pixel can be represented by a number of data units, for example, a number of bytes and the width can also be specified by a number of data units that represent the number of pixels displayed in each row of the tile.
- The height of the tile (HT) is specified as a number of pixels. In one embodiment, the height of the tile is the number of display rows in each tile. The starting address (SA), the width (WD) and the height (HT) parameters together define the area in memory that stores the data to be used for tiling. In other words, they define the region of interest (ROI) of the data in memory that is used as the tile for generating the tiled background image.
- The XREV parameter is used to specify whether the graphics tile is to be displayed in a reversed horizontal direction (X direction).
- The YREV parameter is used to specify whether the graphics tile is to be reversed in a reversed vertical direction (Y direction).
- The XO parameter is used to specify the offset in the X direction.
- The YO parameter is used to specify the offset in the Y direction. The X-offset and Y-offset parameters are used to display a partial tile from the upper left hand corner of the display screen.
- The BGFX_EN parameter is used to specify whether background graphics is enabled. As mentioned above, in this embodiment, the user can select either the background video, the background graphics, or background color as the background image.

The TILE_IN_BUFFER parameter is used to specify whether a display row of the tile can fit entirely in the on-chip buffer. As mentioned above, each display row of the tile can contain several pixels and each pixel can be represented by one or more data words. In this example, the TILE_IN_BUFFER parameter is set to indicate that the on-chip buffer is, large enough to store all the data words that are needed to display a row of pixels contained in the tile. This information allows the background graphics tile to be generated and displayed using the data stored in the on-chip buffer without additional accessing to the DRAM. The use of this parameter to minimize DRAM access is described in more detail subsequently.

The PITCH parameter is used to specify an amount of address locations by which to increment in order to go from one line of memory locations to the next line of memory locations in the memory.

Figure 24B:
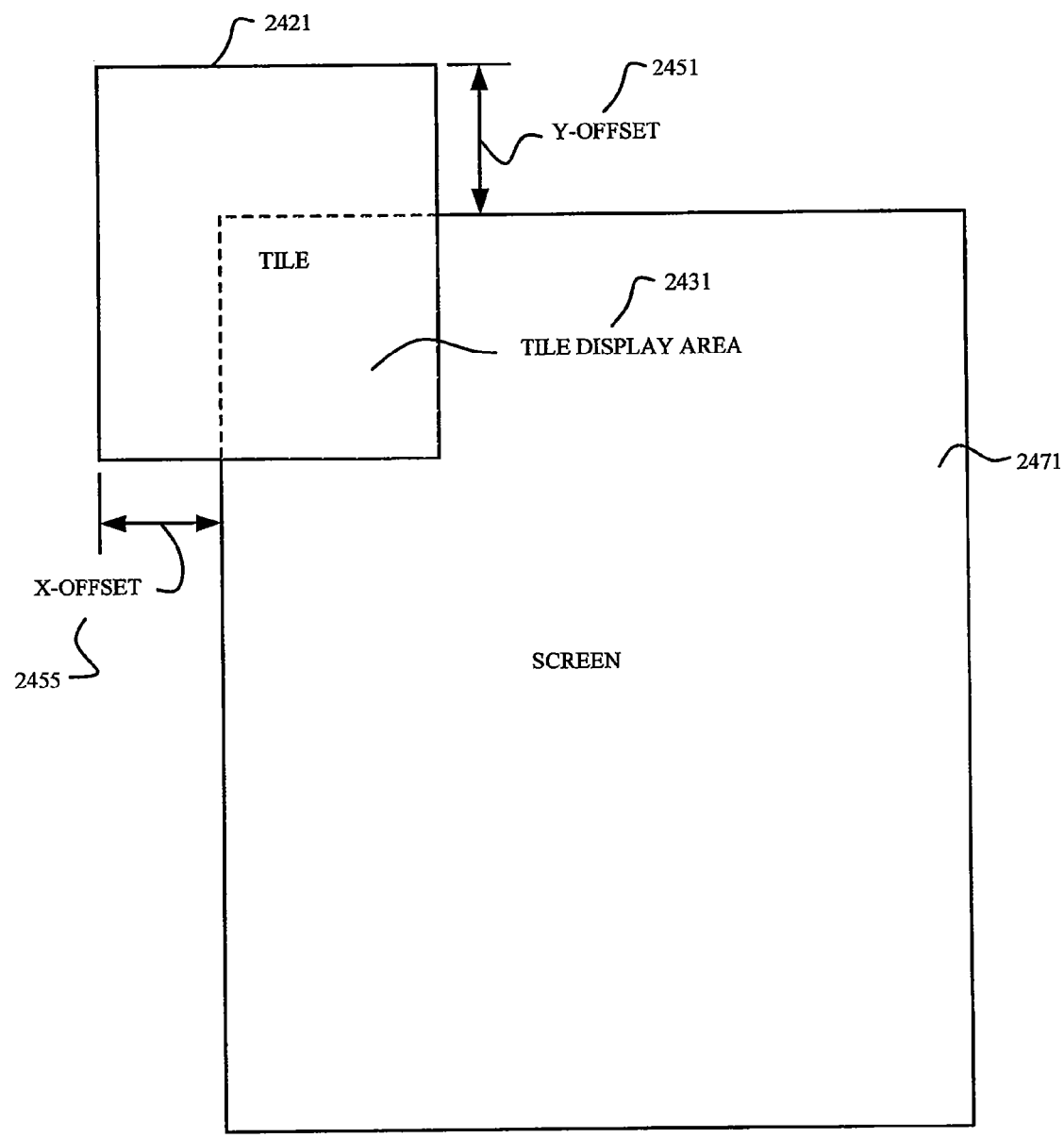
FIG. 24B illustrates an embodiment of a display arrangement of a tiled graphics image.

FIG. 24B illustrates a tiled display arrangement where the X-offset 2455 and Y-offset 2451 parameters are used to display a partial tile from the upper left hand corner of the display screen. As shown in this figure, only a portion of the tile 2421 stored in memory is displayed at the top-left tile on the display screen 2471. The Y-offset is used to indicate the number of tile rows to be skipped and the X-offset is used to indicate the number of tile columns to be skipped, respectively.

Figure 25:
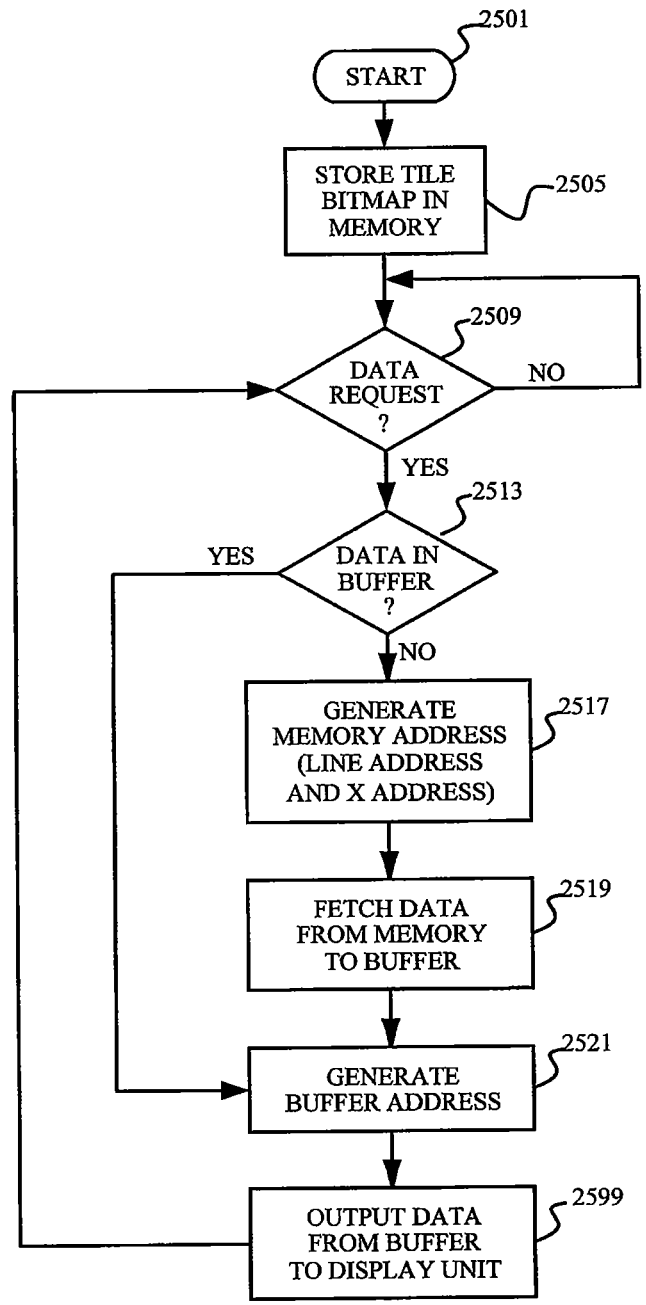
FIG. 25 is a high level flow diagram of one embodiment of a method for generating a tiled image.

FIG. 25 shows a high level flow diagram of a method for generating a tiled background image using the tile data stored in memory, according to the display configuration specified by the user. In the present discussion, it is assumed that the tile data to be used for generating and displaying the tiled background image contains graphics data and that the graphics data is to be displayed in an interlaced display mode. However, the teachings of invention equally apply to any other type of displayable data that that user wishes to use to construct the tiled image including text data and to any other display mode, for example, progressive scanning. The method starts at block 2501. At block 2505, the tile bitmap containing the graphics data to be used for generating the tiled image is stored in a dynamic memory, for example, a DRAM. For clarity and simplicity, it is assumed that the graphics data are stored sequentially in the memory unit in the same order of the display rows of the tile.

At the loop 2509, it is determined whether there is a data request for pixel data required to generate the tiled image. If there is a data request for pixel data, the method proceeds to block 2513, otherwise it stays in the loop 2509 waiting for a data request to be initiated. At decision block 2513, it is determined whether the pixel data being requested exists in the on-chip buffer. If so, the method proceeds to block 2599, otherwise it proceeds to block 2517. At block 2517, a memory address corresponding to the memory location where the requested pixel data is stored is generated. This memory address contains two parts, a memory line or row number and a horizontal or column number. For the purposes of discussion herein, the memory line number will be referred to as the memory line address and the horizontal or column number will be referred to as the memory X-address. The calculation of the memory line address and the memory X-address number is described in detail below.

At block 2519, a predetermined number of data words representing the pixel data being requested is fetched from the memory unit to the on-chip buffer unit based upon the memory address generated in block 2517. The method then proceeds to block 2521 to generate a buffer address corresponding to the buffer entry where the pixel data being requested is stored. At block 2599, the requested pixel data is outputted from the buffer based upon the buffer address generate in block 2521. The method then loops back to block 2509 to wait for another data request to be initiated.

Figure 26:
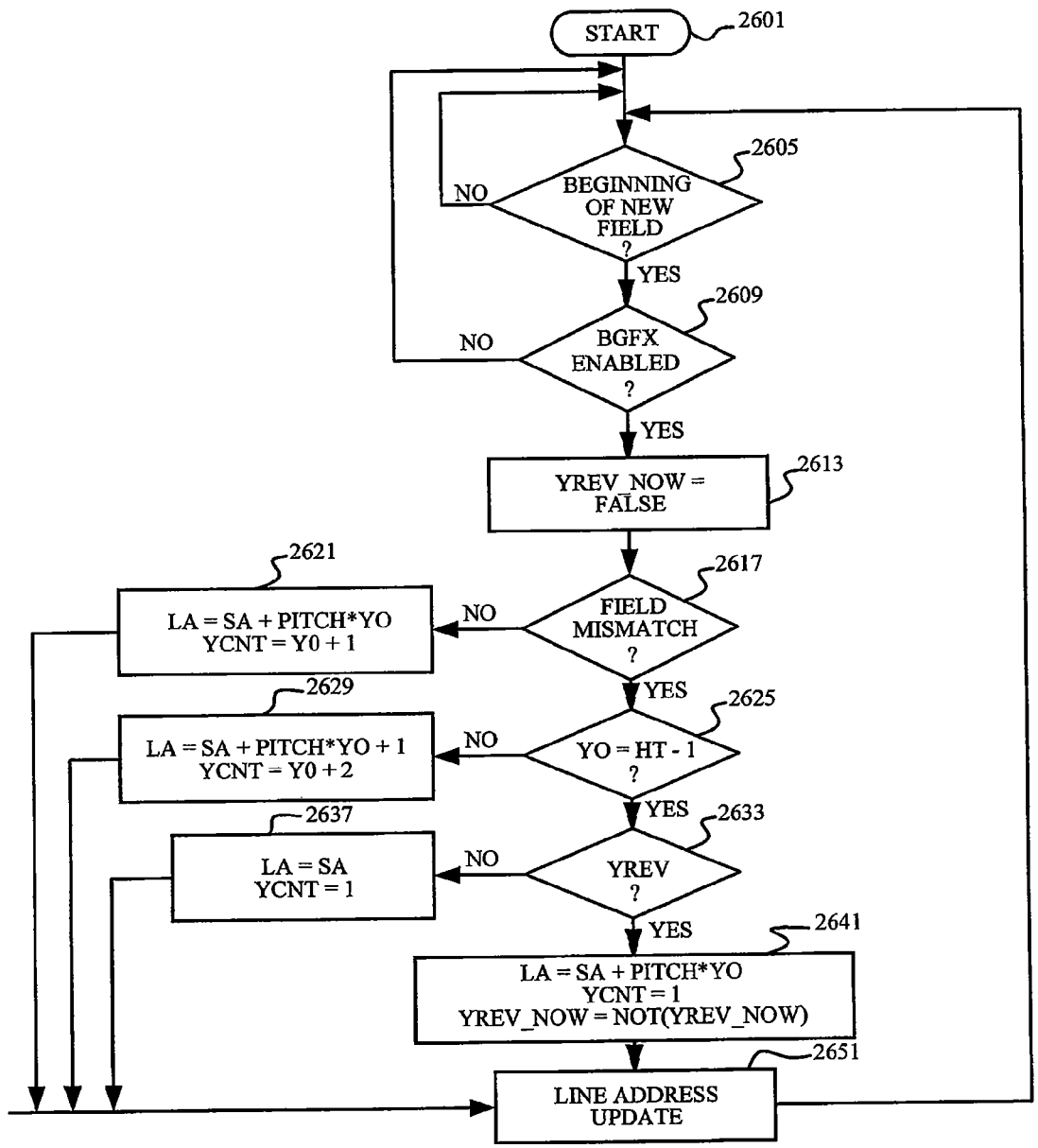
FIG. 26 illustrates a detailed flow diagram of one embodiment of a method for generating an initial line address.
Figure 27:
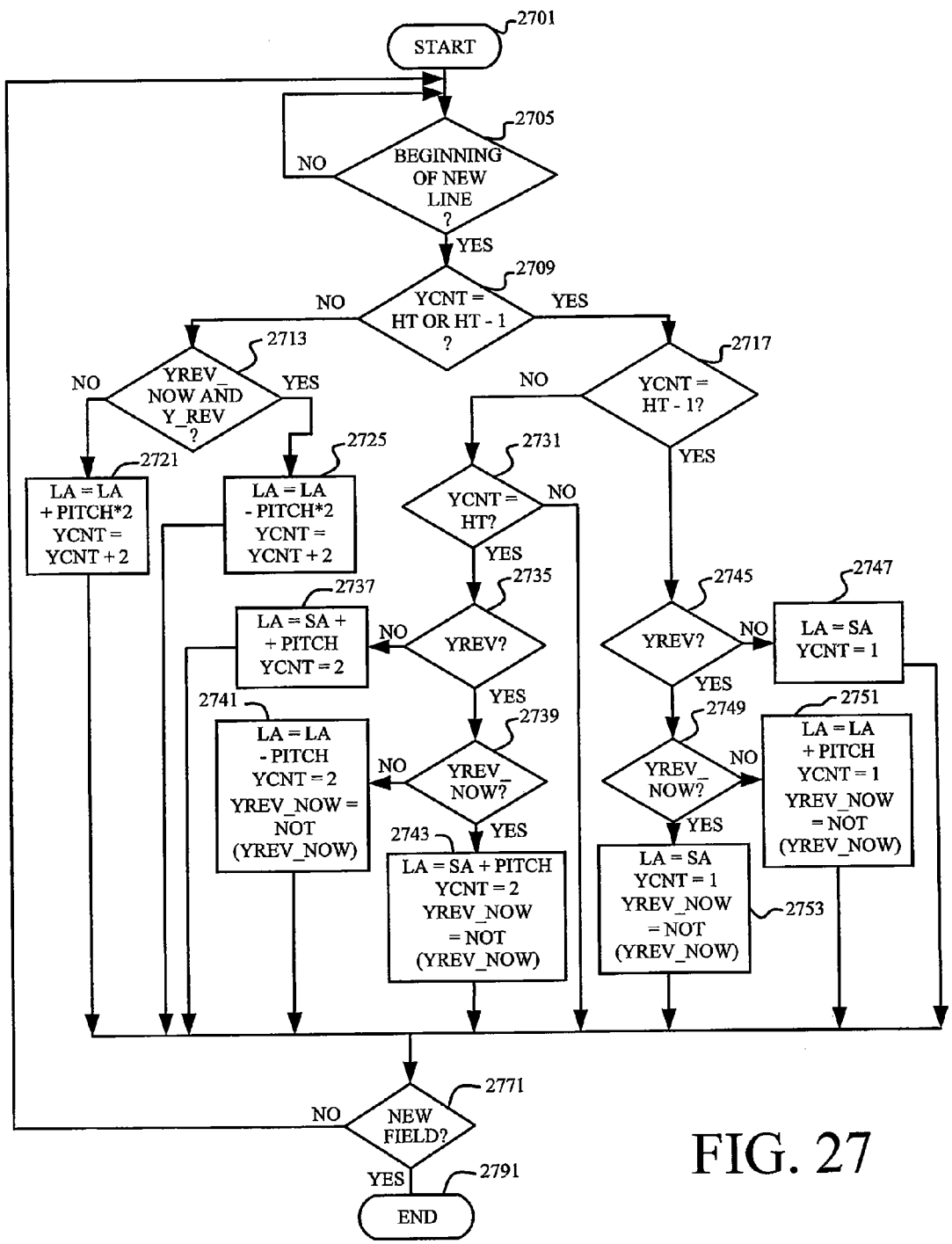
FIG. 27 is a detailed flow diagram of one embodiment of a method for updating the line address.

FIGS. 26 and 27 illustrate a detailed flow diagram for a method to generate the memory line number component of the memory address generated at block 2517 in FIG. 25. FIG. 26 shows a flow diagram of a method for generating the initial memory line address The method starts at block 2601. At loop 2605, the method proceeds out of the loop to block 2605 if a signal indicating the beginning of a new display field has been detected. As mentioned above, it is assumed that the tiled graphics image is to be displayed in an interlaced display mode. Accordingly, each image to be displayed and hence each tile in the image can be thought of as containing two fields, one field containing even-numbered display lines and the other field containing odd-numbered display lines. In one embodiment, as explained above, the beginning of a new display field or a new display line within a display field can be detected using the synchronization signals F, H, V. V is used to indicate vertical blanking, H is used to indicate horizontal blanking and F is used to keep track of which field is being displayed. Therefore, the beginning of a new display field can be determined based upon the F synchronization signal.

At loop 2609, the method proceeds out of the loop if the BGFX_EN parameter is set indicating that background graphics image is to be displayed. At block 2613, a YREV_NOW flag is set to a false value to indicate that at this stage in the process, there is no reversal of the tile in the Y direction because the beginning of a new field has just been detected and therefore nothing has been displayed. The method proceeds to block 2617 to determine whether a field mismatch has been detected. This condition can occur if the offset in the Y direction as specified by the user would cause the display of the new field to start at the wrong initial display line. This can happen because the display mode as discussed herein is assumed to be in interlacing mode. For example, assuming that the top field contains lines numbered 1, 3, 5, 7, etc. and the Y offset specified by the user is an odd number, for example 1, then this would cause a field mismatch condition to occur because the initial display line according to the user-specified Y offset of 1 would have been line 2 which belongs to the bottom field which contains lines numbered 2, 4, 6, 8, etc. Likewise, if the bottom field is to be displayed now and the user specifies a Y offset by an even number, for example 0, then the field mismatch condition would also occur because the initial display line would have been line 1 which belongs to the top field of display.

Returning to FIG. 26, the method proceeds to block 2625 if there is a field mismatch, otherwise the method proceeds to block 2621. At block 2621, the initial line address (LA) is calculated according to the following formula:

$$LA = SA + (PITCH * YO)$$

where SA is the starting word address in dynamic memory; PITCH is the amount of address locations by which to implement to go from one display line to the next display line in memory; and Y0 is the offset in the Y direction specified by the user. In this example, if the Y offset is zero then the initial line address is the same as the starting address. At block 2621, a line counter YCNT is also computed as follows:

$$YCNT = YO + 1$$

The line counter YCNT is used to keep track of the display line in memory that is being fetched taking into account the Y offset. For example, if Y0 equals to zero then YCNT at this stage in the process is set to 1 to indicate that the line address for the initial display line is being generated.

At decision block 2625, it is determined whether the Y offset specified by the user equals the height of the tile minus one. If so, the method proceeds to block 2633. Otherwise, the method proceeds to block 2629. At block 2629, the initial line address LA and YCNT are computed as follows:

$LA=SA+(PITCH*Y0)+1$ $YCNT=Y0+2$

At decision block 2633, it is determined whether YREV is set indicating that the tiling is to be reversed in the Y direction. If so, the method proceeds to block 2641, otherwise the method proceeds to block 2637. At block 2637, the initial line address LA and the YCNT are computed as follows:

$LA=SA$ $YCNT=1$

At block 2641, the initial line address and the YCNT are computed as follows:

$LA=LA+(PITCH*Y0)$ $YCNT=1$

At block 2641 the YREV_NOW flag is also toggled. In this example, recall that the YREV_NOW flag was set to a false value at block 2613. Therefore YREV_NOW flag is toggled to a true value at block 2641.

After the initial memory line address has been generated as explained above, the method then proceeds from either block 2621, block 2629, block 2637, and block 2641 to block 2651 to update the memory line address for subsequent memory fetches of the next display lines in the field.

FIG. 27 illustrates a detailed flow diagram of a method for updating the memory line address performed at block 2651 in FIG. 6. The method starts at block 2701. At loop 2705, the method proceeds out of the loop to block 2709 if a signal indicating the beginning of a new display line has been detected. As mentioned above, vertical and horizontal synchronization signals can be used to detect this condition. In one embodiment, if the vertical sync signal remains the same but the horizontal sync signal has changed then it is an indication of the beginning of a new line.

At decision block 2709, the method proceeds to block 2717 if the YCNT equals to the tile height (HT) or HT minus 1 (HT−1), otherwise the method proceeds to block 2713. At decision block 2713, the method proceeds to block 2725 if both the YREV_NOW and Y_REV flags are set (i.e., tiling in the reversed Y direction), otherwise the method proceeds to block 2721. At block 2721, since there is no reversed tiling, the memory line address and the YCNT are incremented as follows:

$LA=LA+(PITCH*2)$ $YCNT=YCNT+2$

At block 2725, because tiling is in the reversed Y direction, the memory line address and the YCNT are computed as follows:

$LA=LA-(PITCH*2)$ $YCNT=YCNT+2$

Referring back to decision block 2717, the method proceeds to block 2745 if YCNT equals HT−1. Otherwise, the method proceeds to block 2731. At decision block 2731, the method proceeds to block 2735 if the YCNT equals HT, otherwise it proceeds to block 2771. At decision block 2735, it is determined whether the YREV flag is set. If so, the method proceeds to block 2739, otherwise it proceeds to block 2737. At block 2737, the memory line address and the YCNT are computed as follows:

$LA=SA+PITCH$ $YCNT=2$

At decision block 2739, the method proceeds to block 2743 if the YREV_NOW flag is set and to block 2741 if the YREV_NOW flag is not set. At block 2741, the memory line address and the YCNT are updated as follows:

$LA=LA-PITCH$ $YCNT=2$

YREV_NOW flag is also toggled at block 2741. At block 2743, the memory line address and YCNT are updated as follows:

$LA=SA+PITCH$ $YCNT=2$

YREV_NOW is also toggled at block 2743.

Referring back to decision block 2745, the method proceeds to block 2749 if YREV flag is set and to block 2747 if the YREV flag is not set. At block 2747, the memory line address and the YCNT are updated as follows:

$LA=SA$ $YCNT=1$

At decision block 2749, the method proceeds to block 2753 if the YREV_NOW flag is set, otherwise the method proceeds to block 2751. At block 2751, the memory line address and the YCNT are updated as follows:

$LA=LA+PITCH$ $YCNT=1$

YREV_NOW flag is also toggled at block 2751. At block 2753, the memory line address and YCNT are updated as shown below:

$LA=SA$ $YCNT=1$

YREV_NOW is also toggled at block 2753. The method then proceeds from either block 2721, block 2725, block 2731, block 2737, block 2741, block 2743, block 2747, block 2751, or block 2753 to block 2771.

At decision block 2771, the method proceeds to end at block 2791 if a 20 new field has been detected, otherwise the method loops back to block 2705 to continue updating the memory line address for new display lines.

As mentioned above, the generation of the correct memory addresses for fetching data from the dynamic memory into the on-chip buffer and for outputting the data from the on-chip buffer to the display unit involves generating the correct memory line address as discussed above and also generating the correct memory X-address (MADDR) and the buffer X-address (BADDR). Depending on the size of the buffer and the size of the display line of the tile (the tile width), the generation of the MADDR and BADDR can fall into one of two cases. If the data words representing one display line of the tile fits in the on-chip buffer, horizontal tiling (i.e. tiling of a display line of the screen) can be achieved by manipulating the BADDR once the data words required for the generation of one display line of the tile has been fetched from memory into the on-chip buffer. In this case, the data words representing the tile pixels are read out from the on-chip buffer sequentially until one line of the tile has been displayed. The process is repeated until the entire display line on the screen has been filled. If the on-chip buffer is not large enough to hold all the data words required to display one line of the tile (for example, the on-chip buffer can store only 40 words of data but one line of the tile contains 60 words of data, etc.), horizontal tiling can be achieved by manipulating both MADDR and BADDR in an interleaved fashion. The on-chip buffer in this case is treated as a circular buffer.

Figure 28:
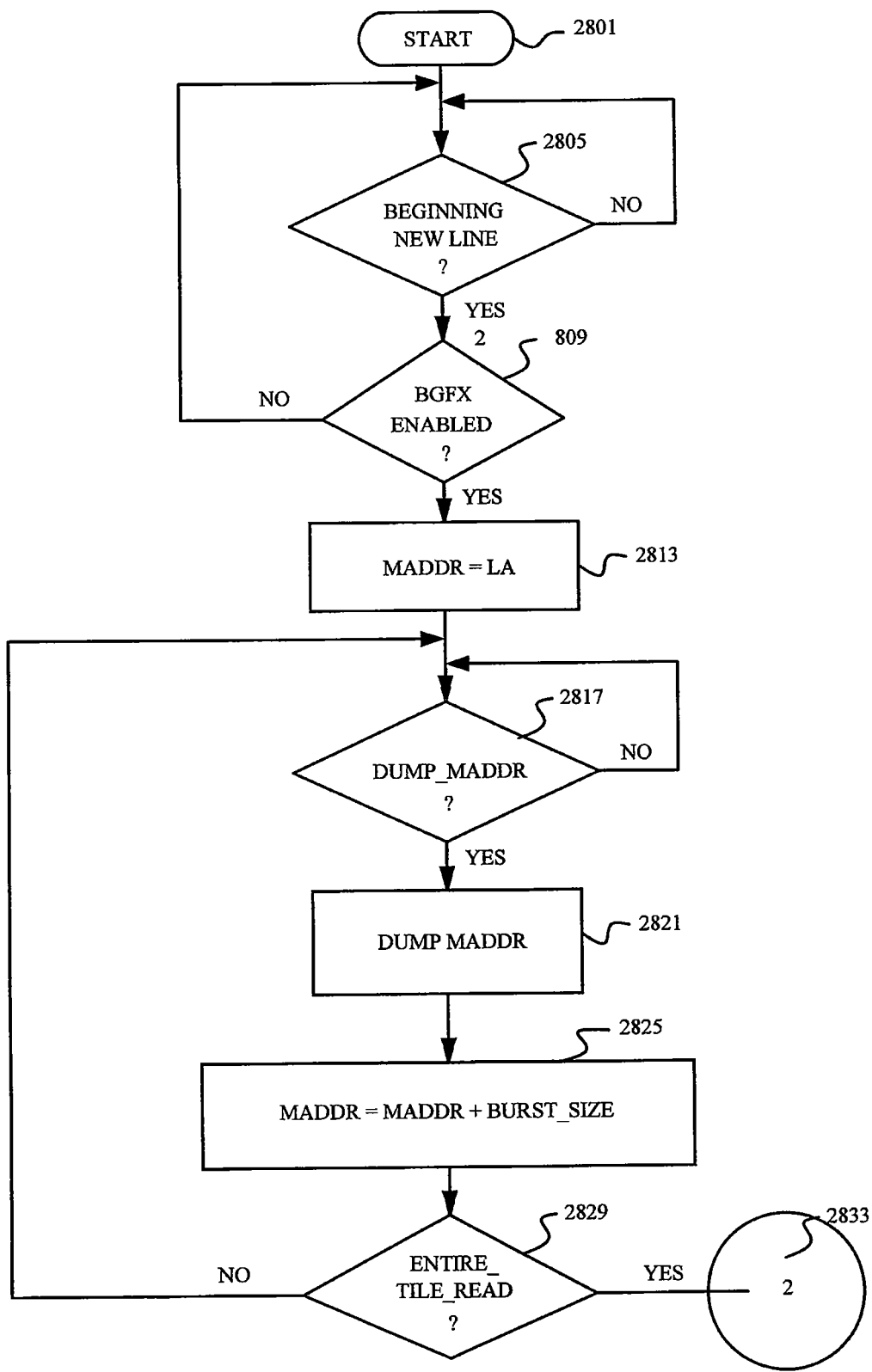
FIG. 28 is a flow diagram of one embodiment of a method for generating the horizontal address component of a memory address.
Figure 29:
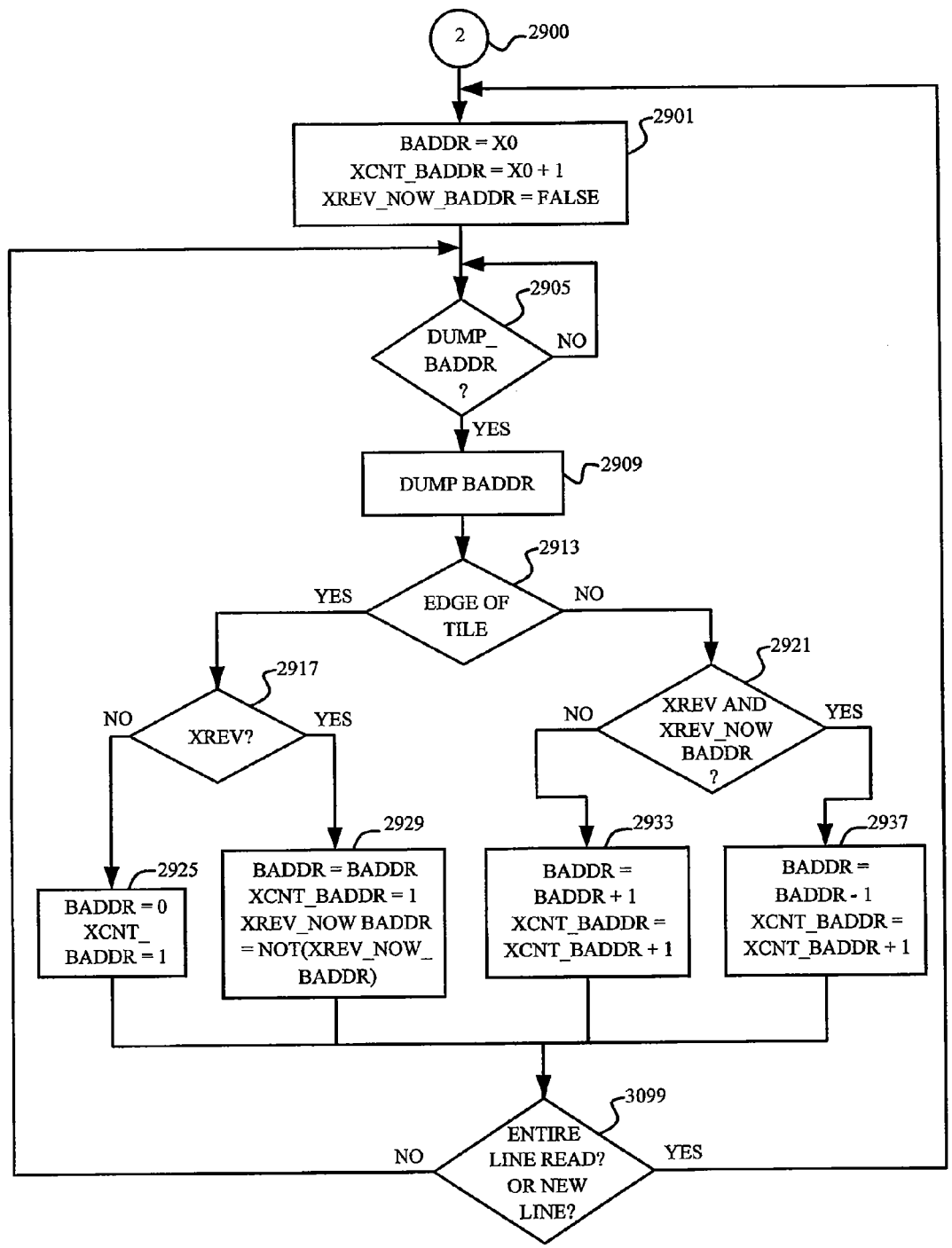
FIG. 29 is a flow diagram of one embodiment of a method for 10 generating the buffer address.

FIGS. 28 and 29 illustrate a method of generating the MADDR and BADDR when the on-chip buffer is large enough to hold all the data words required to display one line-worth of the tile. FIG. 28 shows the generation of the MADDR and FIG. 29 shows the generation of the BADDR, respectively. The method begins at block 2801. At loop 2805, the method proceeds out of the loop to block 2809 if the beginning of a new line has been detected. As discussed earlier, when this condition is detected, the logic to generate the memory line address LA has been invoked to generate the correct memory line address LA to be used in the computation of the MADDR. At decision block 2809, the method proceeds to block 2813 if BGFX is enabled, otherwise, the method loops back to block 2805. At block 2813, the MADDR is computed as follows:

MADDR=LA

The method then proceeds from block 2813 to loop 2817. The method proceeds out of the loop 2817 to block 2821 when it is determined that the current MADDR can now be placed on the address bus to be used in fetching the current block of data from the memory to the on-chip buffer. This check is necessary to avoid placing the current MADDR address on the same address bus when the previous MADDR has not been used. At block 2821, the current MADDR is placed on the address bus for use in fetching the data from memory to the on-chip buffer. At block 2825, the MADDR is updated as follows:

*MADDR=MADDR*+BURST_SIZE

The BURST_SIZE is the number of data words that are fetched in the current memory fetch cycle. This number can vary depending on several factors including the memory page boundaries, the maximum fetch size, the width of the tile (to avoid overfetching), and the current MADDR. For example, if the number of data words required is 8, the maximum fetch size is 16 and all 8 data words required can be fetched without crossing the memory boundary, then the BURST_SIZE can be defined as 8. In this example, all 8 data words are fetched from the memory starting at the current MADDR to the on-chip buffer unit. The MADDR is then incremented by 8 for the next fetching cycle.

Referring back to FIG. 28, the method proceeds from block 2825 to block 2829 to determine whether all of the data words required to display the entire line of the tile have been fetched. This condition can be determined by accumulating the burst sizes and comparing with the tile width. If this condition is met, the method proceeds to part 2 in FIG. 29 to calculate and generate the BADDR.

FIG. 29 shows a flow diagram of a method for generating the BADDR in the case where the on-chip buffer is large enough to hold all the data required to display one entire line of the tile. The method starts at block 2900. At block 2901, the current BADDR, current XCNT_BADDR, and the XREV_NOW_BADDR flag are generated as follows:

BADDR=XO

*XCNT_BADDR=XO*+1

XREV_NOW_BADDR=FALSE

Note that at this stage in the process, the required data from memory have just been fetched into the on-chip buffer and there is no reversal tiling in the X direction to be performed at this stage since no data have been read out of the on-chip buffer. At loop 2905, the method proceeds out of this loop to block 2909 if it is determined that the current BADDR can now be placed on the address bus to be used in reading the data stored at the current BADDR in the on-chip buffer. This check is necessary to avoid overriding the previous BADDR if the previous BADDR has not been used. In one embodiment, this condition can be satisfied by generating a buffer access request and waiting until the buffer access request has been completed thus ensuring that the previous BADDR has been used. At block 2909, the current BADDR computed at block 2901 is placed on the buffer address bus which will be used for reading data out of the buffer when the next buffer access request is initiated. The method proceeds from block 2909 to block 2913. At decision block 2913, it is determined whether the current BADDR points to the data word fetched from memory that corresponds to the last pixel of the current display row of the tile. In other words, it is determined whether the current BADDR points to the edge of the tile. This is determined by comparing the XCNT_BADDR value with the width of the tile. If the current BADDR points to the data word corresponding to the last pixel of the current display row of the tile (i.e., the edge of the tile), the method proceeds to block 2917, otherwise it proceeds to block 2921. At decision block 2917, the method proceeds to block 2929 if the XREV flag is set and to block 2925 if the XREV flag is not set. At block 2925, the current BADDR and XCNT_BADDR are updated as follows:

BADDR=0

XCNT_BADDR=1

At block 2929, since the XREV has been set, the current BADDR, XCNT_BADDR are updated as shown below:

BADDR=BADDR

XCNT_BADDR=1

At block 2929, the XREV_NOW_BADDR flag is also toggled to a true value since tiling in the reversed X direction has been requested.

Referring back to decision block 2921, the method proceeds to block 2937 if both XREV and XREV_NOW_BADDR flags are set, otherwise it proceeds to block 2933. At block 2933, the current BADDR and XCNT_BADDR are updated as follows:

*BADDR=BADDR*+1

*XCNT_BADDR=XCNT_BADDR*+1

At block 2937, the current BADDR and XCNT_BADDR are updated as follows:

*BADDR=BADDR*−1

*XCNT_BADDR=XCNT_BADDR*+1

The method then proceeds from either block 2925, block 2929, block 2933, or block 2937 to block 2941. At decision block 2941, the method loops back to block 2901 if either the current display line on the display screen has been processed or a new display line of the screen has been detected. Otherwise the method loops back to block 2905 to continue the horizontal tiling process. Detection of a new display line on the screen can be determined, as mentioned above, using the horizontal sync signal. A count can be maintained to keep track of how many words have been read out of the on-chip buffer. This count can be compared with the screen width to determine whether the entire display line on the screen has been processed.

Figure 30:
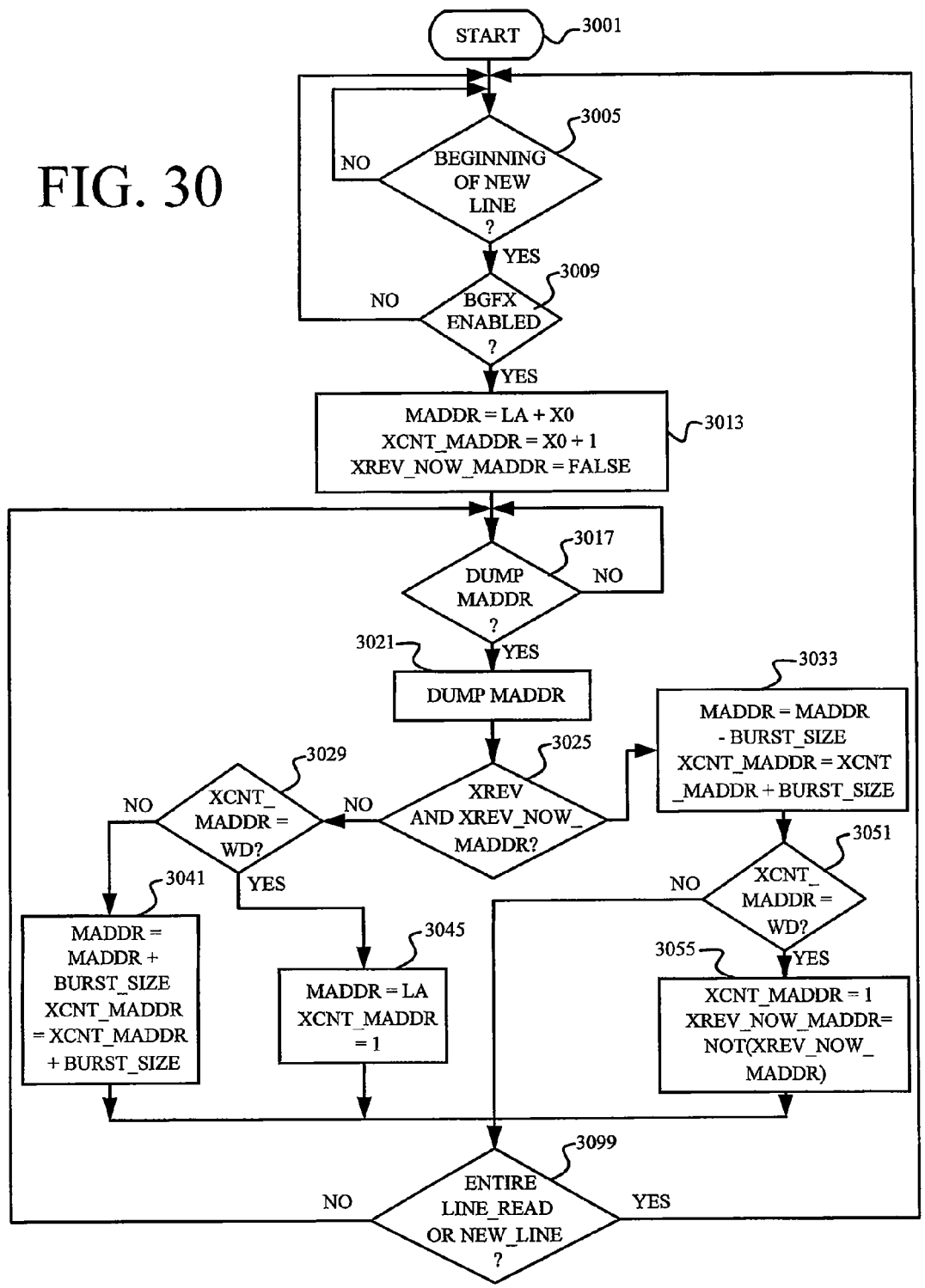
FIG. 30 is a flow diagram of one embodiment of a method for generating the horizontal address component of a memory address.
Figure 31:
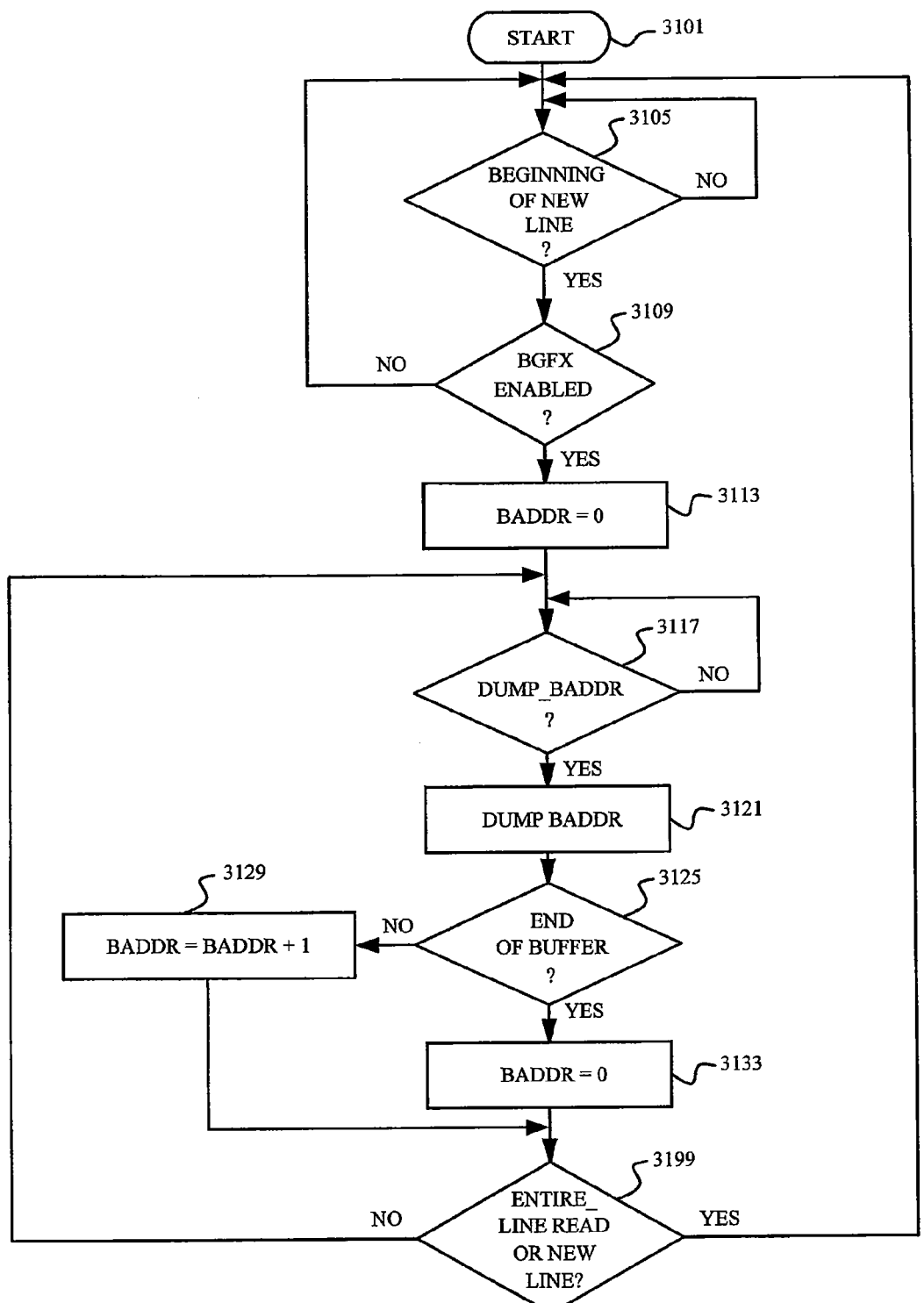
FIG. 31 is a flow diagram of one embodiment of a method for generating the buffer address.

FIGS. 30 and 31 show a method for generating the MADDR and BADDR when the on-chip buffer is not large enough to hold all the data required to display an entire row of the tile. FIG. 30 shows the generation of the MADDR and FIG. 31 shows the generation of the BADDR, respectively.

The method begins at block 3001. At loop 3005, the method proceeds out of the loop to block 3009 if the beginning of a new line has been detected. As discussed earlier, when this condition is detected, the logic to generate the memory line address LA has been invoked to generate the correct memory line address LA to be used in the computation of the MADDR. At decision block 3009, the method proceeds to block 3013 if BGFX is enabled, otherwise, the method loops back to block 3005. At block 3013, the MADDR and the XCNT_MADDR are computed as follows:

$$MADDR = LA + X0$$

$$XCNT\_MADDR = X0 + 1$$

The flag XREV_NOW_MADDR is also set to a false value.

The method then proceeds from block 3013 to loop 3017. The method proceeds out of the loop 3017 to block 3021 when it is determined that the current MADDR can now be placed on the address bus to be used in fetching the current block of data from the memory to the on-chip buffer. This check is necessary to avoid placing the current MADDR address on the same address bus when the previous MADDR has not been used. At block 3021, the current MADDR is placed on the address bus for use in fetching the data from memory to the on-chip buffer. At block 3025, the method proceeds to block 3033 if both the flags XREV and XREV_NOW_MADDR are set, otherwise the method proceeds to block 3029. At decision block 3029, the method proceeds to block 3045 if XCNT_MADDR equals the width of the tile and to block 3041 otherwise. At block 3041, the MADDR and the XCNT_MADDR are updated as follows:

$$MADDR = MADDR + BURST\_SIZE$$

$$XCNT\_MADDR = XCNT\_MADDR + BURST\_SIZE$$

Again, the BURST_SIZE is the number of data words that are fetched in the current memory fetch cycle. This number can vary depending on several factors including the memory page boundaries, the maximum fetch size, the width of the tile (to avoid overfetching), and the current MADDR. For example, if the number of data words required is 8, the maximum fetch size is 16 and all 8 data words required can be fetched without crossing the memory boundary, then the BURST_SIZE can be defined as 8. In this example, all 8 data words are fetched from the memory starting at the current MADDR to the on-chip buffer unit. The MADDR is then incremented by 8 for the next fetching cycle.

At block 3045, since the entire width of the tile has been processed, the MADDR and the XCNT_MADDR are updated as follows:

$$MADDR = LA$$

$$XCNT\_MADDR = 1$$

At block 3033, the MADDR and the XCNT_MADDR are updated as follows:

$$MADDR = MADDR - BURST\_SIZE$$

$$XCNT\_MADDR = XCNT\_MADDR + BURST\_SIZE$$

The method then proceeds from block 3033 to block 3051. At decision block 3051, the method proceeds to block 3055 if the XCNT_MADDR equals to the width of the tile and to block 3099 otherwise. At block 3055, the XCNT_MADDR is set to 1 and the XREV_NOW_MADDR flag is toggled to a false value.

The method proceeds from either block 3041, block 3045, or block 3055 to block 3099. At decision block 3099, it is determined whether the entire display line on the screen has been processed or a new line has been detected. If either one of these two conditions is true, the method loops back to block 3005 to prepare for the display of a new line. Otherwise, the method loops back to block 3017 to continue generating MADDR and fetching data to the on-chip buffer. Whether the entire display line on the screen has been processed can be determined by accumulating the burst sizes and comparing that with the tile width. Whether a new line has been detected can be determined based upon the horizontal sync signal, as explained above.

FIG. 31 shows a flow diagram of a method for generating the BADDR in the case where the on-chip buffer is not large enough to hold all the data required for display one entire line of the tile. The method starts at block 3101. At loop 3105, the method proceeds out of the loop to block 3109 if the beginning of a new line has been detected. Recall that this condition will have triggered the generation of the memory line address (LA) and the MADDR with respect to the new line before the BADDR generation logic is invoked here. At block 3109, the method proceeds to block 3113 to set the current BADDR to zero if BGFX is enabled, otherwise the method loops back to block 3105. The method then proceeds from block 3113 to block 3117. At decision block 3117, the method proceeds to block 3121 if it is determined that the current BADDR can now be placed on the address bus to be used in reading the data stored at the current BADDR in the on-chip buffer. This check is necessary to avoid overriding the previous BADDR if the previous BADDR has not been used. In one embodiment, this condition can be satisfied by generating a buffer access request and waiting until the buffer access request has been completed thus ensuring that the previous BADDR has been used. At block 3121, the current BADDR is placed on the buffer address bus which will be used for reading data out of the buffer when the next buffer access request is initiated. The method proceeds from block 3121 to block 3125. At decision block 3125, it is determined whether the current BADDR points to the end of the buffer. This can be determined by comparing the current BADDR with the buffer size. If the current BADDR points to the end of the buffer, the method proceeds to block 3133 to set the current BADDR to zero, otherwise the method proceeds to block 3129 to update the current BADDR as follows:

$$BADDR = BADDR + 1$$

The method then proceeds from either block 3129 or 3133 to block 3199. At decision block 3199, the method loops back to block 3105 if either the current display line on the display screen has been processed or a new display line of the screen has been detected. Otherwise the method loops back to block 3117 to continue the horizontal tiling process. Detection of a new display line on the screen can be determined, as mentioned above, using the horizontal sync signal. A count can be maintained to keep track of how many words have been read out of the on-chip buffer. This count can be compared with the screen width to determine whether the entire display line on the screen has been processed.

The invention has been described in conjunction with the preferred embodiment. It is evident that numerous alternatives, modifications, variations and uses will be apparent to those skilled in the art in light of the foregoing description.

What is claimed is:

1. A method for generating at least one output image for a display device, wherein a hardware processor executing instructions is operative to enable the actions of the method, comprising:
    receiving at least one video image from at least one video source;
    receiving a plurality of graphics images from at least one remotely located source, wherein the remotely located source separately provides a priority for the plurality of graphics images;
    receiving a background image, wherein the background image includes at least one of the at least one video image, a tiled graphics image, and a color image based on a selected background display mode;
    iteratively blending each luma component, each chroma component, and each alpha channel value for the plurality of graphics images to produce a blended graphics image having blended chroma components and blended luma components, wherein if at least one graphics image is associated with a high order priority, the blended graphics image inherits the high order priority of the at least one graphics image else inherits the priority separately received from the at least one remotely located source;
    compositing the at least one video image, the background image, and the blended graphics image by employing a per-pixel alpha value, data from the blended graphics image, and a global composition alpha value to determine a composite alpha value to generate the at least one output image based on the composite alpha value and the inherited priority of the blended graphics image, and using a control parameter indicating whether an image is transparent or opaque and whether an image is on top of another image to select as the at least one output image from the at least one video image, the blended graphics image, or a composite of the at least one video image and the blended graphics image; and
    providing the at least one output image to the display device.

2. The method of claim 1, wherein iteratively blending the plurality of graphics images further includes:
    reading at least one of the plurality of graphics images from a memory;
    converting a format of the at least one graphics image;
    scaling the at least one graphics image;
    blending the at least one graphics image into the blended graphics image;
    performing at least one color space conversion on the blended graphics image; and
    writing the blended graphics image to the memory.

3. The method of claim 1, wherein iteratively blending the plurality of graphics images further includes:
    determining an order for at least one of the plurality of graphics images to be blended, based at least in part on priority information received from the at least one remotely located source; and
    blending the at least one of the plurality of graphics images into the blended graphics image, based at least on the determined order.

4. The method of claim 1, wherein at least one of the plurality of graphics images is a cursor image.

5. The method of claim 1, wherein iteratively blending the plurality of graphics images to produce the blended graphics image is performed in real time.

6. The method of claim 1, further comprising determining at least one control signal that includes an indication of a current display location at which a current output pixel is to be displayed, and wherein compositing the at least one video image and the blended graphics image to provide the output image includes selecting a pixel of at least one of the at least one video image and the blended graphics image based on the current display location.

7. The method of claim 1, wherein compositing the at least one video image and the blended graphics image further includes an alpha blending of an alpha channel value for at least one pixel of the at least one video image and at least one pixel of the blended graphics image.

8. An apparatus for generating at least one output image for a display device, comprising:
    at least one input module that receives at least one video image from at least one video source and a plurality of graphics images from at least one remotely located source; and
    a processor coupled to the at least one input module, configured to perform actions including:
        receiving the at least one video image from the at least one input module;
        receiving the plurality of graphics images from the at least one input module, wherein the remotely located source separately provides a priority for the plurality of graphics images;
        receiving a background image, wherein the background image includes at least one of the at least one video image, a tiled graphics image, and a color image based on a selected background display mode;
        iteratively blending each luma component, each chroma component, and each alpha channel value for the plurality of graphics images to produce a blended graphics image having blended chroma components and blended luma components, wherein if at least one graphics image is associated with a high order priority, the blended graphics image inherits the high order priority of the at least one graphics image else inherits the priority separately received from the at least one remotely located source;
        compositing the at least one video image, the background image, and the blended graphics image by employing a per-pixel alpha value, data from the blended graphics image, and a global composition alpha value to determine a composite alpha value to generate the at least one output image based on the composite alpha value and the inherited priority of the blended graphics image, and using a control parameter indicating whether an image is transparent or opaque and whether an image is on top of another image to select as the at least one output image from the at least one video image, the blended graphics image, or a composite of the at least one video image and the blended graphics image; and providing the at least one output image to the display device.

9. The apparatus of claim 8, further comprising a memory, wherein iteratively blending the plurality of graphics images further includes:
   reading at least one of the plurality of graphics images from the memory;
   converting a format of the at least one graphics image;
   scaling the at least one graphics image;
   blending the at least one graphics image into the blended graphics image;
   performing at least one color space conversion on the blended graphics image; and
   writing the blended graphics image to the memory.

10. The apparatus of claim 8, wherein iteratively blending the plurality of graphics images further includes:
   determining an order for at least one of the plurality of graphics images to be blended, based at least in part on priority information received from the at least one remotely located source; and
   blending the at least one of the plurality of graphics images into the blended graphics image, based at least on the determined order.

11. The apparatus of claim 8, wherein at least one of the plurality of graphics images is a cursor image.

12. The apparatus of claim 8, wherein iteratively blending the plurality of graphics images to produce the blended graphics image is performed in real time.

13. The apparatus of claim 8, wherein the actions further include determining at least one control signal that includes an indication of a current display location at which a current output pixel is to be displayed, and wherein compositing the at least one video image and the blended graphics image to provide the output image includes selecting a pixel of at least one of the at least one video image and the blended graphics image based on the current display location.

14. The apparatus of claim 8, wherein compositing the at least one video image and the blended graphics image further includes an alpha blending of an alpha channel value for at least one pixel of the at least one video image and at least one pixel of the blended graphics image.

15. A processor readable non-transitory storage medium storing instructions that enable a processor to perform actions for generating at least one output image for a display device, comprising:
   receiving at least one video image from at least one video source;
   receiving a plurality of graphics images from at least one remotely located source, wherein the remotely located source separately provides a priority for the plurality of graphics images;
   receiving a background image, wherein the background image includes at least one of the at least one video image, a tiled graphics image, and a color image based on a selected background display mode;
   iteratively blending each luma component, each chroma component, and each alpha channel value for the plurality of graphics images to produce a blended graphics image having blended chroma components and blended luma components, wherein if at least one graphics image is associated with a high order priority, the blended graphics image inherits the high order priority of the at least one graphics image else inherits the priority separately received from the at least one remotely located source;
   compositing the at least one video image, the background image, and the blended graphics image by employing a per-pixel alpha value, data from the blended graphics image, and a global composition alpha value to determine a composite alpha value to generate the at least one output image based on the composite alpha value and the inherited priority of the blended graphics image, and using a control parameter indicating whether an image is transparent or opaque and whether an image is on top of another image to select as the at least one output image from the at least one video image, the blended graphics image, or a composite of the at least one video image and the blended graphics image; and
   providing the at least one output image to the display device.

16. The processor readable storage medium of claim 15, wherein iteratively blending the plurality of graphics images further includes:
   reading at least one of the plurality of graphics images from a memory;
   converting a format of the at least one graphics image;
   scaling the at least one graphics image;
   blending the at least one graphics image into the blended graphics image;
   performing at least one color space conversion on the blended graphics image; and
   writing the blended graphics image to the memory.

17. The processor readable storage medium of claim 15, wherein iteratively blending the plurality of graphics images further includes:
   determining an order for at least one of the plurality of graphics images to be blended, based at least in part on priority information received from the at least one remotely located source; and
   blending the at least one of the plurality of graphics images into the blended graphics image, based at least on the determined order.

18. The processor readable storage medium of claim 15, wherein at least one of the plurality of graphics images is a cursor image.

19. The processor readable storage medium of claim 15, wherein iteratively blending the plurality of graphics images to produce the blended graphics image is performed in real time.

20. The processor readable storage medium of claim 15, wherein compositing the at least one video image and the blended graphics image further includes an alpha blending of an alpha channel value for at least one pixel of the at least one video image and at least one pixel of the blended graphics image.

* * * * *